(12) United States Patent
Wang et al.

(10) Patent No.: US 11,910,330 B2
(45) Date of Patent: Feb. 20, 2024

(54) POWER CONTROL METHOD AND APPARATUS

(71) Applicant: Huawei Technologies Co., Ltd., Shenzhen (CN)

(72) Inventors: Ting Wang, Shanghai (CN); Hao Tang, Ottawa (CA); Xinxian Li, Shanghai (CN); Zhenfei Tang, Shanghai (CN)

(73) Assignee: Huawei Technologies, Co., Ltd., Shenzhen (CN)

( * ) Notice: Subject to any disclaimer, the term of this patent is extended or adjusted under 35 U.S.C. 154(b) by 284 days.

(21) Appl. No.: 17/360,290

(22) Filed: Jun. 28, 2021

(65) Prior Publication Data

US 2022/0110069 A1    Apr. 7, 2022

Related U.S. Application Data

(63) Continuation of application No. PCT/CN2019/127190, filed on Dec. 20, 2019.

(30) Foreign Application Priority Data

Dec. 29, 2018   (CN) .......................... 201811642476.X

(51) Int. Cl.
  *H04W 52/28*    (2009.01)
  *H04W 52/14*    (2009.01)

(52) U.S. Cl.
  CPC ....... *H04W 52/281* (2013.01); *H04W 52/146* (2013.01)

(58) Field of Classification Search
  CPC ............. H04W 52/281; H04W 52/146; H04W 52/383; H04W 52/346; H04W 52/367
  See application file for complete search history.

(56) References Cited

U.S. PATENT DOCUMENTS 10,616,837 B2   4/2020  Lee et al.
10,779,242 B2   9/2020  Wang et al.
(Continued)

FOREIGN PATENT DOCUMENTS

CN   107889157 A   4/2018
CN   108174438 A   6/2018
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.4.0, Dec. 2018, 363 pages.

(Continued)

*Primary Examiner* — John J Lee
(74) *Attorney, Agent, or Firm* — Slater Matsil, LLP

(57) ABSTRACT

A power control method includes determining priorities of uplink transmission and sidelink transmission, where the uplink transmission is used to transmit uplink information by a first terminal device to a network device, and the sidelink transmission is used to transmit sidelink information by the first terminal device to a second terminal device; determining target information that is in the sidelink information and that overlaps with the uplink information in time domain in a scheduling time unit; determining transmit powers of the uplink information and the target information based on the target information and the priorities of the uplink transmission and the sidelink transmission; and sending the uplink information based on the transmit power of the uplink information, or sending the target information based on the transmit power of the target information.

20 Claims, 17 Drawing Sheets

(56) References Cited

U.S. PATENT DOCUMENTS

| | | | |
|---|---|---|---|
| 10,820,300 B2 | 10/2020 | Noh et al. | |
| 2017/0367087 A1 | 12/2017 | Seo | |
| 2019/0090218 A1* | 3/2019 | Noh | H04W 72/23 |
| 2019/0342839 A1* | 11/2019 | Shao | H04L 1/1861 |
| 2022/0110069 A1* | 4/2022 | Wang | H04W 52/146 |

FOREIGN PATENT DOCUMENTS

| | | |
|---|---|---|
| CN | 108781159 A | 11/2018 |
| EP | 3425837 A1 | 1/2019 |
| KR | 20170112945 A | 10/2017 |
| WO | 2017030422 A1 | 2/2017 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 15)," 3GPP TS 36.321 V15.3.0, Sep. 2018, 123 pages.

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.3.0, Sep. 2018, 918 pages.

"3rd Generation Partnership Project; Technical Specification Group Radio Access Network; Evolved Universal Terrestrial Radio Access (E-UTRA); Physical channels and modulation (Release 15)," 3GPP TS 36.211 V15.3.0, Sep. 2018, 237 pages.

"3rd Generation Partnership Project; Technical Specification Group Radio Access Network; Evolved Universal Terrestrial Radio Access (E-UTRA); Multiplexing and channel coding (Release 15)," 3GPP TS 36.212 V15.3.0, Sep. 2018, 247 pages.

"3rd Generation Partnership Project; Technical Specification Group Radio Access Network; Evolved Universal Terrestrial Radio Access (E-UTRA); Physical layer procedures (Release 12)," 3GPP TS 36.213 V12.13.0, Sep. 2018, 241 pages.

"Correction on Sidelink Power Control for Simultaneous UL and SL Transmissions," Source to WG: Huawei, HiSilicon, Work item code: LTE_SL_V2V-Core, Category: F, Release: Rel-14, 3GPP TSG-RAN1 Meeting #90, R1-1713822, Change Request, Prague, Czech Republic, Aug. 21-25, 2017, 3 pages.

"TX Power Allocation in SL CA," Agenda item: 6.2.3.1.3, Source: Nokia, Nokia Shanghai Bell, Document for: Discussion and Decision, 03GPP TSG-RAN WG1 Meeting #92, R1-1802581, Athens, Greece, Feb. 26-Mar. 2, 2018, 2 pages.

"Remaining Details for Mode 4 Support for V2X Carrier Aggregation," Source: Nokia, Nokia Shanghai Bell, Agenda Item: 6.2.5.1.1, Document for: Discussion and Decision, 3GPP TSG RAN WG1 Meeting #92bis, R1-1804256, Sanya, China, Apr. 16-20, 2018, 3 pages.

"Sidelink PHY Structure and Procedure for NR V2X," Agenda Item: 7.2.4.1.2, Source: Huawei, HiSilicon, Document for: Discussion and decision, 3GPP TSG RAN WG1 Meeting #94bis, R1-1810138, Chengdu, China, Oct. 8-12, 2018, 15 pages.

* cited by examiner

POWER CONTROL METHOD AND APPARATUS

CROSS-REFERENCE TO RELATED APPLICATIONS

This application is a continuation of International Application No. PCT/CN2019/127190, filed on Dec. 20, 2019, which claims priority to Chinese Patent Application No. 201811642476.X, filed on Dec. 29, 2018. The disclosures of the aforementioned applications are hereby incorporated by reference in their entireties.

TECHNICAL FIELD

This application relates to the field of communications technologies, and in particular, to a power control method and an apparatus.

BACKGROUND

In a communications system such as a new radio (NR) system, data transmission of a terminal device may include sidelink (SL) transmission and uplink transmission. During the SL transmission, sidelink information may be transmitted between the terminal device and another terminal device. During the uplink transmission, the terminal device may transmit an uplink signal to a network device. For example, the terminal device sends the uplink signal to the network device.

In the communications system, there is a scenario in which the uplink transmission and the SL transmission coexist. For example, in a scheduling unit, a terminal device supports both uplink communication with a network device and SL communication with another terminal device. To reduce interference between a plurality of sending terminal devices, power control may be performed on the terminal device. In the scenario in which the uplink transmission and the SL transmission coexist, how to perform power control on the terminal device is a current research hotspot.

SUMMARY

Embodiments of this application provide a power control method and an apparatus, to implement power control on a terminal device.

According to a first aspect, a power control method is provided, including: determining a transmit power of uplink information and a transmit power of target information based on the target information and priorities of uplink transmission and sidelink transmission, where the uplink transmission includes: transmitting the uplink information by a first terminal device to a network device, the sidelink transmission includes: transmitting sidelink information by the first terminal device to a second terminal device, the target information is information that is in the sidelink information and that overlaps with the uplink information in time domain in a scheduling time unit, and the target information is at least one of data information, scheduling assignment information, or sidelink feedback information, and sending the uplink information based on the transmit power of the uplink information, and/or sending the target information based on the transmit power of the target information.

In this embodiment of this application, when the sidelink transmission has a high priority, the sidelink transmission is preferentially ensured, and a transmission requirement of the sidelink transmission is met to a maximum extent. When the uplink transmission has a high priority, the uplink transmission is preferentially ensured, a transmission requirement of the uplink transmission is met to a maximum extent, to reduce interference, and improve signal transmission performance.

It can be learned from the foregoing that, a transmit power can be determined for different cases of the priority of the uplink transmission and the priority of the sidelink transmission, and the target information that is in the sidelink transmission and that overlaps with the uplink transmission in time domain in different coexistence scenarios is considered, so that power control is properly and efficiently performed, to meet a transmission requirement, reduce interference, and improve transmission performance.

In a possible design, a sum of the transmit power of the uplink information and the transmit power of the target information does not exceed a maximum transmit power of the first terminal device.

In a possible design, the target information is data information, scheduling assignment information, or sidelink feedback information. The determining a transmit power of uplink information and a transmit power of target information based on the target information and priorities of uplink transmission and sidelink transmission includes: if the priority of the sidelink transmission is higher than the priority of the uplink transmission, adjusting the transmit power of the uplink information based on the transmit power of the target information, or if the priority of the uplink transmission is higher than the priority of the sidelink transmission, adjusting the transmit power of the target information based on the transmit power of the uplink information.

It can be learned from the foregoing that, in this embodiment of this application, when the uplink information overlaps with the sidelink information in time domain, and the target information that is in the sidelink information and that overlaps with the uplink information in time domain includes one piece of information, power control may be performed on this type of information and the uplink information based on the different priorities of the uplink transmission and the sidelink transmission, so that signal transmission performance can be improved.

In a possible design, the target information includes first information and second information, the first information is data information, scheduling assignment information, or sidelink feedback information, and the second information is data information, scheduling assignment information, or sidelink feedback information. The determining a transmit power of uplink information and a transmit power of target information based on the target information and priorities of uplink transmission and sidelink transmission includes: determining a first transmit power based on at least one of a transmit power of the first information or a transmit power of the second information, and if the priority of the sidelink transmission is higher than the priority of the uplink transmission, adjusting the transmit power of the uplink information based on the first transmit power, or if the priority of the uplink transmission is higher than the priority of the sidelink transmission, adjusting the transmit power of the first information and/or the transmit power of the second information based on the transmit power of the uplink information.

It can be learned from the foregoing that, in this embodiment of this application, when the uplink information overlaps with the sidelink information in time domain, and the target information that is in the sidelink information and that overlaps with the uplink information in time domain includes two pieces of information, power control may be performed on the two types of information and the uplink information based on the different priorities of the uplink transmission and the sidelink transmission, so that signal transmission performance can be improved.

In a possible design, the determining a first transmit power based on at least one of a transmit power of the first information or a transmit power of the second information includes: if a frequency division multiplexing mode is used between the first information and the second information, the first transmit power is a sum of the transmit power of the first information and the transmit power of the second information, or if a time division multiplexing mode is used between the first information and the second information, the first transmit power is a larger value in the transmit power of the first information and the transmit power of the second information.

In a possible design, the target information includes first information, second information, and third information, the first information is data information, scheduling assignment information, or sidelink feedback information, the second information is data information, scheduling assignment information, or sidelink feedback information, and the third information is data information, scheduling assignment information, or sidelink feedback information. The determining a transmit power of uplink information and a transmit power of target information based on the target information and priorities of uplink transmission and sidelink transmission includes: determining a second transmit power based on at least one of a transmit power of the first information, a transmit power of the second information, or a transmit power of the third information, and if the priority of the sidelink transmission is higher than the priority of the uplink transmission, adjusting the transmit power of the uplink information based on the second transmit power, or if the priority of the uplink transmission is higher than the priority of the sidelink transmission, adjusting one or more of the transmit power of the first information, the transmit power of the second information, and the transmit power of the third information based on the transmit power of the uplink information.

It can be learned from the foregoing that, in this embodiment of this application, when the uplink information overlaps with the sidelink information in time domain, and the target information that is in the sidelink information and that overlaps with the uplink information in time domain includes three pieces of information, power control may be performed on the three types of information and the uplink information based on the different priorities of the uplink transmission and the sidelink transmission, so that signal transmission performance can be improved.

In a possible design, the determining a second transmit power based on at least one of a transmit power of the first information, a transmit power of the second information, or a transmit power of the third information includes: if a time division multiplexing mode is used between the first information, the second information, and the third information, the second transmit power is a largest transmit power in the transmit power of the first information, the transmit power of the second information, and the transmit power of the third information, or if a frequency division multiplexing mode is used between the first information and the second information, a time division multiplexing mode is used between the third information and each of the first information and the second information, and a sum of the transmit power of the first information and the transmit power of the second information is a third transmit power, the second transmit power is a larger value in the transmit power of the third information and the third transmit power, or if a frequency division multiplexing mode is used between the first information, the second information, and the third information, the second transmit power is a sum of the transmit power of the first information, the transmit power of the second information, and the transmit power of the third information.

In a possible design, the method further includes: receiving first configuration information, where the first configuration information is used to indicate the priorities of the uplink transmission and the sidelink transmission, and determining the priorities of the uplink transmission and the sidelink transmission based on the first configuration information, or determining the priorities of the uplink transmission and the sidelink transmission according to a predefined rule, or receiving second configuration information, where the second configuration information is used to indicate a first threshold, and determining the priorities of the uplink transmission and the sidelink transmission based on a value relationship between the first threshold and a priority of a data packet corresponding to the target information.

It can be learned from the foregoing that, in this embodiment of this application, the priorities of the uplink transmission and the sidelink transmission may be flexibly configured.

In a possible design, the target information is data information, scheduling assignment information, or sidelink feedback information, the target information is transmitted on a first channel, and the uplink information is transmitted on a second channel. The priorities of the uplink transmission and the sidelink transmission are specifically priorities of the first channel and the second channel. The determining a transmit power of uplink information and a transmit power of target information based on the target information and priorities of uplink transmission and sidelink transmission includes: if the priority of the first channel is higher than the priority of the second channel, adjusting the transmit power of the uplink information based on the transmit power of the target information, or if the priority of the second channel is higher than the priority of the first channel, adjusting the transmit power of the target information based on the transmit power of the uplink information.

In a possible design, the target information includes first information and second information, the first information is data information, scheduling assignment information, or sidelink feedback information, the second information is data information, scheduling assignment information, or sidelink feedback information, the first information is transmitted on a first channel, the second information is transmitted on a second channel, and the uplink information is transmitted on a third channel. The priorities of the sidelink transmission and the uplink transmission are specifically priorities of the first channel, the second channel, and the third channel.

The determining a transmit power of uplink information and a transmit power of target information based on the target information and priorities of uplink transmission and sidelink transmission includes: if the channels in descending order of priority are sequentially: the first channel, the second channel, and the third channel, adjusting a transmit power of the second information based on a transmit power of the first information, and adjusting the transmit power of the uplink information based on the transmit powers of the first information and the second information, or if the channels in descending order of priority are sequentially: the first channel, the third channel, and the second channel, adjusting the transmit power of the uplink information based on a transmit power of the first information, and adjusting a transmit power of the second information based on the transmit powers of the first information and the uplink information, or if the channels in descending order of priority are sequentially: the third channel, the first channel, and the second channel, adjusting a transmit power of the first information based on the transmit power of the uplink information, and adjusting a transmit power of the second information based on the transmit powers of the uplink information and the first information.

In a possible design, the target information includes first information, second information, and third information, the first information is data information, scheduling assignment information, or sidelink feedback information, the second information is data information, scheduling assignment information, or sidelink feedback information, the third information is data information, scheduling assignment information, or sidelink feedback information, the first information is transmitted on a first channel, the second information is transmitted on a second channel, the third information is transmitted on a third channel, and the uplink information is transmitted on a fourth channel. The priorities of the sidelink transmission and the uplink transmission are specifically priorities of the first channel, the second channel, the third channel, and the fourth channel.

The determining a transmit power of uplink information and a transmit power of target information based on the target information and priorities of uplink transmission and sidelink transmission includes: if the channels in descending order of priority are sequentially: the first channel, the second channel, the third channel, and the fourth channel, adjusting a transmit power of the second information based on a transmit power of the first information, adjusting a transmit power of the third information based on the transmit powers of the first information and the second information, and adjusting the transmit power of the uplink information based on the transmit powers of the first information, the second information, and the third information, or if the channels in descending order of priority are sequentially: the first channel, the fourth channel, the second channel, and the third channel, adjusting the transmit power of the uplink information based on a transmit power of the first information, adjusting a transmit power of the second information based on the transmit powers of the first information and the uplink information, and adjusting a transmit power of the third information based on the transmit powers of the first information, the uplink information, and the second information, or if the channels in descending order of priority are sequentially: the fourth channel, the first channel, the second channel, and the third channel, adjusting a transmit power of the first information based on the transmit power of the uplink information, adjusting a transmit power of the second information based on the transmit powers of the uplink information and the first information, and adjusting a transmit power of the third information based on the transmit powers of the uplink information, the first information, and the second information.

It can be learned from the foregoing that, in the foregoing three possible designs, three cases of the sidelink transmission are considered: an uplink data channel physical sidelink shared channel (PSSCH), used to transmit the data information, an uplink control channel physical sidelink control channel (PSCCH), used to transmit the scheduling assignment information, and a feedback channel physical sidelink feedback channel (PSFCH). Priorities of an uplink transmission channel and a transmission channel that corresponds to the target information that current overlaps with the uplink transmission in time domain are considered, and the powers of the target information and the uplink information are adjusted based on the priorities. In this embodiment of this application, power adjustment can be performed based on priorities of different channels without a need to configure the priorities of the sidelink transmission and the uplink transmission. This is simple and easy.

In a possible design, the uplink information is uplink data information or uplink control information, the target information is transmitted on a first channel, and the uplink information is transmitted on a second channel. The priorities of the uplink transmission and the sidelink transmission are specifically priorities of the first channel and the second channel.

The determining a transmit power of uplink information and a transmit power of target information based on the target information and priorities of uplink transmission and sidelink transmission includes: if the priority of the first channel is higher than the priority of the second channel, adjusting the transmit power of the uplink information based on the transmit power of the target information, or if the priority of the second channel is higher than the priority of the first channel, adjusting the transmit power of the target information based on the transmit power of the uplink information.

In a possible design, the uplink information includes fourth information and fifth information, the fourth information is uplink data information or uplink control information, the fifth information is uplink data information or uplink control information, the target information is transmitted on a first channel, the fourth information is transmitted on a second channel, and the fifth information is transmitted on a third channel. The priorities of the uplink transmission and the sidelink transmission are specifically priorities of the first channel, the second channel, and the third channel.

The determining a transmit power of uplink information and a transmit power of target information based on the target information and priorities of uplink transmission and sidelink transmission includes: if the channels in descending order of priority are sequentially: the first channel, the second channel, and the third channel, adjusting a transmit power of the fourth information based on the transmit power of the target information, and adjusting a transmit power of the fifth information based on the transmit powers of the target information and the fourth information, or if the channels in descending order of priority are sequentially: the second channel, the first channel, and the third channel, adjusting the transmit power of the target information based on a transmit power of the fourth information, and adjusting a transmit power of the fifth information based on the transmit powers of the fourth information and the target information, or if the channels in descending order of priority are sequentially: the second channel, the third channel, and the first channel, adjusting a transmit power of the fifth information based on a transmit power of the fourth information, and adjusting the transmit power of the target information based on the transmit powers of the fourth information and the fifth information.

It can be learned from the foregoing that, in the foregoing two possible designs, the uplink transmission may have the following three cases: transmitting only an uplink data channel physical uplink shared channel (PUSCH), transmitting uplink control information physical uplink control channel (PUCCH), and transmitting both a PUSCH and the PUCCH, or transmitting only a PUSCH with uplink control information (UCI). In this embodiment of this application, power adjustment may be performed based on the priorities of the sidelink transmission and the uplink transmission channels without a need to configure the priorities of the uplink transmission and the sidelink transmission. This is simple and easy.

According to a second aspect, an embodiment of this application provides an apparatus. The apparatus may be a terminal device, or may be an apparatus in a terminal device, or may be an apparatus that can be used together with a terminal device. The apparatus may include a determining module and a sending module, and the determining module and the sending module may perform corresponding functions in any design example of the first aspect. Details are as follows:

The determining module is configured to determine a transmit power of uplink information and a transmit power of target information based on the target information and priorities of uplink transmission and sidelink transmission, where the uplink transmission includes: transmitting the uplink information by a first terminal device to a network device, the sidelink transmission includes: transmitting sidelink information by the first terminal device to a second terminal device, the target information is information that is in the sidelink information and that overlaps with the uplink information in time domain in a scheduling time unit, and the target information is at least one of data information, scheduling assignment information, or sidelink feedback information.

The sending module is configured to send the uplink information based on the transmit power of the uplink information, and/or send the target information based on the transmit power of the target information.

In a possible design, a sum of the transmit power of the uplink information and the transmit power of the target information does not exceed a maximum transmit power of the first terminal device.

In a possible design, the target information is data information, scheduling assignment information, or sidelink feedback information, and when determining the transmit power of the uplink information and the transmit power of the target information based on the target information and the priorities of the uplink transmission and the sidelink transmission, the determining module is specifically configured to: if the priority of the sidelink transmission is higher than the priority of the uplink transmission, adjust the transmit power of the uplink information based on the transmit power of the target information, or if the priority of the uplink transmission is higher than the priority of the sidelink transmission, adjust the transmit power of the target information based on the transmit power of the uplink information.

In a possible design, the target information includes first information and second information, the first information is data information, scheduling assignment information, or sidelink feedback information, and the second information is data information, scheduling assignment information, or sidelink feedback information. When determining the transmit power of the uplink information and the transmit power of the target information based on the target information and the priorities of the uplink transmission and the sidelink transmission, the determining module is specifically configured to: determine a first transmit power based on at least one of a transmit power of the first information or a transmit power of the second information, and if the priority of the sidelink transmission is higher than the priority of the uplink transmission, adjust the transmit power of the uplink information based on the first transmit power, or if the priority of the uplink transmission is higher than the priority of the sidelink transmission, adjust the transmit power of the first information and/or the transmit power of the second information based on the transmit power of the uplink information.

In a possible design, when determining the first transmit power based on at least one of the transmit power of the first information or the transmit power of the second information, the determining module is specifically configured to: determine that if a frequency division multiplexing mode is used between the first information and the second information, the first transmit power is a sum of the transmit power of the first information and the transmit power of the second information, or determine that if a time division multiplexing mode is used between the first information and the second information, the first transmit power is a larger value in the transmit power of the first information and the transmit power of the second information.

In a possible design, the target information includes first information, second information, and third information, the first information is data information, scheduling assignment information, or sidelink feedback information, the second information is data information, scheduling assignment information, or sidelink feedback information, and the third information is data information, scheduling assignment information, or sidelink feedback information.

When determining the transmit power of the uplink information and the transmit power of the target information based on the target information and the priorities of the uplink transmission and the sidelink transmission, the determining module is specifically configured to: determine a second transmit power based on at least one of a transmit power of the first information, a transmit power of the second information, or a transmit power of the third information, and if the priority of the sidelink transmission is higher than the priority of the uplink transmission, adjust the transmit power of the uplink information based on the second transmit power, or if the priority of the uplink transmission is higher than the priority of the sidelink transmission, adjust one or more of the transmit power of the first information, the transmit power of the second information, and the transmit power of the third information based on the transmit power of the uplink information.

In a possible design, when determining the second transmit power based on at least one of the transmit power of the first information, the transmit power of the second information, or the transmit power of the third information, the determining module is specifically configured to: determine that if a time division multiplexing mode is used between the first information, the second information, and the third information, the second transmit power is a largest transmit power in the transmit power of the first information, the transmit power of the second information, and the transmit power of the third information, or determine that if a frequency division multiplexing mode is used between the first information and the second information, a time division multiplexing mode is used between the third information and each of the first information and the second information, and a sum of the transmit power of the first information and the transmit power of the second information is a third transmit power, the second transmit power is a larger value in the transmit power of the third information and the third transmit power, or determine that if a frequency division multiplexing mode is used between the first information, the second information, and the third information, the second transmit power is a sum of the transmit power of the first information, the transmit power of the second information, and the transmit power of the third information.

In a possible design, the apparatus further includes a receiving module. The receiving module is configured to receive first configuration information, where the first configuration information is used to indicate the priorities of the uplink transmission and the sidelink transmission, and the determining module is further configured to determine the priorities of the uplink transmission and the sidelink transmission based on the first configuration information, or the determining module is further configured to determine the priorities of the uplink transmission and the sidelink transmission according to a predefined rule, or the receiving module is configured to receive second configuration information, where the second configuration information is used to indicate a first threshold, and the determining module is further configured to determine the priorities of the uplink transmission and the sidelink transmission based on a value relationship between the first threshold and a priority of a data packet corresponding to the target information.

In a possible design, the target information is data information, scheduling assignment information, or sidelink feedback information, the target information is transmitted on a first channel, and the uplink information is transmitted on a second channel. The priorities of the uplink transmission and the sidelink transmission are specifically priorities of the first channel and the second channel.

When determining the transmit power of the uplink information and the transmit power of the target information based on the target information and the priorities of the uplink transmission and the sidelink transmission, the determining module is specifically configured to: if the priority of the first channel is higher than the priority of the second channel, adjust the transmit power of the uplink information based on the transmit power of the target information, or if the priority of the second channel is higher than the priority of the first channel, adjust the transmit power of the target information based on the transmit power of the uplink information.

In a possible design, the target information includes first information and second information, the first information is data information, scheduling assignment information, or sidelink feedback information, the second information is data information, scheduling assignment information, or sidelink feedback information, the first information is transmitted on a first channel, the second information is transmitted on a second channel, and the uplink information is transmitted on a third channel. The priorities of the sidelink transmission and the uplink transmission are specifically priorities of the first channel, the second channel, and the third channel.

When determining the transmit power of the uplink information and the transmit power of the target information based on the target information and the priorities of the uplink transmission and the sidelink transmission, the determining module is specifically configured to: if the channels in descending order of priority are sequentially: the first channel, the second channel, and the third channel, adjust a transmit power of the second information based on a transmit power of the first information, and adjust the transmit power of the uplink information based on the transmit powers of the first information and the second information, or if the channels in descending order of priority are sequentially: the first channel, the third channel, and the second channel, adjust the transmit power of the uplink information based on a transmit power of the first information, and adjust a transmit power of the second information based on the transmit powers of the first information and the uplink information, or if the channels in descending order of priority are sequentially: the third channel, the first channel, and the second channel, adjust a transmit power of the first information based on the transmit power of the uplink information, and adjust a transmit power of the second information based on the transmit powers of the uplink information and the first information.

In a possible design, the target information includes first information, second information, and third information, the first information is data information, scheduling assignment information, or sidelink feedback information, the second information is data information, scheduling assignment information, or sidelink feedback information, the third information is data information, scheduling assignment information, or sidelink feedback information, the first information is transmitted on a first channel, the second information is transmitted on a second channel, the third information is transmitted on a third channel, and the uplink information is transmitted on a fourth channel. The priorities of the sidelink transmission and the uplink transmission are specifically priorities of the first channel, the second channel, the third channel, and the fourth channel.

When determining the transmit power of the uplink information and the transmit power of the target information based on the target information and the priorities of the uplink transmission and the sidelink transmission, the determining module is specifically configured to: if the channels in descending order of priority are sequentially: the first channel, the second channel, the third channel, and the fourth channel, adjust a transmit power of the second information based on a transmit power of the first information, adjust a transmit power of the third information based on the transmit powers of the first information and the second information, and adjust the transmit power of the uplink information based on the transmit powers of the first information, the second information, and the third information, or if the channels in descending order of priority are sequentially: the first channel, the fourth channel, the second channel, and the third channel, adjust the transmit power of the uplink information based on a transmit power of the first information, adjust a transmit power of the second information based on the transmit powers of the first information and the uplink information, and adjust a transmit power of the third information based on the transmit powers of the first information, the uplink information, and the second information, or if the channels in descending order of priority are sequentially: the fourth channel, the first channel, the second channel, and the third channel, adjust a transmit power of the first information based on the transmit power of the uplink information, adjust a transmit power of the second information based on the transmit powers of the uplink information and the first information, and adjust a transmit power of the third information based on the transmit powers of the uplink information, the first information, and the second information.

In a possible design, the uplink information is uplink data information or uplink control information, the target information is transmitted on a first channel, and the uplink information is transmitted on a second channel. The priorities of the uplink transmission and the sidelink transmission are specifically priorities of the first channel and the second channel.

When determining the transmit power of the uplink information and the transmit power of the target information based on the target information and the priorities of the uplink transmission and the sidelink transmission, the determining module is specifically configured to: if the priority of the first channel is higher than the priority of the second channel, adjust the transmit power of the uplink information based on the transmit power of the target information, or if the priority of the second channel is higher than the priority of the first channel, adjust the transmit power of the target information based on the transmit power of the uplink information.

In a possible design, the uplink information includes fourth information and fifth information, the fourth information is uplink data information or uplink control information, the fifth information is uplink data information or uplink control information, the target information is transmitted on a first channel, the fourth information is transmitted on a second channel, and the fifth information is transmitted on a third channel. The priorities of the uplink transmission and the sidelink transmission are specifically priorities of the first channel, the second channel, and the third channel.

When determining the transmit power of the uplink information and the transmit power of the target information based on the target information and the priorities of the uplink transmission and the sidelink transmission, the determining module is specifically configured to: if the channels in descending order of priority are sequentially: the first channel, the second channel, and the third channel, adjust a transmit power of the fourth information based on the transmit power of the target information, and adjust a transmit power of the fifth information based on the transmit powers of the target information and the fourth information, or if the channels in descending order of priority are sequentially: the second channel, the first channel, and the third channel, adjust the transmit power of the target information based on a transmit power of the fourth information, and adjust a transmit power of the fifth information based on the transmit powers of the fourth information and the target information, or if the channels in descending order of priority are sequentially: the second channel, the third channel, and the first channel, adjust a transmit power of the fifth information based on a transmit power of the fourth information, and adjust the transmit power of the target information based on the transmit powers of the fourth information and the fifth information.

According to a third aspect, an embodiment of this application provides an apparatus. The apparatus includes a processor, configured to implement the method described in the first aspect. The apparatus may further include a memory, configured to store instructions and data. The memory is coupled to the processor, and when executing the program instructions stored in the memory, the processor can implement the method described in the first aspect. The apparatus may further include a communications interface. The communications interface is used by the apparatus to communicate with another device. For example, the communications interface may be a transceiver, a circuit, a bus, a module, or a communications interface of another type. The another device may be a network device, a second terminal device, or the like. In a possible device, the apparatus includes: a memory, configured to store program instructions, a processor, configured to determine a transmit power of uplink information and a transmit power of target information based on the target information and priorities of uplink transmission and sidelink transmission, where the uplink transmission includes: transmitting the uplink information by a first terminal device to a network device, the sidelink transmission includes: transmitting sidelink information by the first terminal device to a second terminal device, the target information is information that is in the sidelink information and that overlaps with the uplink information in time domain in a scheduling time unit, and the target information is at least one of data information, scheduling assignment information, or sidelink feedback information, and a communications interface, configured to send the uplink information based on the transmit power of the uplink information, and/or send the target information based on the transmit power of the target information. Alternatively, this may be described as: The processor sends the uplink information based on the transmit power of the uplink information through the communications interface, and/or sends the target information based on the transmit power of the target information through the communications interface.

In a possible design, a sum of the transmit power of the uplink information and the transmit power of the target information does not exceed a maximum transmit power of the first terminal device.

In a possible design, the target information is data information, scheduling assignment information, or sidelink feedback information.

When determining the transmit power of the uplink information and the transmit power of the target information based on the target information and the priorities of the uplink transmission and the sidelink transmission, the processor is specifically configured to: if the priority of the sidelink transmission is higher than the priority of the uplink transmission, adjust the transmit power of the uplink information based on the transmit power of the target information, or if the priority of the uplink transmission is higher than the priority of the sidelink transmission, adjust the transmit power of the target information based on the transmit power of the uplink information.

In a possible design, the target information includes first information and second information, the first information is data information, scheduling assignment information, or sidelink feedback information, and the second information is data information, scheduling assignment information, or sidelink feedback information.

When determining the transmit power of the uplink information and the transmit power of the target information based on the target information and the priorities of the uplink transmission and the sidelink transmission, the processor is specifically configured to: determine a first transmit power based on at least one of a transmit power of the first information or a transmit power of the second information, and if the priority of the sidelink transmission is higher than the priority of the uplink transmission, adjust the transmit power of the uplink information based on the first transmit power, or if the priority of the uplink transmission is higher than the priority of the sidelink transmission, adjust at least one of the transmit power of the first information and the transmit power of the second information based on the transmit power of the uplink information.

In a possible design, when determining the first transmit power based on at least one of the transmit power of the first information or the transmit power of the second information, the processor is specifically configured to: determine that if a frequency division multiplexing mode is used between the first information and the second information, the first transmit power is a sum of the transmit power of the first information and the transmit power of the second information, or determine that if a time division multiplexing mode is used between the first information and the second information, the first transmit power is a larger value in the transmit power of the first information and the transmit power of the second information.

In a possible design, the target information includes first information, second information, and third information, the first information is data information, scheduling assignment information, or sidelink feedback information, the second information is data information, scheduling assignment information, or sidelink feedback information, and the third information is data information, scheduling assignment information, or sidelink feedback information.

When determining the transmit power of the uplink information and the transmit power of the target information based on the target information and the priorities of the uplink transmission and the sidelink transmission, the processor is specifically configured to: determine a second transmit power based on at least one of a transmit power of the first information, a transmit power of the second information, or a transmit power of the third information, and if the priority of the sidelink transmission is higher than the priority of the uplink transmission, adjust the transmit power of the uplink information based on the second transmit power, or if the priority of the uplink transmission is higher than the priority of the sidelink transmission, adjusting the transmit power of the first information, the transmit power of the second information, and/or the transmit power of the third information based on the transmit power of the uplink information.

In a possible design, when determining the second transmit power based on at least one of the transmit power of the first information, the transmit power of the second information, or the transmit power of the third information, the processor is specifically configured to: determine that if a time division multiplexing mode is used between the first information, the second information, and the third information, the second transmit power is a largest transmit power in the transmit power of the first information, the transmit power of the second information, and the transmit power of the third information, or determine that if a frequency division multiplexing mode is used between the first information and the second information, a time division multiplexing mode is used between the third information and each of the first information and the second information, and a sum of the transmit power of the first information and the transmit power of the second information is a third transmit power, the second transmit power is a larger value in the transmit power of the third information and the third transmit power, or determine that if a frequency division multiplexing mode is used between the first information, the second information, and the third information, the second transmit power is a sum of the transmit power of the first information, the transmit power of the second information, and the transmit power of the third information.

In a possible design, the communications interface is further configured to receive first configuration information, where the first configuration information is used to indicate the priorities of the uplink transmission and the sidelink transmission, and the processor is further configured to determine the priorities of the uplink transmission and the sidelink transmission based on the first configuration information, or the processor is further configured to determine the priorities of the uplink transmission and the sidelink transmission according to a predefined rule, or the communications interface is further configured to receive second configuration information, where the second configuration information is used to indicate a first threshold, and the processor is further configured to determine the priorities of the uplink transmission and the sidelink transmission based on a value relationship between the first threshold and a priority of a data packet corresponding to the target information.

In a possible design, the target information is data information, scheduling assignment information, or sidelink feedback information, the target information is transmitted on a first channel, and the uplink information is transmitted on a second channel. The priorities of the uplink transmission and the sidelink transmission are specifically priorities of the first channel and the second channel.

When determining the transmit power of the uplink information and the transmit power of the target information based on the target information and the priorities of the uplink transmission and the sidelink transmission, the processor is specifically configured to: if the priority of the first channel is higher than the priority of the second channel, adjust the transmit power of the uplink information based on the transmit power of the target information, or if the priority of the second channel is higher than the priority of the first channel, adjust the transmit power of the target information based on the transmit power of the uplink information.

In a possible design, the target information includes first information and second information, the first information is data information, scheduling assignment information, or sidelink feedback information, the second information is data information, scheduling assignment information, or sidelink feedback information, the first information is transmitted on a first channel, the second information is transmitted on a second channel, and the uplink information is transmitted on a third channel. The priorities of the sidelink transmission and the uplink transmission are specifically priorities of the first channel, the second channel, and the third channel.

When determining the transmit power of the uplink information and the transmit power of the target information based on the target information and the priorities of the uplink transmission and the sidelink transmission, the processor is specifically configured to: if the channels in descending order of priority are sequentially: the first channel, the second channel, and the third channel, adjust a transmit power of the second information based on a transmit power of the first information, and adjust the transmit power of the uplink information based on the transmit powers of the first information and the second information, or if the channels in descending order of priority are sequentially: the first channel, the third channel, and the second channel, adjust the transmit power of the uplink information based on a transmit power of the first information, and adjust a transmit power of the second information based on the transmit powers of the first information and the uplink information, or if the channels in descending order of priority are sequentially: the third channel, the first channel, and the second channel, adjust a transmit power of the first information based on the transmit power of the uplink information, and adjust a transmit power of the second information based on the transmit powers of the uplink information and the first information.

In a possible design, the target information includes first information, second information, and third information, the first information is data information, scheduling assignment information, or sidelink feedback information, the second information is data information, scheduling assignment information, or sidelink feedback information, the third information is data information, scheduling assignment information, or sidelink feedback information, the first information is transmitted on a first channel, the second information is transmitted on a second channel, the third information is transmitted on a third channel, and the uplink information is transmitted on a fourth channel. The priorities of the sidelink transmission and the uplink transmission are specifically priorities of the first channel, the second channel, the third channel, and the fourth channel.

When determining the transmit power of the uplink information and the transmit power of the target information based on the target information and the priorities of the uplink transmission and the sidelink transmission, the processor is specifically configured to: if the channels in descending order of priority are sequentially: the first channel, the second channel, the third channel, and the fourth channel, adjust a transmit power of the second information based on a transmit power of the first information, adjust a transmit power of the third information based on the transmit powers of the first information and the second information, and adjust the transmit power of the uplink information based on the transmit powers of the first information, the second information, and the third information, or if the channels in descending order of priority are sequentially: the first channel, the fourth channel, the second channel, and the third channel, adjust the transmit power of the uplink information based on a transmit power of the first information, adjust a transmit power of the second information based on the transmit powers of the first information and the uplink information, and adjust a transmit power of the third information based on the transmit powers of the first information, the uplink information, and the second information, or if the channels in descending order of priority are sequentially: the fourth channel, the first channel, the second channel, and the third channel, adjust a transmit power of the first information based on the transmit power of the uplink information, adjust a transmit power of the second information based on the transmit powers of the uplink information and the first information, and adjust a transmit power of the third information based on the transmit powers of the uplink information, the first information, and the second information.

In a possible design, the uplink information is uplink data information or uplink control information, the target information is transmitted on a first channel, and the uplink information is transmitted on a second channel. The priorities of the uplink transmission and the sidelink transmission are specifically priorities of the first channel and the second channel.

When determining the transmit power of the uplink information and the transmit power of the target information based on the target information and the priorities of the uplink transmission and the sidelink transmission, the processor is specifically configured to: if the priority of the first channel is higher than the priority of the second channel, adjust the transmit power of the uplink information based on the transmit power of the target information, or if the priority of the second channel is higher than the priority of the first channel, adjust the transmit power of the target information based on the transmit power of the uplink information.

In a possible design, the uplink information includes fourth information and fifth information, the fourth information is uplink data information or uplink control information, the fifth information is uplink data information or uplink control information, the target information is transmitted on a first channel, the fourth information is transmitted on a second channel, and the fifth information is transmitted on a third channel. The priorities of the uplink transmission and the sidelink transmission are specifically priorities of the first channel, the second channel, and the third channel.

When determining the transmit power of the uplink information and the transmit power of the target information based on the target information and the priorities of the uplink transmission and the sidelink transmission, the processor is specifically configured to: if the channels in descending order of priority are sequentially: the first channel, the second channel, and the third channel, adjust a transmit power of the fourth information based on the transmit power of the target information, and adjust a transmit power of the fifth information based on the transmit powers of the target information and the fourth information, or if the channels in descending order of priority are sequentially: the second channel, the first channel, and the third channel, adjust the transmit power of the target information based on a transmit power of the fourth information, and adjust a transmit power of the fifth information based on the transmit powers of the fourth information and the target information, or if the channels in descending order of priority are sequentially: the second channel, the third channel, and the first channel, adjust a transmit power of the fifth information based on a transmit power of the fourth information, and adjust the transmit power of the target information based on the transmit powers of the fourth information and the fifth information.

According to a fourth aspect, an embodiment of this application further provides a computer-readable storage medium, including instructions, and when the instructions are run on a computer, the computer is enabled to perform the method according to the first aspect or any possible design in the first aspect.

According to a fifth aspect, an embodiment of this application further provides a chip system. The chip system includes a processor, and may further include a memory, and is configured to implement the method according to the first aspect or any possible design of the first aspect. The chip system may include a chip, or may include a chip and another discrete device.

According to a sixth aspect, an embodiment of this application further provides a computer program product, including instructions, and when the instructions are run on a computer, the computer is enabled to perform the method according to the first aspect or any possible design in the first aspect.

According to a seventh aspect, an embodiment of this application provides a system, where the system includes the terminal device and the network device according to the second aspect or the third aspect.

DETAILED DESCRIPTION OF ILLUSTRATIVE EMBODIMENTS

The following describes the technical solutions in the embodiments of this application with reference to the accompanying drawings in the embodiments of this application.

Figure 1:
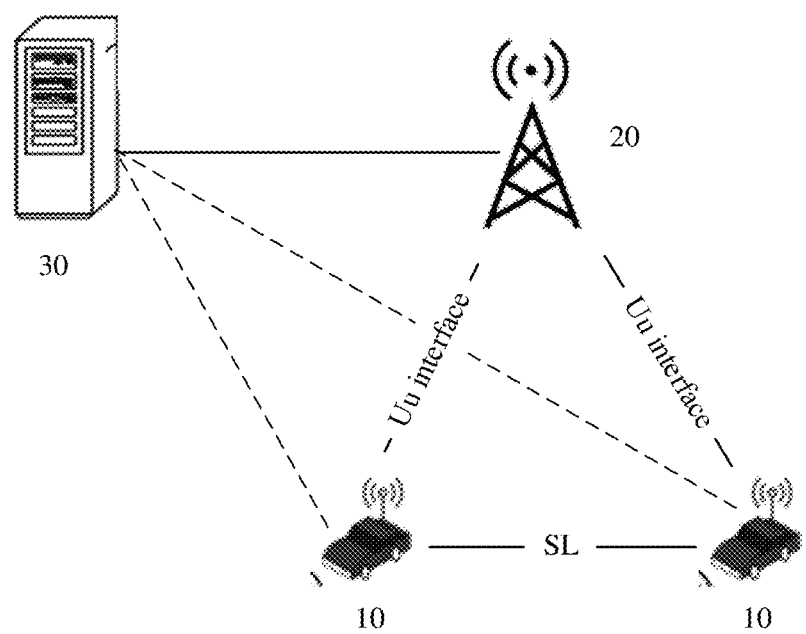
FIG. 1 is a schematic diagram of a network architecture according to an embodiment of this application.

FIG. 1 is a schematic diagram of a possible network architecture to which an embodiment of this application is applicable. The network architecture includes terminal devices 10 and a network device 20.

There are two or more terminal devices 10, and sidelink (SL) information may be transmitted between different terminal devices through a sidelink. The sidelink information may include data and/or scheduling assignment (SA). Optionally, the data may also be referred to as data information, and the scheduling assignment may also be referred to as scheduling assignment information. Optionally, the sidelink information may further include sidelink feedback information. For example, the sidelink feedback information may include at least one of channel state information (CSI) and hybrid automatic repeat request (HARQ) information. The HARQ information may include an acknowledgement (ACK) or a negative acknowledgement (NACK).

The terminal device 10 may transmit uplink information to an access network device through a Uu interface, where the uplink information may include uplink data information and/or uplink control information. The Uu interface may be understood as a universal UE to network interface. Transmission over the Uu interface may include uplink transmission and downlink transmission. The uplink transmission may mean that the terminal device sends a signal to the access network device, and the downlink transmission may mean that the access network device sends a signal to the terminal device. The signal transmitted in the uplink transmission may be referred to as uplink information or an uplink signal, and the signal transmitted in the downlink transmission may be referred to as downlink information or a downlink signal.

In a long term evolution (LTE) system, there is a scenario in which SL transmission and uplink transmission coexist. For example, in a scheduling unit, a terminal device may support both uplink transmission with the access network device 20 and SL transmission with another terminal device. To reduce interference between a plurality of transmit ends, power control needs to be performed.

Figure 2:
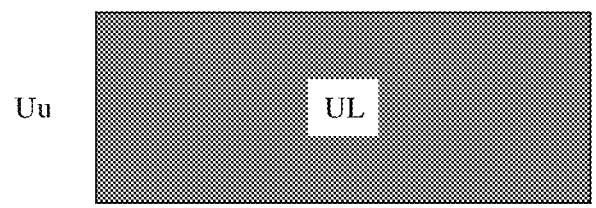
FIG. 2 is a schematic diagram of Uu transmission and SL transmission according to an embodiment of this application.
Figure 2:
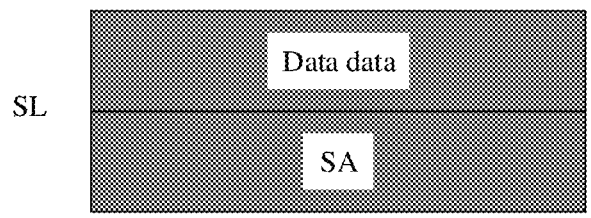

In the LTE system, scheduling units of the uplink transmission and the SL transmission both are 1 subframe. For example, as shown in FIG. 2, a frequency division multiplexing mode may be used between SL data and sidelink scheduling assignment (SL SA), and uplink transmission overlaps with the SL SA and the SL data in time domain. A transmit end may perform power control in the following manner: determining priorities of the uplink transmission and the SL transmission, and then adjusting a transmit power of the uplink transmission, a transmit power of the SL data, and/or a transmit power of the SL SA based on the priorities, so that a sum of the transmit power of the uplink transmission, the transmit power of the SL data, and the transmit power of the SL SA does not exceed a maximum transmit power of the terminal device. For example, if the priority of the uplink transmission is higher than the priority of the SL transmission, the transmit end may adjust the transmit powers of the SL data and the SL SA based on the transmit power of the uplink transmission, so that the sum of the transmit power of the uplink transmission, the transmit power of the SL data, and the transmit power of the SL SA does not exceed the maximum transmit power.

In a new radio (NR) system, the following scenario is proposed: uplink transmission over a Uu interface is scheduled more flexibly, a scheduling time unit may be a symbol, and a multiplexing mode between the SL data and the SL SA is more flexible. The NR system may also be referred to as a fifth generation (5G) mobile communications system. In time domain, the uplink transmission may overlap with only the SL SA, or overlap with only the SL data, or overlap with both the SL SA and the SL data. In this scenario, how to perform power control is a technical problem to be resolved in this application.

Optionally, in the network architecture shown in FIG. 1, the network architecture may further include a network management system 30. The terminal device 10 may communicate with the network management system 30 through a wired interface or a wireless interface. For example, in an implementation, the terminal device 10 may communicate with the network management system 30 through the access network device 20. During specific implementation, the network management system 30 may be a network management system of an operator. Likewise, the network management system 30 may also communicate with the terminal device 10 through a wired interface or a wireless interface. For example, in an implementation, the network management system 30 may communicate with the terminal 10 through the access network device 20.

The following explains and describes some communication nouns or terms used in this application. The communication nouns or terms are also used as a part of the invention content of this application.

1. Terminal Device

A terminal device may be referred to as a terminal for short, and is a device having a wireless transceiver function. The terminal device may be deployed on land, including an indoor device, an outdoor device, a handheld device, or a vehicle-mounted device, or may be deployed on water (for example, on a ship), or may be deployed in the air (for example, on a plane, a balloon, or a satellite). The terminal device may be a mobile phone, a tablet computer (pad), a computer with a wireless receiving/sending function, a virtual reality (VR) terminal device, an augmented reality (AR) terminal device, a wireless terminal device in industrial control, a wireless terminal device in self-driving, a wireless terminal device in remote medical, a wireless terminal device in smart grid, a wireless terminal device in transportation safety, a wireless terminal device in smart city, a wireless terminal device in smart home, and may further include user equipment (UE) and the like. Alternatively, the terminal device may be a cellular phone, a cordless phone, a session initiation protocol (SIP) phone, a wireless local loop (WLL) station, a personal digital assistant (PDA), a handheld device having a wireless communications function, a computing device or another processing device connected to a wireless modem, a vehicle-mounted device, a wearable device, a terminal device in a future fifth generation (5G) network, a terminal device in a future evolved public land mobile network (PLMN), or the like. The terminal device sometimes may also be referred to as a terminal device, user equipment (UE), an access terminal device, a vehicle-mounted terminal device, an industrial control terminal device, a UE unit, a UE station, a mobile station, a mobile console, a remote station, a remote terminal device, a mobile device, a UE terminal device, a terminal device, a wireless communications device, a UE agent, a UE apparatus, or the like. The terminal device may be fixed or movable. This is not limited in the embodiments of this application.

In the embodiments of this application, an apparatus configured to implement a function of the terminal may be a terminal, or an apparatus that can support the terminal in implementing the function, for example, a chip system. The apparatus may be installed on the terminal. In the embodiments of this application, the chip system may include a chip, or may include a chip and another discrete component. In the technical solutions provided in the embodiments of this application, an example in which the apparatus configured to implement the function of the terminal is a terminal and the terminal is UE is used to describe the technical solutions provided in the embodiments of this application.

2. Network Device

A network device may be an access network device. The access network device may also be referred to as a radio access network (RAN) device, and is a device that provides a wireless communications function for a terminal device. For example, the access network device includes but is not limited to: a next-generation NodeB (gNB) in 5G, an evolved NodeB (eNB), a radio network controller (radio network controller, RNC), a NodeB (NB), a base station controller (BSC), a base transceiver station (BTS), a home base station (for example, a home evolved NodeB, or a home NodeB, HNB), a baseband unit (BBU), a transmitting and receiving point (TRP), a transmission point (TP), and a mobile switching center. Alternatively, the access network device may be a radio controller, a centralized unit (CU), and/or a distributed unit (DU) in a cloud radio access network (CRAN) scenario, or the network device may be a relay station, an access point, a vehicle-mounted device, a terminal device, a wearable device, a network device in a future 5G network, a network device in a future evolved PLMN network, or the like. The terminal device may communicate with a plurality of access network devices that use different technologies. For example, the terminal device may communicate with an access network device that supports long term evolution (LTE), or may communicate with an access network device that supports 5G, or may be dual-connected to an access network device that supports LTE and an access network device that supports 5G. This is not limited in the embodiments of this application.

In the embodiments of this application, an apparatus configured to implement a function of the network device may be a network device, or an apparatus that can support the network device in implementing the function, for example, a chip system. The apparatus may be installed on the network device. In the technical solutions provided in the embodiments of this application, an example in which the apparatus configured to implement the function of the network device is a network device, and the network device is a base station is used to describe the technical solutions provided in the embodiments of this application.

3. Sidelink (SL)

A sidelink is used for communication between terminal devices, and may include a physical sidelink shared channel (PSSCH) and a physical sidelink control channel (PSCCH). The PSSCH is used to carry sidelink data (SL data), the PSCCH is used to carry sidelink control information (SCI), and the SCI may also be referred to as sidelink scheduling assignment (SL SA). The SL SA is data scheduling-related information, for example, is used to carry information such as resource assignment and/or a modulation and coding scheme (MCS) of the PSSCH.

Optionally, the sidelink communication may further include a physical sidelink uplink control channel (PSUCCH). The physical sidelink uplink control channel may also be referred to as a sidelink uplink control channel for short. The physical sidelink uplink control channel may also be referred to as a physical sidelink feedback channel (PSFCH). The physical sidelink feedback channel may also be referred to as a sidelink feedback channel for short. The sidelink uplink control channel or the sidelink feedback channel may be used to transmit sidelink feedback control information (SFCI). The sidelink feedback control information may also be referred to as sidelink feedback information for short, or may also be referred to as sidelink uplink control information (SL UCI). The sidelink feedback control information may include at least one of channel state information (CSI), hybrid automatic repeat request (HARQ) information, and the like. The HARQ information may include an acknowledgement (ACK) or a negative acknowledgement (NACK). In the embodiments of this application, "at least one" may be one, two, three, or more. This is not limited in the embodiments of this application.

4. Uu Interface

A Uu interface is used for communication between a terminal device and an access network device, and the Uu interface may also be referred to as Uu for short. In Uu interface communication, a channel on which the access network device sends information to the terminal device is referred to as a downlink (DL) channel, and the downlink channel may include at least one of a physical downlink shared channel (PDSCH) and a physical downlink control channel (PDCCH). The PDCCH is used to carry downlink control information (DCI), and the PDSCH is used to carry downlink data. A channel on which the terminal device sends information to the access network device is referred to as an uplink (UL) channel, and the uplink channel may include at least one of a physical uplink shared channel (PUSCH) and a physical uplink control channel (PUCCH). The PUSCH is used to carry uplink data. The uplink data may also be referred to as uplink data information. The PUCCH is used to carry uplink control information (UCI) fed back by the terminal device. For example, the UCI may include channel state information (CSI), an ACK, and/or a NACK that are fed back by the terminal device. Transmission over the Uu interface may include uplink transmission and downlink transmission. The uplink transmission means that the terminal device sends information to the access network device, and the downlink transmission means that the access network device sends information to the terminal device. The information in the uplink transmission may be uplink information or an uplink signal. The uplink information or the uplink signal may include at least one of a PUSCH, a PUCCH, and a sounding reference signal (SRS). The information in the downlink transmission may be downlink information or a downlink signal. The downlink information or the downlink signal may include at least one of a PDSCH, a PDCCH, a channel state information reference signal (CSI-RS), and a phase tracking reference signal (PTRS).

5. Scheduling Unit

A scheduling unit may also be referred to as a scheduling time unit. The scheduling unit may include one or more time domain units. The time domain unit may include time domain units such as a radio frame, a subframe, a slot, a mini-slot, and a symbol. A radio frame may include one or more subframes, and a subframe may include one or more slots.

A numerology may include a subcarrier spacing, a cyclic prefix (CP) type, and/or the like. The CP type may also be referred to as a CP length, or referred to as a CP for short. The CP type may be an extended CP or a normal CP. A slot for an extended CP may include 12 time domain symbols, and a slot for a normal CP may include 14 time domain symbols. The time domain symbol may be referred to as a symbol for short. The time domain symbol may be an orthogonal frequency division multiplexing (OFDM) symbol or may be a discrete Fourier transform spread orthogonal frequency division multiplexing (DFT-s-OFDM) symbol. In the embodiments of this application, an example in which the time domain symbol is an OFDM symbol may be used for description.

As shown in Table 1, in an NR system, five numerologies may be supported, and are numbered 0 to 4. A numerology corresponding to a number 0 is: a subcarrier spacing is 15 kHz, and a CP is a normal CP. A numerology corresponding to a number 1 is: a subcarrier spacing is 30 kHz, and a CP is a normal CP. A numerology corresponding to a number 2 is: a subcarrier spacing is 60 kHz, and a CP is a normal CP or an extended CP. A numerology corresponding to a number 3 is: a subcarrier spacing is 120 kHz, and a CP is a normal CP. A numerology corresponding to a number 4 is: a subcarrier spacing is 240 kHz, and a CP is a normal CP.

TABLE 1

Supported numerologies

| μ | Δf = $2^μ \cdot 15$ [kHz] | Cyclic prefix (CP) |
|---|---|---|
| 0 | 15 | Normal |
| 1 | 30 | Normal |
| 2 | 60 | Normal, extended |
| 3 | 120 | Normal |
| 4 | 240 | Normal |

There may be different slot lengths for different subcarrier spacings. For example, when a subcarrier spacing is 15 kHz, a slot may be 1 millisecond (ms), and when the subcarrier spacing is 30 kHz, a slot may be 0.5 ms. A slot may include one or more symbols. For example, a slot for a normal cyclic prefix (CP) may include 14 symbols, and a slot for an extended CP may include 12 symbols. A mini-slot may be a unit smaller than a slot, and a mini-slot may include one or more symbols. For example, a mini-slot may include two symbols, four symbols, seven symbols, or the like. A slot may include one or more mini-slots.

Figure 3:
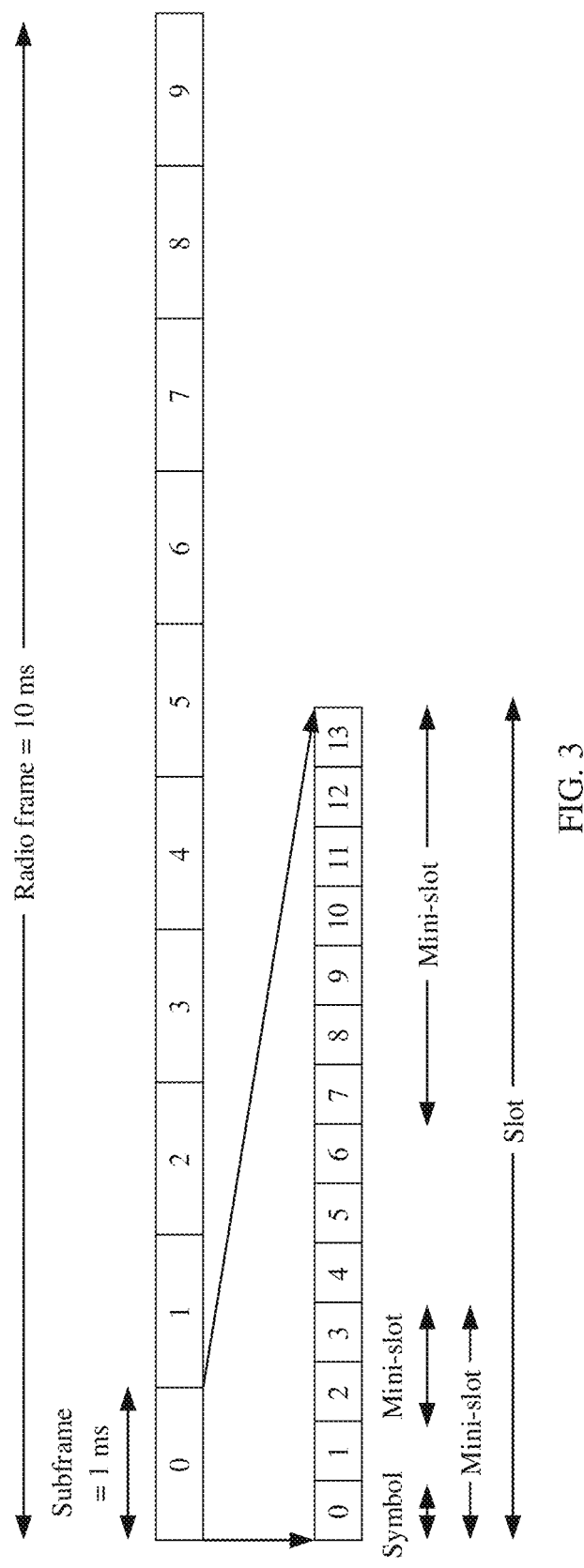
FIG. 3 is a schematic diagram of a scheduling time unit according to an embodiment of this application.

As shown in FIG. 3, using a 15 kHz subcarrier spacing as an example, a radio frame may last for 10 ms, each subframe may last for 1 ms, a radio frame includes 10 subframes, each slot lasts for 1 ms, each subframe may include one slot, and each slot may include 14 symbols. Further, a mini-slot may include four symbols, two symbols, seven symbols, or the like.

Slot features under different numerologies are shown in Table 2. $N_{symb}^{slot}$ represents a quantity of symbols included in a slot, and a symbol number (or referred to as an index) in a slot is 0 to $N_{symb}^{slot}-1$. For example, there may be 14 symbols in a slot for a normal CP, and there may be 12 symbols in a slot for an extended CP. A radio frame may be 10 ms, a radio frame may include 10 subframes, and a subframe is 1 ms. $N_{slot}^{frame,\mu}$ represents a quantity of slots included in a radio frame in a numerology μ, and a slot number (or referred to as an index) $n_s^\mu$ in a radio frame is 0 to $N_{slot}^{frame,\mu}-1$. $N_{slot}^{subframe,\mu}$ represents a quantity of slots included in a subframe in the numerology μ, and a slot number $n_{s,f}^\mu \in \{0, \ldots, N_{slot}^{frame,\mu}-1\}$ in one radio frame is 0 to $N_{slot}^{subframe,\mu}-1$.

TABLE 2

Slot feature in a numerology for a normal CP

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

6. Sidelink Transmission

Sidelink transmission may be communication between terminal devices. The sidelink transmission may be applied to a vehicle to X (V2X) scenario, where X may refer to any object. For example, vehicle to X communication may include vehicle to vehicle (V2V) communication, vehicle to infrastructure (V2I) communication, vehicle to pedestrian (V2P) communication, vehicle to network (V2N) communication, and the like. The vehicle to X may also be referred to as a cooperative-intelligent transport system (C-ITS). Alternatively, the sidelink transmission may be applied to device-to-device (D2D) communication. The D2D may mean direct communication implemented between terminal devices by using a technology such as a wireless network, Bluetooth, or D2D transmission.

7. Base Station Scheduling Mode for a Sidelink SL

In a base station scheduling mode, a network device may configure SL resources for transmit end UE and/or receive-end UE by using configuration information, where the SL resources include one or more resource pools. In the embodiments of this application, "a plurality of" may be two, three, or more. This is not limited in the embodiments of this application. The network device may indicate, to the transmit end UE by using DCI, a resource that is in a resource pool and that is used for sidelink communication. When receiving the DCI, the transmit end UE may send SL information to the receive-end UE by using the resource that is in the resource pool and that is indicated by using the DCI. The SL information may include SL data, SCI, SFCI, and/or the like. Correspondingly, the receive end may receive the SL information. The network device may be a base station, a network management system of an operator, or the like.

Figure 27:
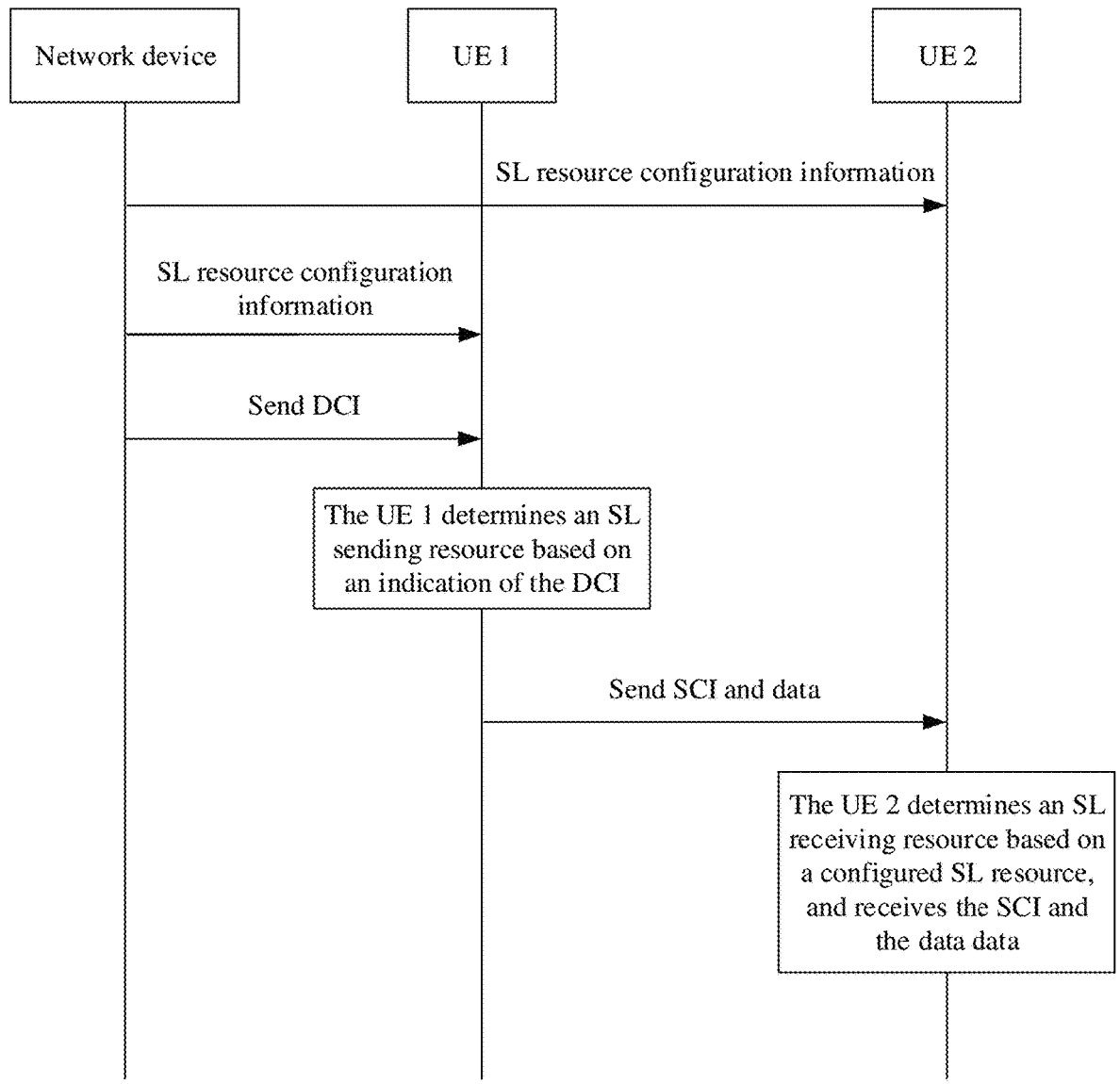
FIG. 27 is a flowchart of a base station scheduling mode according to an embodiment of this application.

As shown in FIG. 27, the network device may configure SL resources for UE 1 and UE 2, and the network device may send DCI to the UE 1. The UE 1 may determine an SL sending resource based on an indication of the DCI, and send SCI and/or SL data on the SL sending resource. The UE 2 determines an SL receiving resource based on the configured SL resource, receives the SCI on the SL receiving resource, and receives SL data on the receiving resource based on the SCI. Optionally, after receiving the SL data, the UE 2 may send SFCI to the UE 1. For example, if the UE 2 correctly receives the SL data, the SFCI may include an acknowledgement ACK, if the UE 2 does not correctly receive the SL data, the SFCI may include a negative acknowledgement NACK, and so on.

In an example, the network device may configure SL resources for UE 1, UE 2, and UE 3, and the network device may assign SL sending resources to the UE 3 and the UE 1 by using DCI. The UE $_3$ may send an SL signal to the UE 1 on the SL sending resource. For example, the SL signal may include SCI and/or SL data. After the UE 1 receives the SL signal, the UE 1 may send SFCI to the UE$_3$. Optionally, the UE 1 may send an SL signal to the UE 2 on the SL sending resource at the same time. For example, the SL signal may include SCI and/or SL data. After the UE 2 receives the SL signal, the UE 2 may send SFCI to the UE 1.

Optionally, the base station scheduling mode may also be referred to as a base station-assisted scheduling mode.

8. UE Autonomous Selection Mode for a Sidelink SL

In a UE autonomous selection mode, a network device may configure SL resources for transmit end UE and/or receive-end UE by using configuration information, where the SL resources include one or more resource pools. The transmit end UE performs sensing in the configured SL resources. If the transmit end UE senses that there is an available resource in the SL resources, the transmit end UE sends SL information on the available resource. Correspondingly, the receive-end UE receives the SL information on the SL resource.

Figure 28:
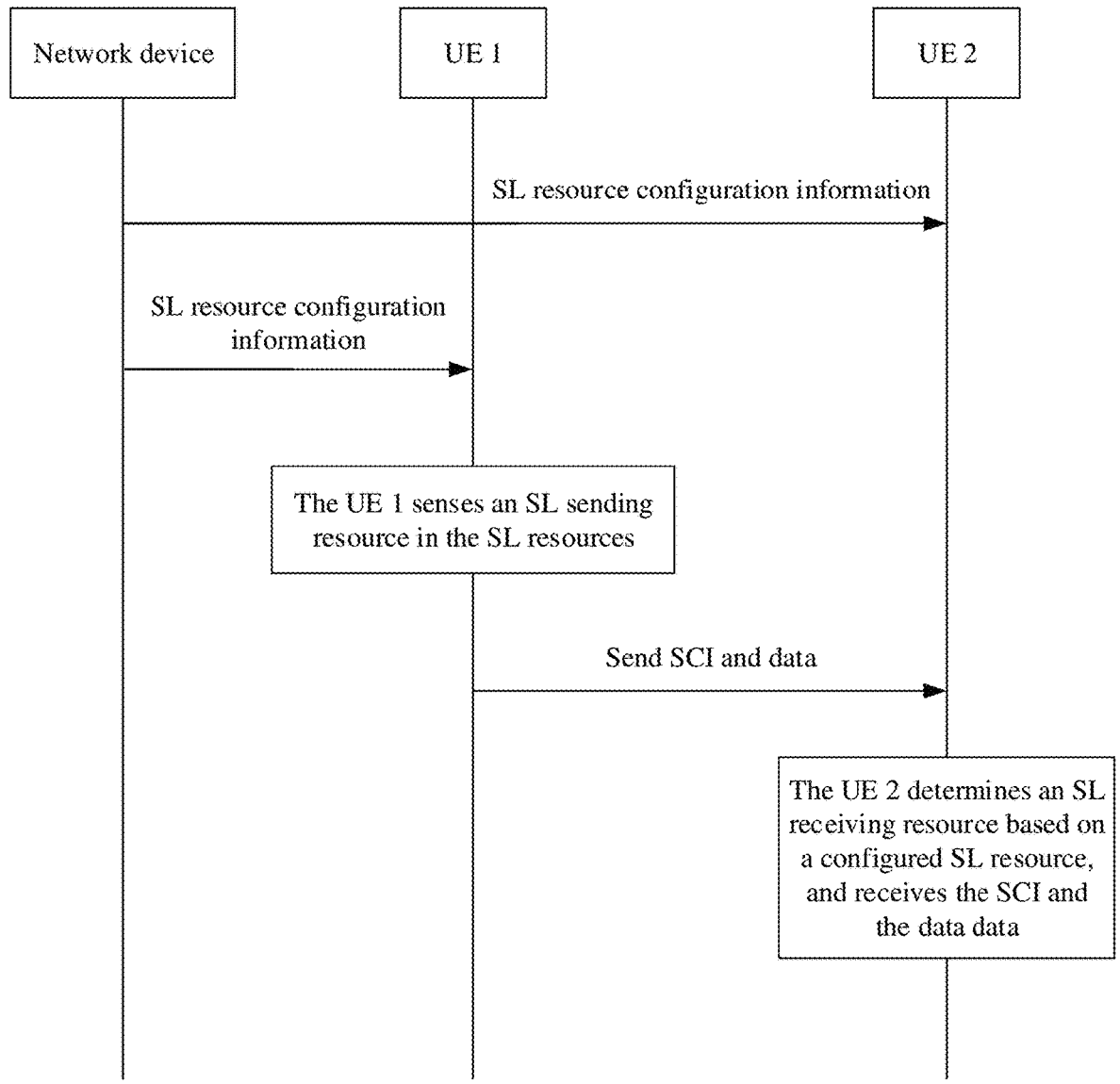
FIG. 28 is a flowchart of a UE automatic selection mode according to an embodiment of this application.

As shown in FIG. 28, a network device may configure SL resources for UE 1 and UE 2, and the UE 1 senses an SL sending resource in the configured SL resources, and sends SCI and/or SL data on the SL sending resource. Correspondingly, the UE 2 receives the SCI and/or the SL data based on the configured SL resources. Optionally, after receiving the SL data, the UE 2 may sense an SL sending resource in the configured SL resources, and send SFCI and the like to the UE 1 on the SL sending resource.

Similar to the foregoing base station scheduling mode for the sidelink SL, when the UE 1 is used as a transmit end to send the SL data information to the UE 2 on the SL sending resource, the UE 1 may also be used as a receive end to receive SL data information sent by the UE 3. Optionally, at the same time, the UE 1 may send SFCI to the UE3 on the SL sending resource. For detailed description, refer to the description of the base station scheduling mode of the sidelink SL. Details are not described herein again.

The embodiments of this application are applicable to both a homogeneous network scenario and a heterogeneous network scenario, and no limitation is imposed on a transmission point. Coordinated multipoint transmission may be performed between macro base stations, between micro base stations, or between a macro base station and a micro base station. This application is applicable to both a low-frequency scenario (for example, sub 6G) and a high-frequency scenario (above 6G). It should be noted that the noun "transmission" in this application may include sending and/or receiving of data and/or control information. Words such as "first" and "second" are merely used for distinction and description, and shall not be understood as an indication or implication of relative importance or an indication or implication of an order.

Figure 4:
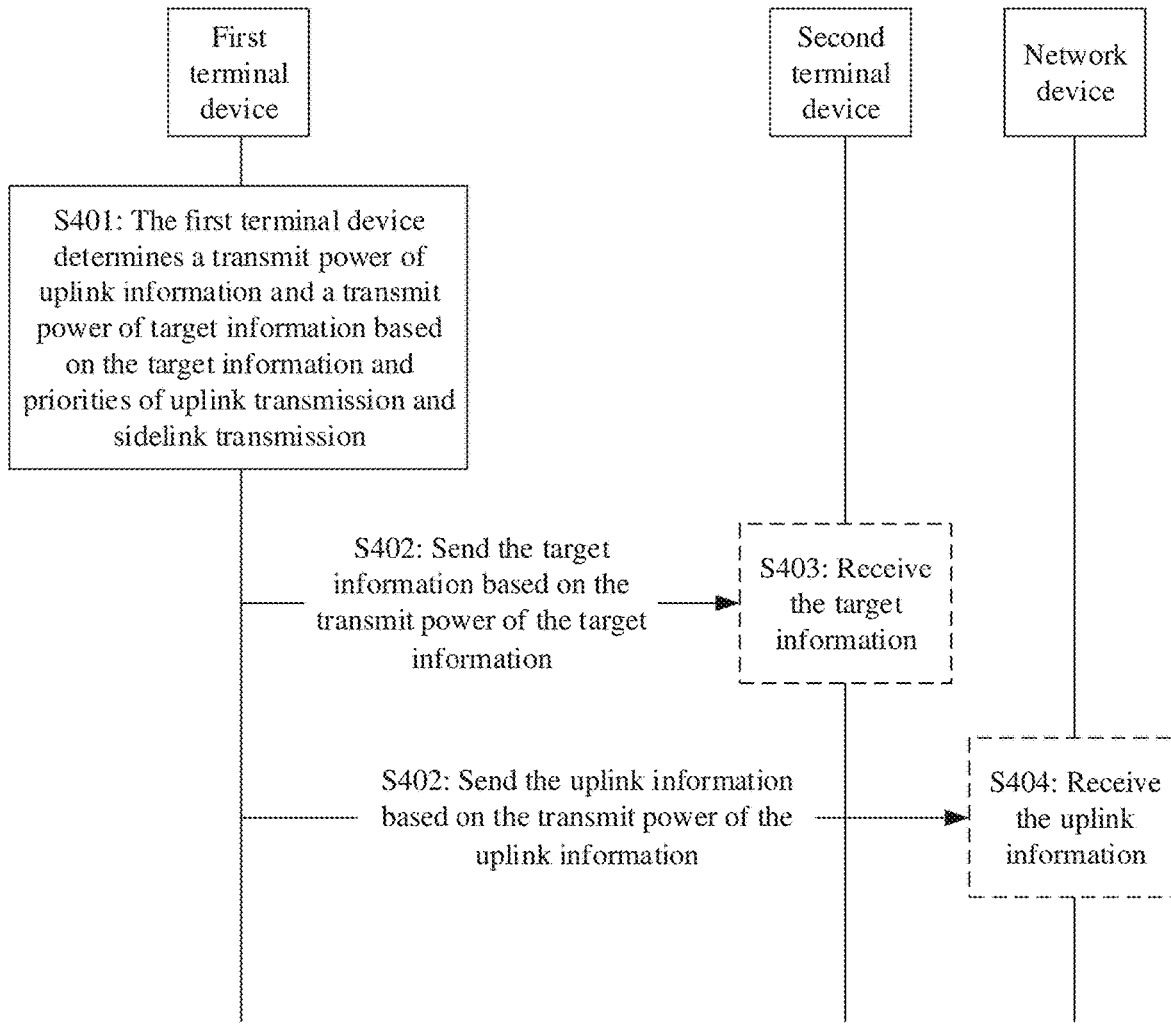
FIG. 4 is a flowchart of a power control method according to an embodiment of this application.

As shown in FIG. 4, this application provides a procedure of a power control method. A first terminal device and a second terminal device in the procedure may be the terminal devices 10 in the procedure shown in FIG. 1, and a network device may be the access network device 20 in the procedure shown in FIG. 1. The procedure may be specifically as follows:

S401: The first terminal device determines a transmit power of uplink information and a transmit power of target information based on the target information and priorities of uplink transmission and sidelink transmission.

The uplink transmission includes: transmitting the uplink information by the first terminal device to the network device. For example, the first terminal device may transmit the uplink information to the network device through a Uu interface, and the uplink information includes uplink control information and/or uplink data information. The sidelink transmission includes: transmitting sidelink information by the first terminal device to the second terminal device. For example, the first terminal device may transmit the sidelink information to the second terminal device through a sidelink. The sidelink information may include at least one of data information, scheduling assignment SA information, or sidelink feedback information. The data information may also be referred to as data for short. The data information may be information carried on a PSSCH, or this is described as: the PSSCH may be used to carry the data information. The SA may be information carried on a PSCCH, or this is described as: the PSCCH may be used to carry the SA. The SA may also be referred to as SCI. The sidelink feedback information may be information carried on a PSUCCH, or this is described as: the PSUCCH may be used to carry the sidelink feedback information. The sidelink feedback information may include at least one of CSI, HARQ information, or the like. For example, the HARQ information may include an ACK and/or a NACK.

The target information may be described as information that is in the sidelink information and that overlaps with the uplink information in time domain in a scheduling time unit. Alternatively, this is described as: a feature of the target information is that the target information overlaps with the uplink information in time domain in the sidelink information. Overlapping in time domain may also be referred to as coexisting in time domain, or may be referred to as coexisting for short. That is, the target information and the uplink information coexist in one time domain unit. The time domain may also be a time domain unit, for example, a symbol, a slot, a mini-slot, or a subframe. Optionally, the target information may include at least one of data information, scheduling assignment SA information, or sidelink feedback information. The scheduling time unit may be a scheduling time unit for sidelink transmission, and the scheduling time unit for sidelink transmission may be a time unit for scheduling sidelink transmission or a time unit for sidelink transmission. Alternatively, the scheduling time unit may be a scheduling time unit for uplink transmission, and the scheduling time unit for uplink transmission may be a time unit for scheduling uplink transmission or a time unit for uplink transmission. Alternatively, the scheduling time unit may be a time unit on which the time unit for sidelink transmission overlaps with the time unit of uplink transmission. Optionally, the scheduling time unit for sidelink transmission and the scheduling time unit for uplink transmission may completely or partially overlap, or may be completely non-overlapping, or the like.

It may be understood that the priorities of the uplink transmission and the sidelink transmission may also be priorities of the uplink information and the sidelink information, or may be priorities of the Uu interface and the SL. The transmit power of the uplink information may also be referred to as a transmit power of the uplink transmission, or may be referred to as a transmit power of the Uu interface. Meanings of the foregoing three descriptions in this application may be equivalent. The transmit power may also be referred to as a sending power, a transmission power, a power for short, a power value, or the like.

For example, if the priority of the sidelink transmission is higher than the priority of the uplink transmission, the first terminal device adjusts the transmit power of the uplink information based on the transmit power of the target information. If the priority of the uplink transmission is higher than the priority of the sidelink transmission, the first terminal device adjusts the transmit power of the target information based on the transmit power of the uplink information.

It should be noted that the priority of the sidelink transmission is higher than the priority of the uplink transmission may also mean that the priority of the sidelink (SL) is higher than the priority of the Uu. That the priority of the uplink transmission is higher than the priority of the sidelink transmission may also mean that the priority of the Uu is higher than the priority of the sidelink (SL).

S402: The first terminal device sends the uplink information based on the transmit power of the uplink information, and/or sends the target information based on the transmit power of the target information.

For example, if the first terminal device sends the uplink information and the target information, in the flowchart in FIG. 4, the method further includes the following steps:

S403: The second terminal device receives the target information. S404: The network device receives the uplink information.

For example, if the first terminal device sends only the uplink information, in the flowchart in FIG. 4, the method further includes S404: The network device receives the uplink information. If the first terminal device sends only the target information, in the procedure in FIG. 4, the method further includes S403: The second terminal device receives the target information.

Optionally, in a possible scenario in which the first terminal device sends only the uplink information, an adjusted transmit power of the target information is 0. Optionally, in a possible scenario in which the first terminal device sends only the target information, an adjusted transmit power of the uplink information is 0.

It can be learned from the foregoing that, in this embodiment of this application, different coexistence scenarios are considered for different cases of the priority of the uplink transmission and the priority of the sidelink transmission, power control is properly and efficiently performed based on the scenarios, to meet a transmission requirement, reduce interference, and improve transmission performance.

In this embodiment of this application, the solution of the procedure in FIG. 4 may include: The first terminal device determines the priorities of the uplink transmission and the sidelink transmission (for details, refer to Embodiment 1). The first terminal device determines the target information that is in the sidelink information and that overlaps with the uplink information in time domain in a scheduling time unit (for details, refer to Embodiment 2). The first terminal device calculates the transmit powers of the target information and the uplink information (for details, refer to Embodiment 3). The first terminal device adjusts the transmit power of the uplink information and/or the transmit power of the target information based on the priorities of the uplink transmission and the sidelink transmission (for details, refer to Embodiment 2). Different embodiments may be used separately, or may be used in combination with each other. The use of the embodiments separately or in combination shall fall within the protection scope of the embodiments of this application.

Embodiment 1

Example 1

The network device sends first configuration information, and correspondingly, the first terminal device receives the first configuration information. The first configuration information is used to configure the priorities of the uplink transmission and the sidelink transmission. For example, the first configuration information may be used to configure the priority of the uplink transmission to be higher than the priority of the sidelink transmission, or the first configuration information may be used to configure the priority of the uplink transmission to be lower than the priority of the sidelink transmission. "Higher than" may mean "greater than", or "higher than" may mean "greater than or equal to". "Lower than" may mean "less than", or "lower than" may mean "less than or equal to".

Example 2

The first terminal device may determine the priorities of the uplink transmission and the sidelink transmission according to a predefined rule. For example, the predefined rule may specify that the priority of the uplink transmission is higher than the priority of the sidelink transmission, or the predefined rule may specify that the priority of the sidelink transmission is higher than the priority of the uplink transmission.

Example 3

The network device may send second configuration information, and correspondingly, the first terminal device receives the second configuration information.

The second configuration information is used to indicate a first threshold. The first terminal device determines the priorities of the uplink transmission and the sidelink transmission based on a value relationship between the first threshold and a priority of a data packet corresponding to the target information. For example, if the priority of the data packet is less than or equal to (or less than) the first threshold, the priority of the sidelink transmission is higher than the priority of the uplink transmission. If the priority of the data packet is greater than (or greater than or equal to) the first threshold, the priority of the uplink transmission is higher than the priority of the sidelink transmission.

It should be noted that, in the foregoing examples, that the priority of the sidelink transmission is higher than the priority of the uplink transmission may also be described as: the priority of the uplink transmission is lower than the priority of the sidelink transmission. That the priority of the uplink transmission is higher than the priority of the sidelink transmission may also be described as: the priority of the sidelink transmission is lower than the priority of the uplink transmission.

Embodiment 2

In this embodiment of this application, the sidelink information may include at least one of data information, scheduling assignment information, or sidelink feedback information. In a scheduling unit, information that is in the sidelink information and that overlaps with the uplink information in time domain is referred to as target information. The target information may include only one type of information in the foregoing information, or include two types of information in the foregoing information, or include the foregoing three types of information.

Example 1

The target information includes only one type of information in the foregoing information. For example, the information may be data information, scheduling assignment information, or sidelink feedback information. Correspondingly, if the priority of the sidelink transmission is higher than the priority of the uplink transmission, the first terminal device adjusts the transmit power of the uplink information based on the transmit power of the target information, where a sum of the transmit power of the uplink information and the transmit power of the target information does not exceed a maximum transmit power of the first terminal device. Alternatively, if the priority of the uplink transmission is higher than the priority of the sidelink transmission, the first terminal device adjusts the transmit power of the target information based on the transmit power of the uplink information, where a sum of the transmit power of the uplink information and the transmit power of the target information does not exceed a maximum transmit power of the first terminal device. It may be understood that "not exceeding" may also be described as "less than", "less than or equal to", or the like.

For example, in this embodiment of this application, Uu is used to represent the uplink transmission, SL is used to represent the sidelink transmission, UL is used to represent the uplink information in the uplink transmission, data is used to represent data information in the sidelink transmission, SA is used to represent scheduling assignment information in the sidelink transmission, and SFCI is used to represent sidelink feedback information in the sidelink transmission.

Figure 5:
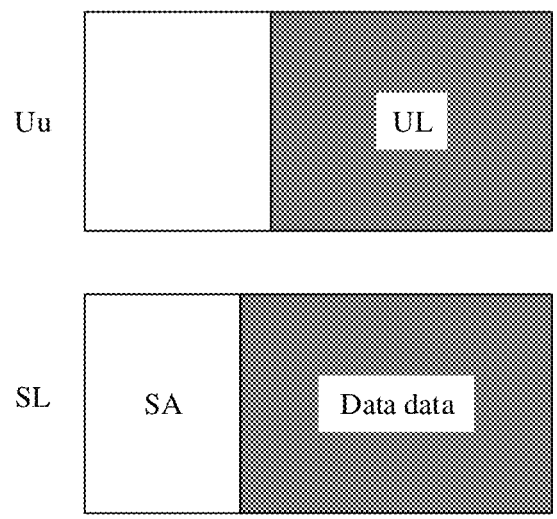
FIG. 5 to FIG. 26 are schematic diagrams of Uu transmission and SL transmission according to an embodiment of this application.

As shown in FIG. 5, the sidelink information in the sidelink transmission includes SA and data, and a time division multiplexing (TDM) mode is used between the SA and the data. In a scheduling unit, the uplink information UL in the uplink transmission overlaps with the data in time domain. In other words, the target information includes only the data. The first terminal device may separately calculate the transmit power $P_{UL}$ of the uplink information and a transmit power $P_{data}$ of the data. If the priority of the uplink transmission is higher than the priority of the SL transmission, the first terminal device may adjust $P_{data}$ based on $P_{UL}$, and the power adjustment for the data needs to meet that $P_{UL}+P_{data}$ is less than or equal to the maximum transmit power of the first terminal device. For example, in an implementation, the transmit power $P_{UL}$ remains unchanged, and the transmit power of the SL data is decreased. If the priority of the SL transmission is higher than the priority of the uplink transmission, the first terminal device may adjust $P_{UL}$ based on $P_{data}$, and the power adjustment for the uplink transmission needs to meet that $P_{UL}+P_{data}$ is less than or equal to the maximum transmit power of the first terminal device. For example, in an implementation, the transmit power of the SL data remains unchanged, and the transmit power of the uplink transmission is decreased.

Figure 6:
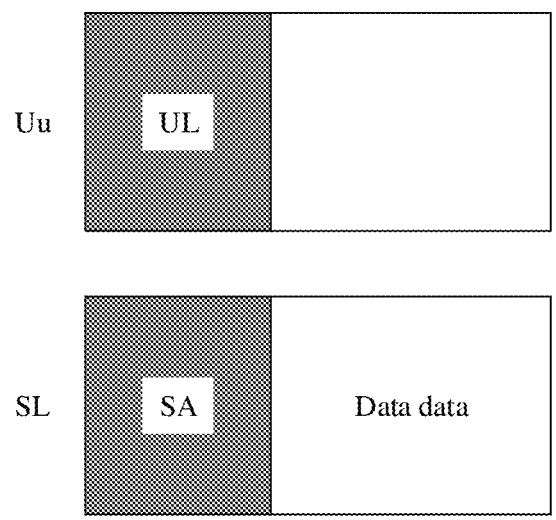

As shown in FIG. 6, the sidelink information in the sidelink transmission includes SA and data, and a TDM mode is used between the SA and the data. In a scheduling unit, the uplink information UL in the uplink transmission overlaps with the SA in time domain. In other words, the target information includes only the SA. The first terminal device may separately calculate the transmit power $P_{UL}$ of the uplink information and a transmit power $P_{SA}$ of the SA. If the priority of the uplink transmission is higher than the priority of the SL transmission, the first terminal device may adjust $P_{SA}$ based on $P_{UL}$, and the power adjustment for the SA needs to meet that $P_{UL}+P_{SA}$ is less than or equal to the maximum transmit power of the first terminal device. For example, in an implementation, the transmit power $P_{UL}$ remains unchanged, and the transmit power $P_{SA}$ is decreased. If the priority of the SL transmission is higher than the priority of the uplink transmission, the first terminal device may adjust $P_{UL}$ based on $P_{SA}$, and the power adjustment for the uplink transmission needs to meet that $P_{UL}+P_{SA}$ is less than or equal to the maximum transmit power of the first terminal device. For example, in an implementation, the transmit power $P_{SA}$ remains unchanged, and the transmit power $P_{UL}$ is decreased.

Figure 7:
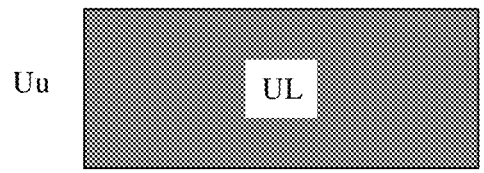
Figure 7:
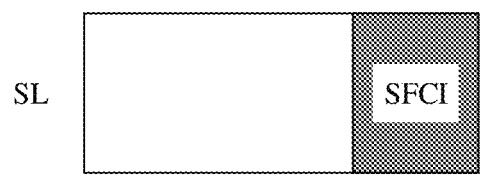

As shown in FIG. 7, the sidelink information in the sidelink transmission includes SFCI. In a scheduling unit, the UL overlaps with the SFCI in time domain. In other words, the target information includes the SFCI. The first terminal device may separately calculate the transmit power $P_{UL}$ of the uplink information and a transmit power $P_{SFCI}$ of the SFCI. If the priority of the uplink transmission is higher than the priority of the SL transmission, the first terminal device may adjust $P_{SFCI}$ based on $P_{UL}$, and the power adjustment of the $P_{SFCI}$ needs to meet that $P_{UL}+P_{SFCI}$ is less than or equal to the maximum transmit power of the first terminal device. If the priority of the SL transmission is higher than the priority of the uplink transmission, the first terminal device may adjust $P_{UL}$ based on $P_{SFCI}$, and the power adjustment for the uplink transmission needs to meet that $P_{UL}+P_{SFCI}$ is less than or equal to the maximum transmit power of the first terminal device.

Figure 8:
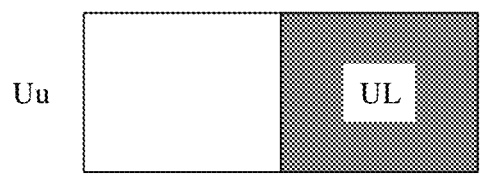
Figure 8:
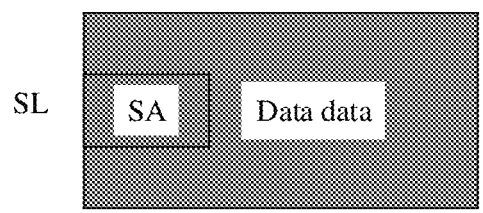

As shown in FIG. 8, the sidelink information in the sidelink transmission includes SA and data, and a frequency division multiplexing (FDM) mode is used between the SA and the data. In a scheduling unit, the UL overlaps with the data in time domain. In other words, the target information includes the data. The first terminal device may separately calculate a transmit power $P_{data}$ on the data symbol and the transmit power $P_{UL}$ of the uplink information. If the priority of the uplink transmission is higher than the priority of the SL transmission, the first terminal device may adjust $P_{data}$ based on $P_{UL}$, and the power adjustment meets that $P_{UL}+P_{data}$ is less than or equal to the maximum transmit power of the first terminal device. If the priority of the SL transmission is higher than the priority of the uplink transmission, the first terminal device may adjust $P_{UL}$ based on the transmit power of the SL data, and the power adjustment meets that $P_{UL}+P_{data}$ is less than or equal to the maximum transmit power of the first terminal device.

Example 2

The target information includes the two types of information in the foregoing information: first information and second information. The first information is data information, scheduling assignment information, or sidelink feedback information, and the second information is data information, scheduling assignment information, or sidelink feedback information. An information type of the first information is the same as or different from an information type of the second information.

Correspondingly, the first terminal device determines a first transmit power based on a transmit power of the first information and/or a transmit power of the second information. For example, if FDM is used between the first information and the second information, the first transmit power may be a sum of the transmit power of the first information and the transmit power of the second information. Alternatively, if TDM is used between the first information and the second information, the first transmit power may be a larger value in the transmit power of the first information and the transmit power of the second information.

Specifically, if the priority of the sidelink transmission is higher than the priority of the uplink transmission, the first terminal device may adjust the transmit power of the uplink information based on the first transmit power. Alternatively, if the priority of the uplink transmission is higher than the priority of the sidelink transmission, the first terminal device may adjust the first transmit power based on the transmit power of the uplink information.

In the following examples shown in FIG. 9 to FIG. 16, an example in which the information type of the first information is different from the information type of the second information is used for description.

Figure 9:
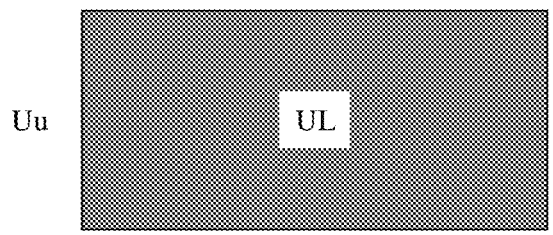
Figure 9:
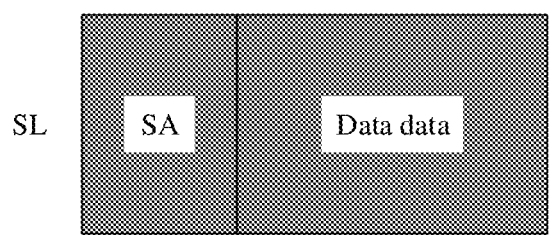

As shown in FIG. 9, the sidelink information in the sidelink transmission includes SA and data. If TDM is used between the SA and the data, in a scheduling unit, the UL overlaps with the SA, and the data on a time domain symbol. In other words, the target information includes the SA and the data. A transmit power on an SA symbol is $P_{SA}$, and a transmit power on a data symbol is, for example, $P_{data}$. $P_{SA}$ and $P_{data}$ may be the same or different. If the priority of the SL transmission is higher than the priority of the uplink transmission, the first terminal device may determine the first transmit power, where the first transmit power is a larger value in $P_{SA}$ and $P_{data}$, and may further adjust a value of $P_{UL}$ based on the first transmit power. For example, if $P_{SA}>P_{data}$, the power adjustment for the uplink transmission needs to meet that $P_{UL}+P_{SA}$ is less than or equal to a maximum transmit power of the first terminal device. If $P_{data}>P_{SA}$, the power adjustment for the uplink transmission needs to meet that $P_{UL}+P_{data}$ is less than or equal to a maximum transmit power of the first terminal device. If the priority of the uplink transmission is higher than the priority of the SL transmission, the first terminal device may adjust the first transmit power based on the power of the uplink transmission. To be specific, the first terminal device may adjust the transmit power of the SA and/or the transmit power of the data based on the power of the uplink transmission, to ensure that a sum of the transmit power of the uplink transmission and a larger value in the transmit power of the SA and the transmit power of the data is less than or equal to a maximum transmit power of the UE. For example, if $P_{SA}>P_{data}$, $P_{UL}+P_{SA}$ is greater than the maximum transmit power of the first terminal device, and $P_{UL}+P_{data}$ is less than or equal to the maximum transmit power of the first terminal device, the first terminal device may adjust the transmit power of the SA based on the power of the uplink transmission, and the power adjustment for the SA needs to meet that the $P_{UL}+P_{SA}$ is less than or equal to the maximum transmit power of the first terminal device. For example, if $P_{data}>P_{SA}$, $P_{UL}+P_{data}$ is greater than the maximum transmit power of the first terminal device, and $P_{UL}+P_{SA}$ is less than or equal to the maximum transmit power of the first terminal device, the first terminal device may adjust the transmit power of the data based on the power of the uplink transmission, and the power adjustment for the data needs to meet that the $P_{UL}+P_{data}$ is less than or equal to the maximum transmit power of the first terminal device. For example, if $P_{UL}+P_{data}$ is greater than the maximum transmit power of the first terminal device, and $P_{UL}+P_{SA}$ is greater than the maximum transmit power of the first terminal device, the first terminal device may adjust the transmit power of the SA and the transmit power of the data based on the power of the uplink transmission, and a larger value in the transmit power of the SA and the transmit power of the data needs to meet that $P_{UL}+\max\{P_{SA}, P_{data}\}$ is less than or equal to the maximum transmit power of the first terminal device.

Figure 10:
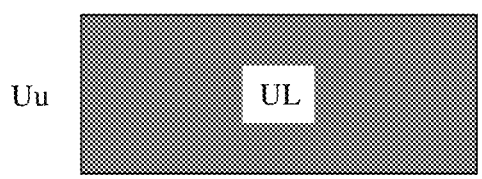
Figure 10:
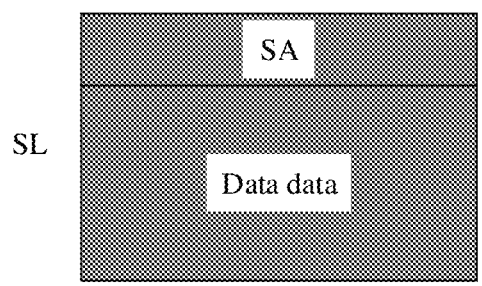
Figure 11:
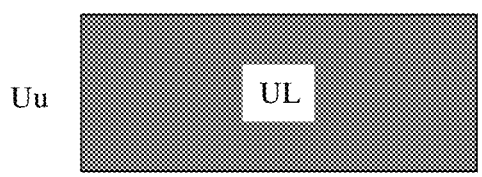
Figure 11:
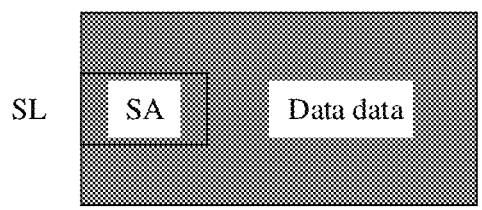
Figure 12:
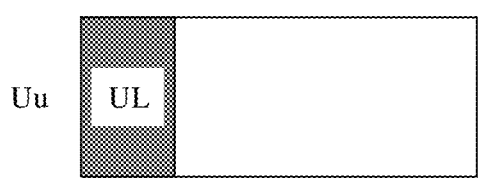
Figure 12:
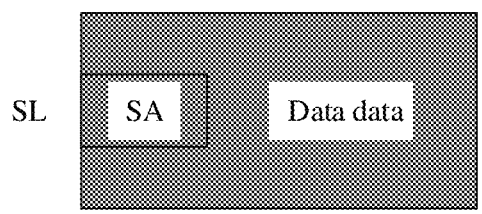

As shown in FIG. 10, FIG. 11, or FIG. 12, the sidelink information in the sidelink transmission includes SA and data. If FDM is used between the SA and the data, in a scheduling unit, the UL overlaps with the SA and the data on a time domain symbol. In other words, the target information includes the SA and the data. A transmit power on an SA symbol is $P_{SA}$, and a transmit power on a data symbol is $P_{data}$. $P_{SA}$ and $P_{data}$ may be the same or different. Because the first terminal device needs to send the SA and the data at the same time, a total power of the SL transmission is a sum of the power of the SA and the power of the data, and the total power of the SL transmission is the first transmit power. If the priority of the SL transmission is higher than the priority of the uplink transmission, the first terminal needs to consider the total power of the SL, and then may adjust the power value of the uplink transmission based on the total power of SL transmission. For example, if $P_{SA}+P_{data}=P_{SL}$ is designed, the power adjustment for the uplink transmission needs to meet that $P_{UL}+P_{SL}$ is less than or equal to a maximum transmit power of the first terminal device. In other words, the power adjustment for the uplink transmission needs to meet that $P_{UL}+P_{SA}+P_{data}$ is less than or equal to the maximum transmit power of the first terminal device. If the priority of the uplink transmission is higher than the priority of the SL transmission, the first terminal needs to consider the power of the uplink transmission, and then may adjust the transmit power of the SA and/or the transmit power of the data based on the power of the uplink transmission, and the power adjustment meets that a sum of the uplink power and the total power of the SL transmission, that is, the sum of the transmit power of the SA and the transmit power of the data is less than or equal to a maximum transmit power of the first terminal device. For example, if $P_{SA}+P_{data}=P_{SL}$ is designed, the adjustment of the total power for the sidelink transmission needs to meet that $P_{UL}+P_{SL}$ is less than or equal to the maximum transmit power of the first terminal device. In other words, the power adjustment for the sidelink transmission needs to meet that $P_{UL}+P_{SA}+P_{data}$ is less than or equal to the maximum transmit power of the first terminal device.

Figure 13:
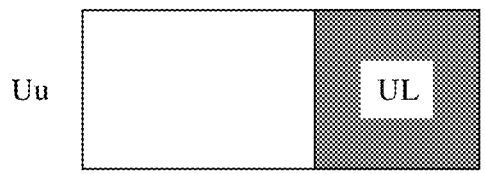
Figure 13:
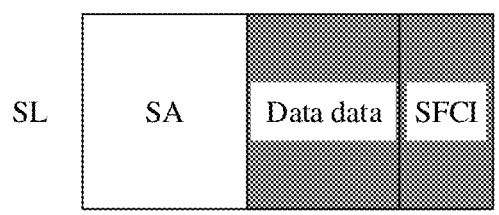

As shown in FIG. 13, the sidelink information in the sidelink transmission includes SA, data, and SFCI. The UL overlaps with the data and the SFCI in time domain in a scheduling unit, and a TDM mode is used between the data and the SFCI. A power on a data symbol is set to $P_{data}$, and a power on the SFCI is set to $P_{SFCI}$. When the priority of the SL transmission is higher than the priority of the uplink transmission, a larger power (that is, the first transmit power) in $P_{data}$ and $P_{SFCI}$ needs to be considered, and then the power value of the uplink transmission is adjusted based on the larger power. If $P_{SFCI}>P_{data}$, the power adjustment for the uplink transmission needs to meet that $P_{UL}+P_{SFCI}$ is less than or equal to a maximum transmit power of the first terminal device. If $P_{data}>P_{SFCI}$, the power adjustment for the uplink transmission needs to meet that $P_{UL}+P_{data}$ is less than or equal to a maximum transmit power of the first terminal device. When the priority of the uplink transmission is higher than the priority of the SL transmission, the power of the uplink transmission needs to be considered, and the power of the SFCI and/or the power of the data needs to be adjusted, to ensure that a sum of the power of the uplink transmission and a larger power in the power of the SFCI and the power of the data is less than or equal to a maximum transmit power of the first terminal device. To be specific, the first terminal device may adjust the transmit power of the SFCI and/or the transmit power of the data based on the power of the uplink transmission, to ensure that a sum of the transmit power of the uplink transmission and a larger value in the transmit power of the SFCI and the transmit power of the data is less than or equal to the maximum transmit power of the first terminal device. For example, if $P_{SFCI}>P_{data}$, $P_{UL}+P_{SFCI}$ is greater than the maximum transmit power of the UE, and $P_{UL}+P_{data}$ is less than or equal to the maximum transmit power of the UE, the first terminal device may adjust the transmit power $P_{SFCI}$ of the SFCI based on the power of the uplink transmission, and the power adjustment for the SFCI needs to meet that the $P_{UL}+P_{SFCI}$ is less than or equal to the maximum transmit power of the first terminal device. If $P_{data}>P_{SFCI}$, $P_{UL}+P_{data}$ is greater than the maximum transmit power of the first terminal device, and $P_{UL}+P_{SFCI}$ is less than or equal to the maximum transmit power of the first terminal device, the first terminal device may adjust the transmit power $P_{data}$ of the data based on the power of the uplink transmission, and the power adjustment for the data needs to meet that the $P_{UL}+P_{data}$ is less than or equal to the maximum transmit power of the first terminal device. For example, if $P_{UL}+P_{data}$ is greater than the maximum transmit power of the first terminal device, and $P_{UL}+P_{SFCI}$ is greater than the maximum transmit power of the first terminal device, the first terminal device may adjust the transmit power of the SFCI and the transmit power of the data based on the power of the uplink transmission, and a larger value in the transmit power of the SFCI and the transmit power of the data needs to meet that $P_{UL}+\max\{P_{SFCI}, P_{data}\}$ is less than or equal to the maximum transmit power of the first terminal device. It may be understood that because the SFCI may be transmitted on a PSFCH, the transmit power of the SFCI may also be referred to as a transmit power of the PSFCH. Similarly, because the SL UCI may be transmitted on a PSUCCH, the transmit power of the SL UCI may also be referred to as a transmit power of the PSUCCH.

Figure 14:
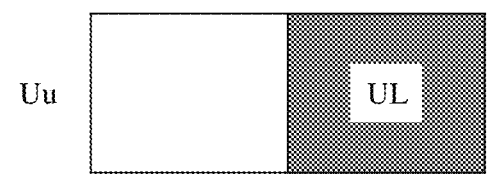
Figure 14:
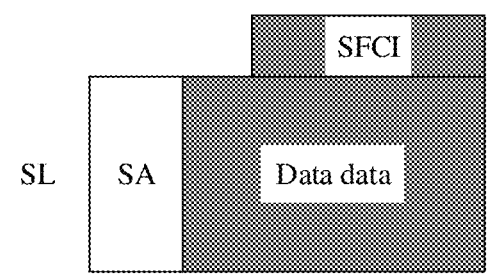

As shown in FIG. 14, the sidelink information in the sidelink transmission includes SA, data, and SFCI. The UL overlaps with the data and the SFCI in time domain in a scheduling unit, and an FDM mode is used between the data and the SFCI. A power on a data symbol is set to $P_{data}$, and a power of the SFCI is set to $P_{SFCI}$. When the priority of the SL transmission is higher than the priority of the uplink transmission, a sum (that is, the first transmit power) of the transmit power of the SFCI and the transmit power of the data needs to be considered, and then the power value of the uplink transmission is adjusted based on the sum of powers. For example, the power adjustment for the uplink transmission needs to meet that $P_{UL}+P_{data}+P_{SFCI}$ is less than or equal to a maximum transmit power of the first terminal device. When the priority of the uplink transmission is higher than the priority of the SL transmission, the transmit power of the uplink transmission needs to be considered, and then the transmit power of the SFCI and/or the transmit power of the data are/is adjusted based on the power of the uplink transmission, and adjustment of a sum of the transmit power of the SFCI and the transmit power of the data needs to meet that $P_{UL}+P_{data}+P_{SFCI}$ is less than or equal to a maximum transmit power of the first terminal device.

Figure 15:
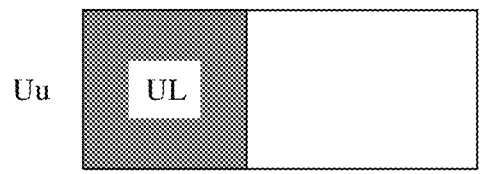
Figure 15:
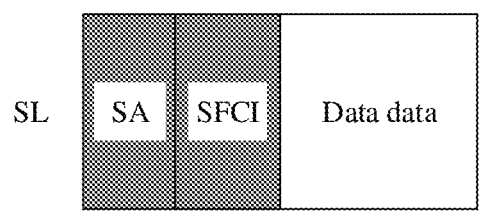

As shown in FIG. 15, the sidelink information in the sidelink transmission includes SA, data, and SFCI. The UL overlaps with the SA and the SFCI in time domain in a scheduling unit, and a TDM mode is used between the SA and the SFCI. When the priority of the SL transmission is higher than the priority of the uplink transmission, a larger power (that is, the first transmit power) in $P_{SFCI}$ and $P_{SA}$ needs to be considered, and then the power value of the uplink transmission is adjusted based on the larger power. For example, if $P_{SFCI}>P_{SA}$, the power adjustment for the uplink transmission needs to meet that $P_{UL}+P_{SFCI}$ is less than or equal to a maximum transmit power of the first terminal device. If $P_{SA}>P_{SFCI}$, the power adjustment for the uplink transmission needs to meet that $P_{UL}+P_{SA}$ is less than or equal to a maximum transmit power of the first terminal device. When the priority of the uplink transmission is higher than the priority of the SL transmission, the power of the uplink transmission needs to be considered, then a transmit power of the SFCI and/or a transmit power of the SA need and/or needs to be adjusted based on the power of the uplink transmission, and the adjustment needs to meet that a sum of the power of the uplink transmission and a larger power in the transmit power of the SFCI and the transmit power of the SA is less than or equal to a maximum transmit power of the first terminal device. To be specific, the first terminal device may adjust the transmit power of the SFCI and/or the transmit power of the SA based on the power of the uplink transmission, to ensure that the sum of the transmit power of the uplink transmission and a larger value in the transmit power of the SFCI and the transmit power of the SA is less than or equal to the maximum transmit power of the first terminal device. For example, if $P_{SFCI}>P_{SA}$, $P_{UL}+P_{SFCI}$ is greater than the maximum transmit power of the first terminal device, and $P_{UL}+P_{SA}$ is less than or equal to the maximum transmit power of the first terminal device, the transmit power of the SFCI is adjusted based on the transmit power of the uplink transmission, and the power adjustment for the SFCI needs to meet that the $P_{UL}+P_{SFCI}$ is less than or equal to the maximum transmit power of the first terminal device. If $P_{SA}>P_{SFCI}$, $P_{UL}+P_{SA}$ is greater than the maximum transmit power of the first terminal device, and $P_{UL}+P_{SFCI}$ is less than or equal to the maximum transmit power of the first terminal device, the transmit power of the SA is adjusted based on the transmit power of the uplink transmission, and the power adjustment for the SA needs to meet that the $P_{UL}+P_{SA}$ is less than or equal to the maximum transmit power of the first terminal device. For example, if $P_{UL}+P_{SA}$ is greater than the maximum transmit power of the first terminal device, and $P_{UL}+P_{SFCI}$ is greater than the maximum transmit power of the first terminal device, the first terminal device may adjust the transmit power of the SFCI and the transmit power of the SA based on the power of the uplink transmission, and a larger value in the transmit power of the SFCI and the transmit power of the SA needs to meet that $P_{UL}+\max\{P_{SA}, P_{SFCI}\}$ is less than or equal to the maximum transmit power of the first terminal device. It may be understood that because the SFCI may be transmitted on a PSFCH, the transmit power of the SFCI may also be referred to as a transmit power of the PSFCH.

Figure 16:
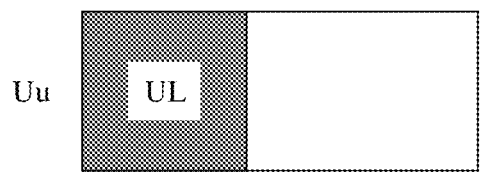
Figure 16:
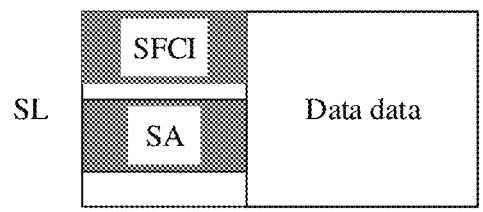

As shown in FIG. 16, the sidelink information in the sidelink transmission includes SA, data, and SFCI. The UL overlaps with the SA and the SFCI in time domain in a scheduling unit, and an FDM mode is used between the SA and the SFCI. If the priority of the SL transmission is higher than the priority of the uplink transmission, a sum (that is, the first transmit power) of a transmit power of the PSFCI and a transmit power of the PSA needs to be considered, and then the power value of the uplink transmission is adjusted based on the sum of the powers. For example, the power adjustment for the uplink transmission needs to meet that $P_{UL}+P_{SA}+P_{SFCI}$ is less than or equal to a maximum transmit power of the first terminal device. If the priority of the uplink transmission is higher than the priority of the SL transmission, the transmit power of the uplink transmission needs to be considered, and then a transmit power $P_{SFCI}$ and/or a transmit power $P_{SA}$ are/is adjusted based on the transmit power of the uplink transmission, and a sum of the transmit powers $P_{SFCI}$ and $P_{SA}$ needs to meet that $P_{UL}+P_{SA}+P_{SFCI}$ is less than or equal to a maximum transmit power of the first terminal device.

In the following examples shown in FIG. 23 and FIG. 24, an example in which the information type of the first information is the same as the information type of the second information is used for description.

Figure 23:
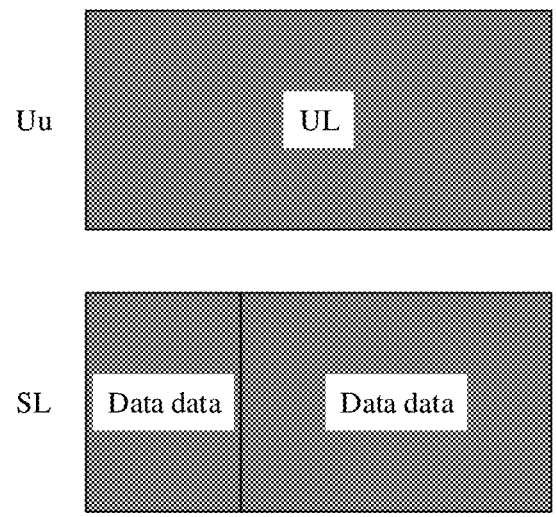

As shown in FIG. 23, the sidelink information in the sidelink transmission includes data. The UL overlaps with two pieces of data in time domain in a scheduling unit, and a TDM mode is used between the two pieces of data. If the priority of the SL transmission is higher than the priority of the uplink transmission, a larger value in transmit powers of the two pieces of data needs to be calculated, and the transmit power of the UL is adjusted based on the larger value. If the priority of the uplink transmission is higher than the priority of the SL transmission, at least one of transmit powers of the two pieces of data is adjusted based on the transmit power of the UL, and the power adjustment meets that a sum of the transmit power of the uplink transmission and a larger value in the transmit powers of the two pieces of data is less than or equal to a maximum transmit power of the first terminal device.

Figure 24:
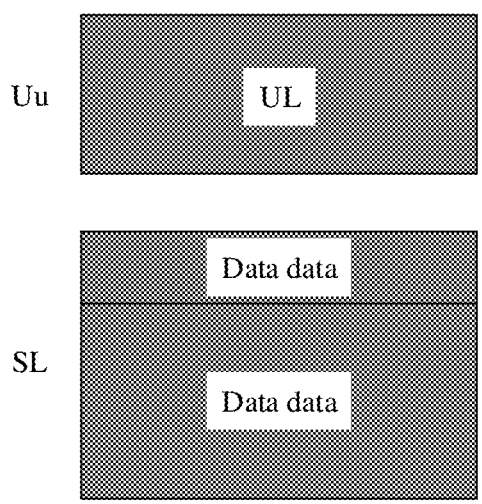

As shown in FIG. 24, the sidelink information in the sidelink transmission includes data. The UL overlaps with two pieces of data in time domain in a scheduling unit, and an FDM mode is used between the two pieces of data. If the priority of the SL transmission is higher than the priority of the uplink transmission, a sum of transmit powers of the two pieces of data needs to be calculated, and the transmit power of the UL is adjusted based on the sum of transmit powers. If the priority of the uplink transmission is higher than the priority of the SL transmission, at least one of transmit powers of the two pieces of data is adjusted based on the transmit power of the UL, to ensure that a sum of the transmit power of the uplink transmission and a sum of the transmit powers of the two pieces of data is less than or equal to a maximum transmit power of the first terminal device. For example, adjusting at least one of the transmit powers of the two pieces of data may include adjusting a transmit power of one piece of data in the two pieces of data, or adjusting transmit powers of the two pieces of data. It should be noted that in the examples in FIG. 23 and FIG. 24, an example in which both the first information and the second information are data is used for description (or an example in which both information overlapping in time domain is data is used for description), and this is not intended to limit this application. Optionally, both the first information and the second information may be SA, SFCI, or the like.

Example 3

The target information includes the foregoing three types of information: first information, second information, and third information. The first information is data information, scheduling assignment information, or sidelink feedback information, the second information is data information, scheduling assignment information, or sidelink feedback information, and the third information is data information, scheduling assignment information, or sidelink feedback information. Information types of the first information, the second information, and the third information may be the same or different.

The first terminal device determines a second transmit power based on at least one of a transmit power of the first information, a transmit power of the second information, or a transmit power of the third information. If the priority of the sidelink transmission is higher than the priority of the uplink transmission, the first terminal device may adjust the transmit power of the uplink information based on the second transmit power. If the priority of the uplink transmission is higher than the priority of the sidelink transmission, the first terminal device may adjust the second transmit power based on the transmit power of the uplink information.

Specifically, if a TDM mode is used between the first information, the second information, and the third information, the second transmit power is a largest transmit power in the transmit power of the first information, the transmit power of the second information, and the transmit power of the third information. If FDM is used between the first information and the second information, TDM is used between the third information and each of the first information and the second information, and a sum of the transmit power of the first information and the transmit power of the second information is a third transmit power, the second transmit power is a larger value in the transmit power of the third information and the third transmit power. If FDM is used between the first information, the second information, and the third information, the second transmit power is a sum of the transmit power of the first information, the transmit power of the second information, and the transmit power of the third information.

In FIG. 17 to FIG. 22, that the information types of the first information, the second information, and the third information are different is used as an example for description.

Figure 17:
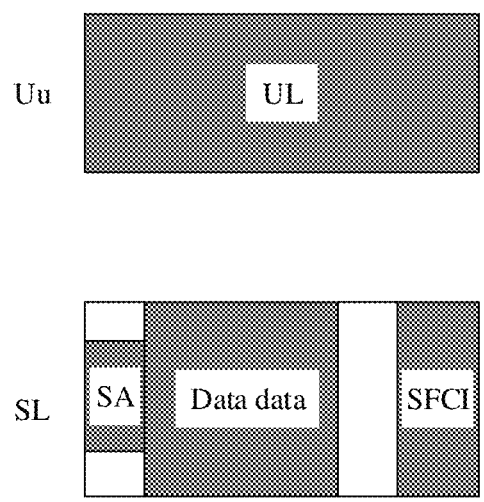

As shown in FIG. 17, the sidelink information in the sidelink transmission includes SA, data, and SFCI. The UL overlaps with the SA, the data, and the SFCI in time domain in a scheduling unit, and TDM is used between the SA, the data, and the SFCI. When the priority of the SL transmission is higher than the priority of the uplink transmission, a largest power (that is, the second transmit power) in a transmit power of the SA, a transmit power of the data, and a transmit power of the SFCI needs to be considered, and then the power value of the uplink transmission is adjusted based on the largest power. For example, if $P_{SA}>P_{data}>P_{SFCI}$ (or $P_{SA}>P_{SFCI}>P_{data}$), the power adjustment for the uplink transmission needs to meet that $P_{UL}+P_{SA}$ is less than or equal to a maximum transmit power of the first terminal device. If $P_{data}>P_{SA}>P_{SFCI}$ (or $P_{data}>P_{SFCI}>P_{SA}$), the power adjustment for the uplink transmission needs to meet that $P_{UL}+P_{data}$ is less than or equal to a maximum transmit power of the first terminal device. If $P_{SFCI}>P_{data}>P_{SA}$ (or $P_{SFCI}>P_{data}>P_{SA}$), the power adjustment for the uplink transmission needs to meet that $P_{UL}+P_{SFCI}$ is less than or equal to a maximum transmit power of the first terminal device. When the priority of the uplink transmission is higher than the priority of the SL transmission, the power value of the uplink transmission is considered, then a transmit power of the SA, a transmit power of the data, and/or a transmit power of the SFCI may be adjusted based on the power value of the uplink transmission, and the power adjustment meets that a sum of the power of the uplink transmission and a largest power in the transmit power of the SA, the transmit power of the data, and the transmit power of the SFCI is less than or equal to a maximum transmit power of the first terminal device. To be specific, the first terminal device may adjust the transmit power of the SA, the transmit power of the data, and/or the transmit power of the SFCI based on the power of the uplink transmission, to ensure that a sum of the transmit power of the uplink transmission and a largest value in the transmit power of the SA, the transmit power of the data, and the transmit power of the SFCI is less than or equal to the maximum transmit power of the UE. For example, if $P_{SA}>P_{data}>P_{SFCI}$ (or $P_{SA}>P_{SFCI}>P_{data}$) $P_{UL}+P_{SA}$ is greater than the maximum transmit power of the first terminal device, $P_{UL}+P_{data}$ is less than or equal to the maximum transmit power of the first terminal device, and $P_{UL}+P_{SFCI}$ is less than or equal to the maximum transmit power of the first terminal device, the transmit power of the SA may be adjusted based on the power value of the uplink transmission, and the power adjustment meets that $P_{UL}+P_{SA}$ is less than or equal to the maximum transmit power of the first terminal device. If $P_{data}>P_{SA}>P_{SFCI}$ (or $P_{data}>P_{SFCI}>P_{SA}$), $P_{UL}+P_{data}$ is greater than the maximum transmit power of the first terminal device, $P_{UL}+P_{SA}$ is less than or equal to the maximum transmit power of the first terminal device, and $P_{UL}+P_{SFCI}$ is less than or equal to the maximum transmit power of the first terminal device, the transmit power of the data is adjusted based on the power value of the uplink transmission, and the power adjustment meets that $P_{UL}+P_{data}$ is less than or equal to the maximum transmit power of the first terminal device. If $P_{SFCI}>P_{data}>P_{SA}$ (or $P_{SFCI}>P_{SA}>P_{data}$), the transmit power of the SFCI is adjusted based on the power value of the uplink transmission, and the power adjustment meets that $P_{UL}+P_{SFCI}$ is less than or equal to the maximum transmit power of the first terminal device. If $P_{UL}+P_{data}$ is greater than the maximum transmit power of the first terminal device, and $P_{UL}+P_{SA}$ is greater than the maximum transmit power of the first terminal device, the transmit power of the data and the transmit power of the SA are adjusted based on the power value of the uplink transmission, and the power adjustment meets that $P_{UL}+P_{data}$ is less than or equal to the maximum transmit power of the first terminal device, and $P_{UL}+P_{SA}$ is less than or equal to the maximum transmit power of the first terminal device. If $P_{UL}+P_{data}$ is greater than the maximum transmit power of the first terminal device, and $P_{UL}+P_{SFCI}$ is greater than the maximum transmit power of the first terminal device, the transmit power of the data and the transmit power of the SFCI are adjusted based on the power value of the uplink transmission, and the power adjustment meets that $P_{UL}+P_{data}$ is less than or equal to the maximum transmit power of the first terminal device, and $P_{UL}+P_{SFCI}$ is less than or equal to the maximum transmit power of the first terminal device. If $P_{UL}+P_{SA}$ is greater than the maximum transmit power of the first terminal device, and $P_{UL}+P_{SFCI}$ is greater than the maximum transmit power of the first terminal device, the transmit power of the SA and the transmit power of the SFCI are adjusted based on the power value of the uplink transmission, and the power adjustment meets that $P_{UL}+P_{SA}$ is less than or equal to the maximum transmit power of the first terminal device, and $P_{UL}+P_{SFCI}$ is less than or equal to the maximum transmit power of the first terminal device. If $P_{UL}+P_{SA}$ is greater than the maximum transmit power of the first terminal device, $P_{UL}+P_{data}$ is greater than the maximum transmit power of the first terminal device, and $P_{UL}+P_{SFCI}$ is greater than the maximum transmit power of the first terminal device, the transmit power of the SA, the transmit power of the data, and the transmit power of the SFCI are adjusted based on the power value of uplink transmission, and the power adjustment meets that $P_{UL}+P_{SA}$ is less than or equal to the maximum transmit power of the first terminal device, $P_{UL}+P_{data}$ is less than or equal to the maximum transmit power of the first terminal device, and $P_{UL}+P_{SFCI}$ is less than or equal to the maximum transmit power of the first terminal device.

Figure 18:
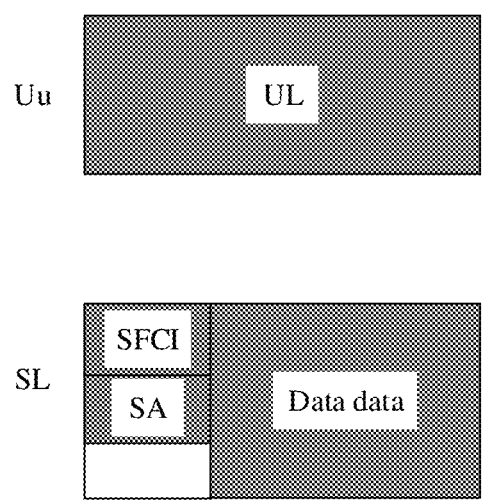

As shown in FIG. 18, the sidelink information in the sidelink transmission includes SA, data, and SFCI. The UL overlaps with the SA, the data, and the SFCI in time domain in a scheduling unit, FDM is used between the SFCI and the SA, and TDM is used between the data and each of the SFCI and the SA. When the priority of the SL transmission is higher than the priority of the uplink transmission, a sum (that is, the third transmit power) of a transmit power of the SA and a transmit power of the SFCI, and a larger value in the third transmit power and a transmit power of the data need to be considered, and then the power value of the uplink transmission is adjusted based on the larger power. For example, if $(P_{SA}+P_{SFCI})>P_{data}$, the power adjustment for the uplink transmission needs to meet that $P_{UL}+(P_{SA}+P_{SFCI})$ is less than or equal to a maximum transmit power of the first terminal device. If $P_{data}>(P_{SA}+P_{SFCI})$, the power adjustment for the uplink transmission needs to meet that $P_{UL}+P_{data}$ is less than or equal to a maximum transmit power of the first terminal device. When the priority of the uplink transmission is higher than the priority of the SL transmission, the power value of the uplink transmission needs to be considered, then a transmit power of the SA, a transmit power of the SFCI, and/or a transmit power of the data are and/or is adjusted based on the power value of the uplink transmission, to meet that a sum of the power of the uplink transmission and a larger value in the transmit power of the data and a sum of the transmit power of the SA and the transmit power of the SFCI is less than or equal to the maximum transmit power of a first terminal device. To be specific, the first terminal device may adjust the transmit power of the SA, the transmit power of the data, and/or the transmit power of the SFCI based on the power of the uplink transmission, to ensure that a sum of the transmit power of the uplink transmission and a larger value in the transmit power of the data and the sum of the transmit power of the SA and the transmit power of the SFCI is less than or equal to the maximum transmit power of the first terminal device. For example, if $P_{UL}+P_{SA}+P_{SFCI}$ is greater than the maximum transmit power of the first terminal device, and $P_{UL}+P_{data}$ is less than or equal to the maximum transmit power of the first terminal device, the transmit power of the SA and/or the transmit power of the SFCI may be adjusted based on the power value of the uplink transmission, to ensure that $P_{UL}+P_{SA}+P_{SFCI}$ is less than or equal to the maximum transmit power of the first terminal device. If $P_{UL}+P_{data}$ is greater than the maximum transmit power of the first terminal device, and $P_{UL}+P_{SA}+P_{SFCI}$ is less than or equal to the maximum transmit power of the first terminal device, the power of the data is adjusted based on the power value of the uplink transmission, to ensure that $P_{UL}+P_{data}$ is less than or equal to the maximum transmit power of the first terminal device. If $P_{UL}+P_{data}$ is greater than the maximum transmit power of the first terminal device, and $P_{UL}+P_{SA}+P_{SFCI}$ is greater than the maximum transmit power of the first terminal device, the power of the data is adjusted based on the power value of the uplink transmission, to ensure that $P_{UL}+P_{data}$ is less than or equal to the maximum transmit power of the first terminal device, and the power of the SA and/or the power of the SFCI are/is adjusted based on the power value of the uplink transmission, to ensure that $P_{UL}+P_{SA}+P_{SFCI}$ is less than or equal to the maximum transmit power of the first terminal device.

Figure 19:
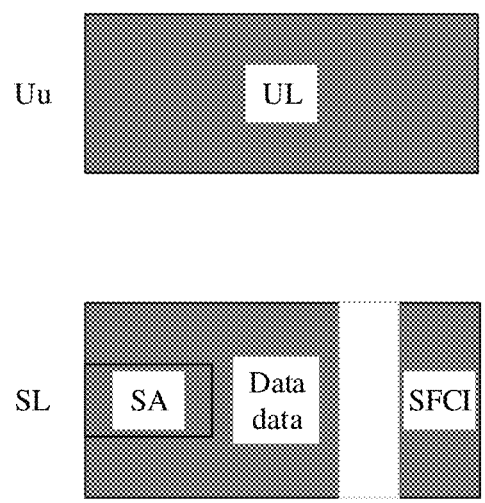

As shown in FIG. 19, the sidelink information in the sidelink transmission includes SA, data, and SFCI. In a scheduling unit, the UL overlaps with the SA, the data, and the SFCI in the SL in time domain. FDM is used between the data and the SA, and TDM is used between the SFCI and each of the data and the SA. When the priority of the SL transmission is higher than the priority of the uplink transmission, a sum (that is, the third transmit power) of a transmit power of the SA and a transmit power of the data, and a larger value in the third transmit power and a transmit power of the SFCI need to be considered, and the power value of the uplink transmission is adjusted based on the larger power. For example, if $(P_{SA}+P_{data})>P_{SFCI}$, the power adjustment for the uplink transmission needs to meet that $P_{UL}+(P_{SA}+P_{data})$ is less than or equal to a maximum transmit power of the first terminal device. If $P_{SFCI}>(P_{SA}+P_{data})$, the power adjustment for the uplink transmission needs to ensure that $P_{UL}+P_{SFCI}$ is less than or equal to a maximum transmit power of the first terminal device. When the priority of the uplink transmission is higher than the priority of the SL transmission, the power of the uplink transmission needs to be considered, a transmit power of the SA, a transmit power of the data, and/or a transmit power of the SFCI are and/or is adjusted based on the power of the uplink transmission, and the power adjustment meets that after the adjustment, a sum of the power of the uplink transmission and a larger value in the transmit power of the SFCI and a sum of the transmit power of the SA and the transmit power of the data is less than or equal to a maximum transmit power of the first terminal device. For example, if $(P_{SA}+P_{data})>P_{SFCI}$, $P_{UL}+P_{SA}+P_{data}$ is greater than the maximum transmit power of the first terminal device, and $P_{UL}+P_{SFCI}$ is less than or equal to the maximum transmit power of the first terminal device, it is considered that the transmit power of the SA and/or the transmit power of the data are/or adjusted based on the power value of the uplink transmission, and the adjustment of the sum of the power of the SA and the power the data needs to meet that $P_{UL}+(P_{SA}+P_{data})$ is less than or equal to the maximum transmit power of the first terminal device. If $P_{SFCI}>(P_{SA}+P_{data})$, $P_{UL}+P_{SFCI}$ is greater than the maximum transmit power of the first terminal device, and $P_{UL}+P_{SA}+P_{data}$ is less than or equal to the maximum transmit power of the first terminal device, it is considered that the transmit power of the SFCI is adjusted based on the power value of the uplink transmission, and the power adjustment for the SFCI needs to meet that $P_{UL}+P_{SFCI}$ is less than or equal to the maximum transmit power of the first terminal device. If $P_{UL}+P_{SFCI}$ is greater than the maximum transmit power of the first terminal device, and $P_{UL}+P_{SA}+P_{data}$ is greater than the maximum transmit power of the first terminal device, the transmit power of the SFCI is adjusted based on the power value of the uplink transmission, so that $P_{UL}+P_{SFCI}$ is less than or equal to the maximum transmit power of the first terminal device, and the power of the SA and/or the power of the data are/is adjusted based on the power value of the uplink transmission, so that $P_{UL}+P_{SA}+P_{data}$ is less than or equal to the maximum transmit power of the first terminal device.

Figure 20:
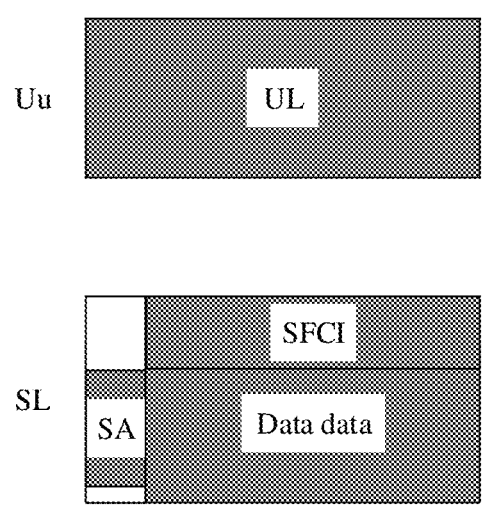

As shown in FIG. 20, the sidelink information in the sidelink transmission includes SA, data, and SFCI. In a scheduling unit, the UL overlaps/coexists with the SA, the data, and the SFCI in the SL in time domain. FDM is used between the data and the SFCI, and TDM is used between the SA and each of the data and the SFCI. When the priority of the SL transmission is higher than the priority of the uplink transmission, a larger power in a sum of a power of the SFCI and a power of the data and a transmit power of the SA needs to be considered, and the power value of the uplink transmission is adjusted based on the larger power. For example, if $(P_{SFCI}+P_{data})>P_{SA}$, the power adjustment for the uplink transmission needs to meet that $P_{UL}+(P_{SFCI}+P_{data})$ is less than or equal to a maximum transmit power of the first terminal device. If $P_{SA}>(P_{SFCI}+P_{data})$, the power adjustment for the uplink transmission needs to meet that $P_{UL}+P_{SA}$ is less than or equal to a maximum transmit power of the first terminal device. When the priority of the uplink transmission is higher than the priority of the SL transmission, the power value of the uplink transmission needs to be considered, a transmit power of the SFCI, a transmit power of the data, and/or a transmit power of the SA are and/or is adjusted based on the power value of the uplink transmission, and the power adjustment meets that a sum of the power of the uplink transmission and a larger value in the transmit power of the SA and a sum of the transmit power of the SFCI and the transmit power of the data is less than or equal to a maximum transmit power of the first terminal device. For example, if $(P_{SFCI}+P_{data})>P_{SA}$, $P_{UL}+P_{SFCI}+P_{data}$ is greater than the maximum transmit power of the first terminal device, and $P_{UL}+P_{SA}$ is less than or equal to the maximum transmit power of the first terminal device, the transmit power of the SFCI and/or the transmit power of the data are/or adjusted based on the power of the uplink transmission, and adjustment of the sum of the transmit power of the SFCI and the transmit power of the data needs to meet that $P_{UL}+P_{SFCI}+P_{data}$ is less than or equal to the maximum transmit power of the first terminal device. For example, if $P_{SA}>(P_{SFCI}+P_{data})$, $P_{UL}+P_{SA}$ is greater than the maximum transmit power of the first terminal device, and $P_{UL}+P_{SFCI}+P_{data}$ is less than or equal to the maximum transmit power of the first terminal device, the power of the SA is adjusted based on the power of the uplink transmission, and the power adjustment for the SA needs to meet that $P_{UL}+P_{SA}$ is less than or equal to the maximum transmit power of the first terminal device. If $P_{UL}+P_{SFCI}+P_{data}$ is greater than the maximum transmit power of the first terminal device, and $P_{UL}+P_{SA}$ is greater than the maximum transmit power of the first terminal device, the transmit power of the SA, the transmit power of the SFCI, and/or the transmit power of the data are/is adjusted based on the power of the uplink transmission, and adjustment of a sum of the transmit power of the SFCI and the transmit power of the data needs to meet $P_{UL}+P_{SFCI}+P_{data}$ is less than or equal to the maximum transmit power of the first terminal device, and the power adjustment for the SA needs to meet that $P_{UL}+P_{SA}$ is less than or equal to the maximum transmit power of the first terminal device.

Figure 21:
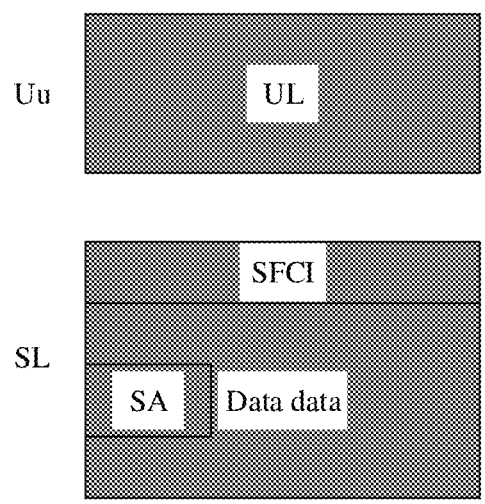
Figure 22:
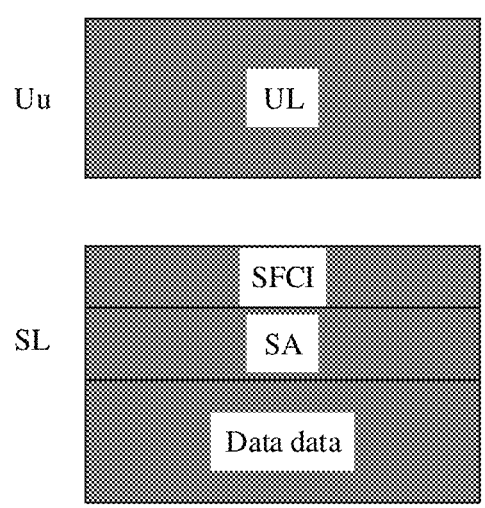

For example, as shown in FIG. 21 or FIG. 22, the sidelink information in the sidelink transmission includes SA, data, and SFCI. In a scheduling unit, SA, data, and SFCI in the SL overlap/coexist with UL in time domain. FDM is used between the SA, the data, and the SFCI. When the priority of the SL transmission is higher than the priority of the uplink transmission, a sum (that is, the second transmit power) of a power of the SFCI, a power of the data, and a power of the SA needs to be considered, the power value of the uplink transmission is adjusted based on the sum of the powers. For example, the power adjustment for the uplink transmission needs to meet that $P_{UL}+P_{SFCI}+P_{SA}+P_{data}$ is less than or equal to a maximum transmit power of the first terminal device. When the priority of the uplink transmission is higher than the priority of the SL transmission, the power of the uplink transmission needs to be considered, and a transmit power of the SFCI, a transmit power of the SA, and/or a transmit power of the data are/is adjusted based on the power of the uplink transmission, and adjustment of a sum of the transmit powers of the SFCI, the SA, and the data needs to meet $P_{UL}+P_{SFCI}+P_{SA}+P_{data}$ is less than or equal to the maximum transmit power of the first terminal device.

Figure 25:
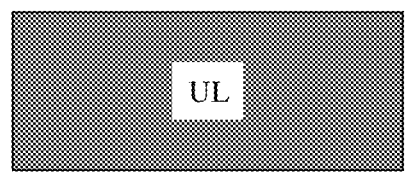
Figure 25:
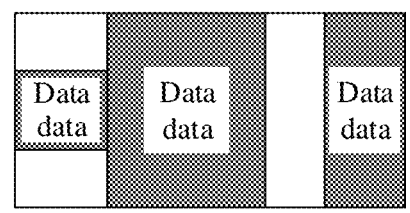
Figure 26:
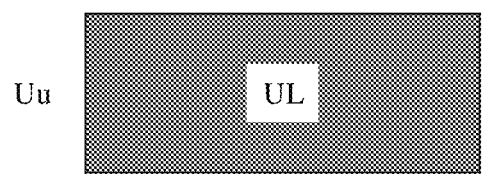
Figure 26:
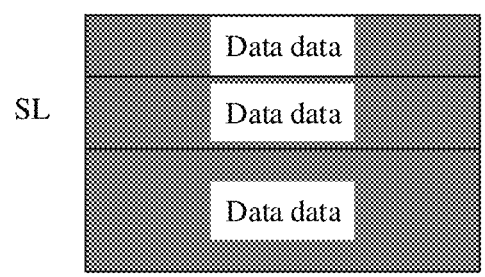

In examples in FIG. 25 and FIG. 26, that the information types of the first information, the second information, and the third information are the same is used as an example for description.

As shown in FIG. 25, the sidelink information in the sidelink transmission includes data. The UL overlaps with three pieces of data in the SL in time domain in a scheduling unit, and a TDM mode is used between the three pieces of data. If the priority of the SL transmission is higher than the priority of the UL transmission, a largest value in transmit powers of the three pieces of data may be determined, and the transmit power of the UL is adjusted based on the largest value in the transmit powers. If the priority of the UL is higher than the priority of the SL transmission, at least one of transmit powers of the three pieces of data is adjusted based on the transmit power of the UL, to ensure that a sum of a largest value in the transmit powers of the three pieces of data and the transmit power of the uplink transmission is less than or equal to a maximum transmit power of the first terminal device.

As shown in FIG. 26, the sidelink information in the sidelink transmission includes data. The UL overlaps with three pieces of data in the SL in time domain in a scheduling unit, and an FDM mode is used between the three pieces of data. If the priority of the SL transmission is higher than the priority of the UL transmission, a sum of transmit powers of the three pieces of data may be determined, and the transmit power of the UL is adjusted based on the sum of the transmit powers. If the priority of the UL is higher than the priority of the SL, at least one of transmit powers of the three pieces of data may be adjusted based on the transmit power of the UL. For example, a transmit power of only one of the three pieces of data is adjusted, or transmit powers of any two of the three pieces of data are adjusted, or transmit powers of all the three pieces of data are adjusted, to meet that a sum of the transmit powers of the three pieces of data and the transmit power of the uplink transmission is less than or equal to a maximum transmit power of the first terminal device.

It should be noted that in the examples shown in FIG. 25 and FIG. 26, an example in which the three pieces of information that overlaps with the UL in time domain are all data, or an example in which the first information, the second information, and the third information are all data is used for description, and is not intended to limit this application. Optionally, all the first information, the second information, and the third information may be SA, SFCI, or the like. Alternatively, both the first information and the second information are data, and the third information is SA or SFCI, both the first information and the second information are SA, and the third information is data or SFCI, or both the first information and the second information are SFCI, and the third information is data or SA.

Optionally, in Embodiment 1, the method for determining the priorities of the uplink transmission and the sidelink transmission may further include:

when the target information is data information, scheduling assignment information, or sidelink feedback information, and the target information is transmitted on a first channel, and the uplink information is transmitted on a second channel, the priorities of the uplink transmission and the sidelink transmission are specifically priorities of the first channel and the second channel.

Specifically, the first terminal device may determine the priorities of the first channel and the second channel according to a predefined rule. Alternatively, the first terminal device may receive third configuration information, where the third configuration information is used to configure the priorities of the first channel and the second channel. The first terminal device determines the priorities of the first channel and the second channel based on the third configuration information. Alternatively, the first terminal device may receive a first indication, where the first indication is used to indicate a second threshold. The first terminal device determines the priorities of the first channel and the second channel based on a value relationship between the second threshold and a priority of a data packet corresponding to the first channel. For example, if the priority of the data packet is less than or equal to (or less than) the second threshold, the priority of the first channel is higher than the priority of the second channel, if the priority of the data packet is greater than the second threshold, the priority of the second channel is higher than the priority of the first channel.

Optionally, in Embodiment 2, the method for adjusting the transmit power of the target information and/or the transmit power of the uplink information may further include:

If the priority of the first channel is higher than the priority of the second channel, the first terminal device adjusts the transmit power of the uplink information based on the transmit power of the target information, or if the priority of the second channel is higher than the priority of the first channel, the first terminal device adjusts the transmit power of the target information based on the transmit power of the uplink information.

In this embodiment of this application, the data information may be transmitted on a PSSCH, the scheduling assignment information may be transmitted on a PSCCH, the sidelink feedback information may be transmitted on a PSUCCH (or PSFCH), and the first channel used to transmit the target information may be at least one of the PSSCH, the PSCCH, or the PSUCCH (or PSFCH).

For example, a priority relationship among the uplink transmission, the PSSCH, the PSCCH, and the PSUCCH (or PSFCH) is: the UL<the PSSCH<the PSCCH<the PSUCCH (or PSFCH). If the target information is data information, the data information is transmitted on the PSSCH, and a priority of the PSSCH is higher than the priority of the uplink transmission, the transmit power of the uplink information may be adjusted based on the transmit power of the data information, or the transmit power of the uplink transmission may be adjusted based on a transmit power of the PSSCH. If the target information is scheduling assignment information, the scheduling assignment information is transmitted on the PSCCH, and a priority of the PSCCH is higher than the priority of the uplink transmission, the transmit power of the uplink information may be adjusted based on the transmit power of the scheduling assignment information, or the transmit power of the uplink transmission may be adjusted based on a transmit power of the PSCCH. If the target information is sidelink feedback information, the sidelink feedback information is transmitted on the PSUCCH (or PSFCH), and a priority of the PSUCCH (or PSFCH) is higher than the priority of the uplink transmission, the transmit power of the uplink information may be adjusted based on the transmit power of the sidelink feedback information, or the transmit power of the uplink transmission may be adjusted based on a transmit power of the PSUCCH (or PSFCH).

For example, a priority relationship among the uplink transmission, the PSSCH, the PSCCH, and the PSUCCH is: the PSSCH<the UL<the PSCCH<the PSUCCH (or PSFCH). If the target information is data information, the data information is transmitted on the PSSCH, and a priority of the PSSCH is lower than the priority of the uplink transmission, the transmit power of the data information may be adjusted based on the transmit power of the uplink information, or a transmit power of the PSSCH may be adjusted based on the transmit power of the uplink transmission. When a channel corresponding to the target information is the PSCCH or the PSUCCH (or PSFCH), for a specific process, refer to the foregoing description. Details are not described herein again.

For example, a priority relationship among the uplink transmission, the PSSCH, the PSCCH, and the PSUCCH is: the PSSCH<the PSCCH<the UL<the PSUCCH (or PSFCH). If the channel corresponding to the target information is the PSSCH or the PSCCH, and a priority of the PSSCH or the PSCCH is lower than the priority of the uplink transmission, a transmit power of the PSSCH or the PSCCH may be adjusted based on the transmit power of the uplink transmission. If the channel corresponding to the target information is the PSUCCH (or PSFCH), and a priority of the PSUCCH is higher than the priority of the uplink transmission, the transmit power of the uplink transmission may be adjusted based on a transmit power of the PSUCCH (or PSFCH).

For example, a priority relationship among the uplink transmission, the PSSCH, the PSCCH, and the PSUCCH is: the PSSCH<the PSCCH<the PSUCCH<the UL, and the priority of the uplink transmission is higher than a priority of the PSSCH, the PSCCH, or the PSUCCH. The transmit power of the target information may be adjusted based on the transmit power of the uplink transmission. The target information may be data information transmitted on the PSSCH, and/or the target information is scheduling information transmitted on the PSCCH, and/or the target information is sidelink feedback information transmitted on the PSUCCH.

Optionally, in Embodiment 1, the method for determining the priorities of the uplink transmission and the sidelink transmission may further include:

When the target information includes first information and second information, the first information is data information, scheduling assignment information, or sidelink feedback information, the second information is data information, scheduling assignment information, or sidelink feedback information, the first information is transmitted on a first channel, the second information is transmitted on a second channel, and the uplink information is transmitted on a third channel. The priorities of the sidelink transmission and the uplink transmission are specifically priorities of the first channel, the second channel, and the third channel. For a manner of determining the priorities of the first channel, the second information, and the third channel, refer to the foregoing manner of determining the priorities of the first channel and the second channel. Details are not described herein again. To distinguish from the first channel and the second channel in the foregoing embodiment, the first channel, the second channel, and the third channel in this embodiment may be alternatively described as a third channel, a fourth channel, and a fifth channel, respectively, or the first channel, the second channel, and the third channel in this embodiment may be described as a first channel A, a first channel B, and a second channel, respectively. This is not limited in this embodiment of this application.

Optionally, in Embodiment 2, the method for adjusting the transmit power of the target information and/or the transmit power of the uplink information may further include:

For example, if the channels in descending order of priority are sequentially: the first channel, the second channel, and the third channel, the first terminal device adjusts a transmit power of the second information based on a transmit power of the first information, and/or adjusts the transmit power of the uplink information based on the transmit powers of the first information and the second information, or if the channels in descending order of priority are sequentially: the first channel, the third channel, and the second channel, the first terminal device adjusts the transmit power of the uplink information based on a transmit power of the first information, and/or adjusts a transmit power of the second information based on the transmit powers of the first information and the uplink information, or if the channels in descending order of priority are sequentially: the third channel, the first channel, and the second channel, the first terminal device adjusts a transmit power of the first information based on the transmit power of the uplink information, and/or adjusts a transmit power of the second information based on the transmit powers of the uplink information and the first information.

For example, a priority relationship among the uplink transmission, the PSSCH, the PSCCH, and the PSUCCH (or PSFCH) is: the PSSCH<the PSCCH<the UL<the PSUCCH (or PSFCH). If the first channel is the PSSCH, and the second channel is the PSCCH, a power of the PSCCH may be adjusted based on the transmit power of the uplink transmission, and/or a power of the PSSCH may be adjusted based on the transmit power of the uplink transmission and the power of the PSCCH. If the first channel is the PSUCCH (or PSFCH), and the second channel is the PSCCH, the power of the uplink transmission may be adjusted based on a power of the PSUCCH (or PSFCH), and/or a power of the PSCCH may be adjusted based on the power of the uplink transmission and the power of the PSUCCH (or PSFCH).

For example, a priority relationship among the uplink transmission, the PSSCH, the PSCCH, and the PSUCCH (or PSFCH) is: the PSSCH<the UL<the PSCCH<the PSUCCH (or PSFCH). If the first channel is the PSSCH, and the second channel is the PSCCH, the power of the uplink transmission may be adjusted based on a power of the PSCCH, and/or a power of the PSSCH may be adjusted based on the power of the uplink transmission and the power of the PSCCH. If the first channel is the PSUCCH (or PSFCH), and the second channel is the PSCCH, a power of the PSCCH may be adjusted based on a power of the PSUCCH (or PSFCH), and/or the transmit power of the uplink transmission may be adjusted based on the power of the PSCCH and the power of the PSUCCH (or PSFCH).

For example, a priority relationship among the uplink transmission, the PSSCH, the PSCCH, and the PSUCCH is: the PSSCH<the PSCCH<the UL<the PSUCCH (or PSFCH). If the first channel is the PSSCH, and the second channel is the PSCCH, a power of the PSCCH may be adjusted based on the power of the uplink transmission, and/or a power of the PSSCH may be adjusted based on the power of the PSCCH and the power of the uplink transmission.

For example, a priority relationship among the uplink transmission, the PSSCH, the PSCCH, and the PSUCCH is: the PSSCH<the PSCCH<the PSUCCH (or PSFCH)<the UL. If the first channel is the PSUCCH (or PSFCH), and the second channel is the PSCCH, a power of the PSUCCH (or PSFCH) may be adjusted based on the power of the uplink transmission, and/or a power of the PSCCH may be adjusted based on the power of the PSUCCH (or PSFCH) and the power of the uplink transmission.

Optionally, in Embodiment 1, the method for determining the priorities of the uplink transmission and the sidelink transmission may further include:

The target information includes first information, second information, and third information, the first information is data information, scheduling assignment information, or sidelink feedback information, the second information is data information, scheduling assignment information, or sidelink feedback information, the third information is data information, scheduling assignment information, or sidelink feedback information. The first information is transmitted on a first channel, the second information is transmitted on a second channel, the third information is transmitted on a third channel, and the uplink information is transmitted on a fourth channel. The priorities of the sidelink transmission and the uplink transmission are specifically priorities of the first channel, the second channel, the third channel, and the fourth channel. To distinguish from the first channel, the second channel, and the third channel in the foregoing embodiment, the first channel, the second channel, the third channel, and the fourth channel in this embodiment may be alternatively described as a sixth channel, a seventh channel, and an eighth channel, respectively, or the first channel, the second channel, the third channel, and the fourth channel in this embodiment may be described as a first channel A, a first channel B, a first channel C, and a second channel, respectively. This is not limited in this embodiment of this application.

Optionally, in Embodiment 2, the method for adjusting the transmit power of the target information and/or the transmit power of the uplink information may further include:

For example, if the channels in descending order of priority are sequentially: the first channel, the second channel, the third channel, and the fourth channel, the first terminal device adjusts a transmit power of the second information based on a transmit power of the first information, adjusts a transmit power of the third information based on the transmit powers of the first information and the second information, and/or adjusts the transmit power of the uplink information based on the transmit powers of the first information, the second information, and the third information.

For example, if the channels in descending order of priority are sequentially: the first channel, the fourth channel, the second channel, and the third channel, the first terminal device adjusts the transmit power of the uplink information based on a transmit power of the first information, adjusts a transmit power of the second information based on the transmit powers of the first information and the uplink information, and/or adjusts a transmit power of the third information based on the transmit powers of the first information, the uplink information, and the second information.

For example, if the channels in descending order of priority are sequentially: the fourth channel, the first channel, the second channel, and the third channel, the first terminal device adjusts a transmit power of the first information based on the transmit power of the uplink information, adjusts a transmit power of the second information based on the transmit powers of the uplink information and the first information, and/or adjusts a transmit power of the third information based on the transmit powers of the uplink information, the first information, and the second information.

For example, a priority relationship among the uplink transmission, the PSSCH, the PSCCH, and the PSUCCH (or PSFCH) is: the PSSCH<the PSCCH<the UL<the PSUCCH (or PSFCH). If the first channel is the PSSCH, the second channel is the PSCCH, and the third channel is the PSUCCH (or PSFCH), the first terminal device may adjust the power of the uplink transmission based on a power of the PSUCCH (or PSFCH), adjust a power of the PSCCH based on the powers of the uplink transmission and the PSUCCH, and/or adjust a power of the PSSCH based on the powers of the uplink transmission, the PSUCCH, and the PSCCH.

For example, a priority relationship among the uplink transmission, the PSSCH, the PSCCH, and the PSUCCH (or PSFCH) is: the PSSCH<the UL<the PSCCH<the PSUCCH (or PSFCH). If the first channel is the PSSCH, the second channel is the PSCCH, and the third channel is the PSUCCH (or PSFCH), the first terminal device may adjust a power of the PSCCH based on a power of the PSUCCH (or PSFCH), adjust the power of the uplink transmission based on the powers of the PSCCH and the PSUCCH, and/or adjust a power of the PSSCH based on the powers of the uplink transmission, the PSCCH, and the PSUCCH.

For example, a priority relationship among the uplink transmission, the PSSCH, the PSCCH, and the PSUCCH (or PSFCH) is: the PSSCH<the PSCCH<the UL<the PSUCCH (or PSFCH). If the first channel is the PSCCH, the second channel is the PSCCH, and the third channel is the PSUCCH (or PSFCH), the first terminal device may adjust the power of the uplink transmission based on a power of the PSUCCH (or PSFCH), adjust a power of the PSCCH based on the powers of the uplink transmission and the PSUCCH, and/or adjust a power of the PSSCH based on the powers of the PSCCH, the uplink transmission, and the PSUCCH.

For example, a priority relationship among the uplink transmission, the PSSCH, the PSCCH, and the PSUCCH (or PSFCH) is: the PSSCH<the PSCCH<the PSUCCH (or PSFCH)<the UL. If the first channel is the PSCCH, the second channel is the PSCCH, and the third channel is the PSUCCH (or PSFCH), the first terminal device may adjust a power of the PSUCCH (or PSFCH) based on the power of the uplink transmission, adjust a power of the PSCCH based on the powers of the PSUCCH (or PSFCH) and the uplink transmission, and/or adjust a power of the PSSCH based on the powers of the PSCCH, the PSUCCH (or PSFCH), and the uplink transmission.

Optionally, in Embodiment 1, the method for determining the priorities of the uplink transmission and the sidelink transmission may further include:

When the uplink information is uplink data information or uplink control information, the target information is transmitted on a first channel, and the uplink information is transmitted on a second channel. The priorities of the uplink transmission and the sidelink transmission are specifically priorities of the first channel and the second channel.

Optionally, in Embodiment 2, the method for adjusting the transmit power of the target information and/or the transmit power of the uplink information may further include:

If the priority of the first channel is higher than the priority of the second channel, the first terminal device adjusts the transmit power of the uplink information based on the transmit power of the target information, or if the priority of the second channel is higher than the priority of the first channel, the first terminal device adjusts the transmit power of the target information based on the transmit power of the uplink information.

For example, three cases of channels of the uplink transmission are considered: an uplink data channel PUSCH, an uplink control channel PUCCH, and an uplink data channel PUSCH with UCI (PUSCH with UCI).

For example, if a priority sequence is: the SL<the PUSCH<the PUSCH with UCI<the PUCCH, when the second channel is the PUSCH, the PUSCH with UCI, or the PUCCH, the first terminal device may adjust the transmit power of the SL based on a transmit power of the PUSCH, the PUSCH with UCI, or the PUCCH.

For example, if a priority sequence is: the PUSCH<the SL<the PUSCH with UCI<the PUCCH, when the second channel is the PUSCH, the first terminal device may adjust a transmit power of the PUSCH based on the transmit power of the SL. When the second channel is the PUCCH or the PUSCH with UCI, the first terminal device may adjust the transmit power of the SL based on a transmit power of the PUCCH or the PUSCH with UCI.

For example, if a priority sequence is: the PUSCH<the PUSCH with UCI<the SL<the PUCCH, when the second channel is the PUCCH, the first terminal device may adjust the transmit power of the SL based on a transmit power of the PUCCH. When the second channel is the PUSCH with UCI or the PUSCH, the first terminal device may adjust a transmit power of the PUSCH with UCI or the PUSCH based on the transmit power of the SL.

For example, if a priority sequence is: the PUSCH<the PUSCH with UCI<the PUCCH<the SL, when the second channel is the PUSCH, the PUSCH with UCI, or the PUCCH, the first terminal device may adjust a transmit power of the PUSCH, the PUSCH with UCI, or the PUCCH based on the transmit power of the SL.

Optionally, in Embodiment 1, the method for determining the priorities of the sidelink transmission and the uplink transmission may further include:

The uplink information includes fourth information and fifth information, the fourth information is uplink data information or uplink control information, and the fifth information is uplink data information or uplink control information. The target information is transmitted on a first channel, the fourth information is transmitted on a second channel, and the fifth information is transmitted on a third channel. The priorities of the uplink transmission and the sidelink transmission are specifically priorities of the first channel, the second channel, and the third channel. To distinguish from the first channel, the second channel, and the third channel in the foregoing embodiment, the first channel, the second channel, and the third channel in this embodiment may be alternatively described as a tenth channel, an eleventh channel, and a twelfth channel, respectively, or the first channel, the second channel, and the third channel in this embodiment may be described as a first channel, a second channel A, and a second channel B, respectively. This is not limited in this embodiment of this application.

Optionally, in Embodiment 2, the method for adjusting the transmit power of the target information and/or the transmit power of the uplink information may further include:

For example, if the channels in descending order of priority are sequentially: the first channel, the second channel, and the third channel, the first terminal device adjusts a transmit power of the fourth information based on the transmit power of the target information, and/or adjusts a transmit power of the fifth information based on the transmit powers of the target information and the fourth information.

For example, if the channels in descending order of priority are sequentially: the second channel, the first channel, and the third channel, the first terminal device adjusts the transmit power of the target information based on a transmit power of the fourth information, and/or adjusts a transmit power of the fifth information based on the transmit powers of the fourth information and the target information.

For example, if the channels in descending order of priority are sequentially: the second channel, the third channel, and the first channel, the first terminal device adjusts a transmit power of the fifth information based on a transmit power of the fourth information, and/or adjusts the transmit power of the target information based on the transmit powers of the fourth information and the fifth information.

For example, if a priority sequence is: the SL<the PUSCH<the PUSCH with UCI<the PUCCH, the fourth information is data information and is transmitted on the PUSCH, in other words, the second channel is the PUSCH, and the fifth information is control information and is transmitted on the PUCCH, in other words, the third channel is the PUCCH, a transmit power of the PUSCH may be adjusted based on a transmit power of the PUCCH, and/or the transmit power of the SL may be adjusted based on the transmit powers of the PUSCH and the PUCCH.

For example, if a priority sequence is: the PUSCH<the PUSCH with UCI<the PUCCH<the SL, the second channel is the PUSCH, and the third channel is the PUCCH, a transmit power of the PUCCH may be adjusted based on the transmit power of the SL, and/or a transmit power of the PUSCH may be adjusted based on the transmit powers of the PUCCH and the SL.

For example, if a priority sequence is: the PUSCH<the PUSCH with UCI<the SL<the PUCCH, the second channel is the PUCCH, and the third channel is the PUSCH, the transmit power of the SL may be adjusted based on a transmit power of the PUCCH, and/or a transmit power of the PUSCH may be adjusted based on the transmit powers of the SL and the PUCCH.

For example, if a priority sequence is: the PUSCH<the SL<the PUSCH with UCI<the PUCCH, the second channel is the PUCCH, and the third channel is the PUSCH, the transmit power of the SL may be adjusted based on a transmit power of the PUCCH, and/or a transmit power of the PUSCH may be adjusted based on the transmit powers of the SL and the PUCCH.

Embodiment 3

A transmit power of data information data is determined. Because a PSSCH is used to transmit the data, the transmit power of the data information data is also referred to as a transmit power of the PSSCH. The following uses $P_{PSSCH}$ to represent the transmit power of the PSSCH.

Example 1

For SL transmission based on a base station scheduling mode, transmit end UE may calculate the transmit power of the PSSCH according to the following process:

If power control signaling that is in sidelink scheduling and that is configured by a base station (or received by the UE) is set to o for a PSSCH period i, $P_{PSSCH}$ meets the following formula:

$P_{PSSCH} = P_{CMAX,PSSCH}.$

If power control signaling that is in sidelink scheduling and that is configured by a base station (or received by the UE) is set to 1 for a PSSCH period i, $P_{PSSCH}$ meets the following formula:

$P_{PSSCH} = \min\{P_{CMAX,PSSCH}, 10\log_{10}(M_{PSSCH}) + P_{O\_PSSCH,1} + \alpha_{PSSCH,1} \cdot PL\}[\text{dBm}].$ $P_{CMAX,PSSCH}$ is a maximum transmit power of PSSCH transmission of the UE. $M_{PSSCH}$ is a bandwidth of a resource that is allocated to the transmit end UE for sending the PSSCH (or a bandwidth of a PSSCH resource allocated by the base station to the transmit end UE, where the transmit end UE may determine, based on allocation by the base station, the bandwidth of the resource that is allocated to the transmit end UE for sending the PSSCH), namely, a bandwidth of a resource occupied by the PSSCH, and may be represented by a quantity of resource blocks. $PL=PL_c$, and $PL_c$ is a path loss (pathloss) on a carrier C. $P_{O\_PSSCH,1}$ and $\alpha_{PSSCH,1}$ are configured by using higher layer parameters, are associated with a configuration of the PSSCH resource, and may be higher layer parameters sent by the base station or an operator to the UE.

Example 2

For an SL based on a UE autonomous selection mode, transmit end UE may calculate the transmit power of the PSSCH according to the following process:

$P_{PSSCH}=\min\{P_{CMAX,PSSCH}, 10\log_{10}(M_{PSSCH})+P_{O\_PSSCH,2}+\alpha_{PSSCH,2} \cdot PL\}$ [dBm].

$P_{CMAX,PSSCH}$ is a maximum transmit power of PSSCH transmission of the UE. $M_{PSSCH}$ is a bandwidth of a PSSCH resource that is allocated to the transmit end UE, namely, a bandwidth of a resource occupied by the PSSCH, and may be represented by a quantity of resource blocks. $PL=PL_c$, and $PL_c$ is a path loss (pathloss) on a carrier C. $P_{O\_PSSCH,2}$ and $\alpha_{PSSCH,2}$ are configured by using higher layer parameters, are associated with a configuration of the PSSCH resource, and may be higher layer parameters sent by the base station or an operator to the UE.

Example 3

For SL transmission based on a base station scheduling mode, transmit end UE may calculate the transmit power of the PSSCH according to the following process:

$$P_{PSSCH} = 10\log_{10}\left(\frac{M_{PSSCH}}{M_{PSSCH} + 10^{\frac{3}{10}} \times M_{PSCCH}}\right) + \min\{P_{CMAX}, 10\log_{10}(M_{PSSCH} + 10^{\frac{3}{10}} \times M_{PSCCH}) + P_{O\_PSSCH,3} + \alpha_{PSSCH,3} \cdot PL\}[dBm$$

$P_{CMAX}$ is a maximum transmit power the UE. $M_{PSSCH}$ is a bandwidth of a PSSCH resource that is allocated to the transmit end UE (or a bandwidth of a PSSCH resource allocated by the base station to the transmit end UE, where the transmit end UE may determine, based on allocation by the base station, the bandwidth of the resource that is allocated to the transmit end UE for sending the PSSCH), namely, a bandwidth of a resource occupied by the PSSCH, and may be represented by a quantity of resource blocks. $PL=PL_c$, and $PL_c$ is a path loss (pathloss) on a carrier C. $P_{O\_PSSCH,3}$ and $\alpha_{PSSCH,3}$ are configured by using higher layer parameters, are associated with a configuration of the PSSCH resource, and may be higher layer parameters sent by the base station or an operator to the UE.

Example 4

For an SL based on a UE autonomous selection mode, transmit end UE may calculate the transmit power of the PSSCH according to the following process:

$$P_{PSSCH} = 10\log_{10}\left(\frac{M_{PSSCH}}{M_{PSSCH} + 10^{\frac{3}{10}} \times M_{PSCCH}}\right) + A[$$

$P_{CMAX}$ is a maximum transmit power of PSSCH transmission of the UE. $M_{PSSCH}$ is a bandwidth of a PSSCH resource that is allocated to the transmit end UE, namely, a bandwidth of a resource occupied by the PSSCH, and may be represented by a quantity of resource blocks. $PL=PL_c$, and $PL_c$ is a path loss (pathloss) on a carrier C. $P_{O\_PSSCH,4}$ and $\alpha_{PSSCH,4}$ are configured by using higher layer parameters, are associated with a configuration of the PSSCH resource, and may be higher layer parameters sent by the base station or an operator to the UE.

If a higher layer parameter maxTxpower is configured for the UE, in other words, if the higher layer parameter indicates a maximum transmit power of the UE, $$A = \min\{P_{CMAX}, P_{MAX\_CBR}, 10\log_{10}(M_{PSSCH} + 10^{\frac{3}{10}} \times M_{PSCCH}) + P_{O\_PSSCH,4} + \alpha_{PSSCH,4} \cdot PL\}.$$

If a higher layer parameter maxTxpower is not configured for the UE, $$A = \min\{P_{CMAX}, 10\log_{10}(M_{PSSCH} + 10^{\frac{3}{10}} \times M_{PSCCH}) + P_{O\_PSSCH,4} + \alpha_{PSSCH,4} \cdot PL\}.$$

$P_{MAX\_CBR}$ may be set to a value of maxTxpower based on a priority level of the PSSCH and a measured channel busy ratio (CBR) range. A CBR may be a ratio of resources on which a power of a signal on available resources exceeds a threshold to total available resources within a specific time.

A transmit power of scheduling assignment information SA is determined. Because the SA is sent on a PSCCH, the transmit power of the SA may also be referred to as a transmit power of the PSCCH.

Example 1

For SL transmission based on a base station scheduling mode, transmit end UE may calculate the transmit power of the PSCCH according to the following process:

If a power control signaling field that is in sidelink scheduling and that is configured by a base station (or received by the UE) is set to 0 for a PSCCH period i, $P_{PSCCH}=P_{CMAX,PSCCH}$.

If a power control signaling field that is in sidelink scheduling and that is configured by a base station (or received by the UE) is set to 1 for a PSCCH period i, $P_{PSCCH}=\min\{P_{CMAX,PSCCH}, 10\log_{10}(M_{PSCCH})+P_{O\_PSCCH,1}+\alpha_{PSCCH,1} \cdot PL\}$ [dBm].

$P_{CMAX,PSSCH}$ is a maximum transmit power of PSSCH transmission of the UE. $M_{PSCCH}=1$. $PL=PL_c$, and $PL_c$ is a path loss (pathloss) on a carrier C. $P_{O\_PSCCH,1}$ and $\alpha_{PSCCH,1}$ are configured by using higher layer parameters, are associated with a configuration of a PSCCH resource, and may be higher layer parameters sent by the base station or an operator to the UE.

Example 2

For an SL based on a UE autonomous selection mode, transmit end UE may calculate the transmit power of the PSCCH according to the following process:

$$P_{PSCCH} = \min\{P_{CMAX,PSCCH}, 10 \log_{10}(M_{PSCCH}) + P_{O\_PSCCH,2} + \alpha_{PSCCH,2} \cdot PL\}[dBm].$$

$P_{CMAX,PSCCH}$ is a maximum transmit power of PSSCH transmission of the UE, and may be configured by using a higher layer parameter. $M_{PSCCH}=1$. $PL=PL_c$, and $PL_c$ is a path loss (pathloss) on a carrier C. $P_{O\_PSCCH,2}$ and $\alpha_{PSCCH,2}$ are configured by using higher layer parameters, are associated with a configuration of a PSCCH resource, and may be higher layer parameters sent by the base station or an operator to the UE.

Example 3

For SL transmission based on base station scheduling, because in V2X, a PSSCH and a PSCCH are based on frequency division, a power of the PSSCH needs to be considered when a power of the PSCCH is determined. Transmit end UE may calculate the transmit power of the PSCCH according to the following process:

$$P_{PSCCH} = 10\log_{10}\left(\frac{10^{\frac{3}{10}} \times M_{PSCCH}}{M_{PSSCH} + 10^{\frac{3}{10}} \times M_{PSCCH}}\right) +$$
$$\min\{P_{CMAX}, 10\log_{10}(M_{PSSCH} + 10^{\frac{3}{10}} \times M_{PSCCH}) + P_{O\_PSSCH,3} + \alpha_{PSSCH,3} \cdot PL\}[dBm].$$

$P_{CMAX}$ is a maximum transmit power the UE. $M_{PSSCH}$ is a bandwidth of a PSSCH resource that is allocated to the transmit end UE (or a bandwidth of a PSSCH resource allocated by the base station to the transmit end UE, where the transmit end UE may determine, based on allocation by the base station, the bandwidth of the resource that is allocated to the transmit end UE for sending the PSSCH), namely, a bandwidth of a resource occupied by the PSSCH, and may be represented by a quantity of resource blocks. $M_{PSCCH}=2$. $PL=PL_c$, and $PL_c$ is a path loss (pathloss) on a carrier C. $P_{O\_PSSCH,3}$ and $\alpha_{PSSCH,3}$ are configured by using higher layer parameters, are associated with a configuration of the PSSCH resource, and may be higher layer parameters sent by the base station or an operator to the UE.

Example 4

For an SL based on a UE autonomous selection mode, transmit end UE may calculate the transmit power of the PSCCH according to the following process:

$$P_{PSCCH} = 10\log_{10}\left(\frac{10^{\frac{3}{10}} \times M_{PSCCH}}{M_{PSSCH} + 10^{\frac{3}{10}} \times M_{PSCCH}}\right) + B[dBm].$$

$P_{CMAX}$ is a maximum transmit power of PSSCH transmission. $M_{PSSCH}$ is a bandwidth of a PSSCH resource that is allocated to the transmit end UE, namely, a bandwidth of a resource occupied by the PSSCH, and may be represented by a quantity of resource blocks. $M_{PSCCH}=2$. $PL=PL_c$, and $PL_c$ is a path loss (pathloss) on a carrier C. $P_{O\_PSSCH,4}$ and $\alpha_{PSSCH,4}$ are configured by using higher layer parameters, are associated with a configuration of the PSSCH resource, and may be higher layer parameters sent by the base station or an operator to the UE.

If a higher layer parameter maximum transmit power (maxTxpower) is configured for the UE, in other words, if the higher layer parameter indicates a maximum transmit power of the UE, $$B = \min\{P_{CMAX}, P_{MAX\_CBR}, 10\log_{10}(M_{PSSCH} + 10^{\frac{3}{10}} \times M_{PSCCH}) + P_{O\_PSSCH,4} + \alpha_{PSSCH,4} \cdot PL\}.$$

If a higher layer parameter maxTxpower is not configured for the UE, $$B = \min\{P_{CMAX}, 10\log_{10}(M_{PSSCH} + 10^{\frac{3}{10}} \times M_{PSCCH}) + P_{O\_PSSCH,4} + \alpha_{PSSCH,4} \cdot PL\}.$$

$P_{MAX\_CBR}$ may be set to a value of maxTxpower based on a priority level of the PSSCH and a measured CBR (channel busy ratio) range.

Because uplink information is transmitted on a PUSCH and/or a PUCCH, a transmit power of the uplink information may also be referred to as a transmit power of the PUSCH and/or a transmit power of the PUCCH.

Example 1

The transmit power of the PUSCH is calculated:
If UE transmits the PUSCH in an active uplink BWP b of a carrier f of a serving cell c using a parameter set configuration with an index j and a PUSCH power control adjustment state with an index l, a PUSCH transmit power $P_{PUSCH,b,f,c}(i,j,q_d,l)$ of the UE in a PUSCH transmission occasion i is:

$$P_{PUSCH,b,f,c}(i, j, q_d, l) = \min\begin{Bmatrix} P_{CMAX,f,c}(i), \\ P_{O\_PUSCH,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix} [dBm].$$

$P_{CMAX,f,c}(i)$ is a UE configured maximum transmit power for the carrier f of the serving cell c in the PUSCH transmission occasion i. $P_{O\_PUSCH,b,f,c}(j)$ is a parameter composed of a sum of $P_{O\_NOMINAL\_PUSCH,f,c}(j)$ and $P_{O\_UE\_PUSCH,b,f,c}(j)$, where $j \in \{0, 1, \ldots, J-1\}$. For the carrier f of the serving cell c, if the base station does not notify the UE of a higher layer parameter Po-PUSCH-AlphaSet, j=0, $P_{O\_UE\_PUSCH,b,f,c}(0)=0$, and $P_{O\_NOMINAL\_PUSCH,f,c}(0)=P_{O\_PRE}+\Delta_{PREAMBLE\_Msg\ 3}$, where a higher layer parameter preambleReceivedTargetPower is used to determine $P_{O\_PRE}$, and a higher layer parameter msg3-DeltaPreamble is used to determine $\Delta_{PREAMBLE\_Msg\ 3}$.

For the carrier f of the serving cell c, for $j \in \{2, \ldots, J-1\}=S_J$, if the base station provides a parameter p0-NominalWithGrant for the UE, a $P_{O\_NOMINAL\_PUSCH,f,c}(j)$ value is applicable for all $j \in S_J$. If the parameter is not provided, $P_{O\_NOMINAL\_PUSCH,f,c}(j)=P_{O\_NOMINAL\_PUSCH,f,c}(0)$. If a set of $P_{O\_UE\_PUSCH,b,f,c}(j)$ values is a set of po values in the parameter Po-PUSCH-AlphaSet, the parameter is indicated by po-PUSCH-AlphaSetId for the active uplink BWP b of the carrier f of the serving cell c.

For $\alpha_{b,f,c}(j)$, for j=0, if the base station notifies the UE of this parameter, $\alpha_{b,f,c}(0)$ is a value of a parameter msg3-Alpha. If the base station does not notify the UE of this parameter, $\alpha_{b,f,c}(0)=1$. For j=1, $\alpha_{b,f,c}(1)$ is an alpha value obtained from a parameter po-PUSCH-Alpha. The parameter is a parameter in a parameter set corresponding to an index Po-PUSCH-AlphaSetId that is in ConfiguredGrant-Config and that is configured by the base station for the UE for the activate uplink BWP b of the carrier f of the serving cell c.

For $j \in S_j$, a set of $\alpha_{b,f,c}(j)$ values are determined by using a parameter alpha in a parameter set Po-PUSCH-AlphaSet that corresponds to the identity Po-PUSCH-AlphaSetId configured by the base station for the UE and that is for the activate uplink BWP b of the carrier f of the serving cell c.

$M_{RBb,f,c}^{PUSCH}(i)$ is a bandwidth of the PUSCH resource assignment expressed in quantity of resource blocks (RBs) for the PUSCH transmission occasion in the activate uplink BWP b of the carrier f of the serving cell c. μ is a subcarrier spacing configuration.

$PL_{b,f,c}(q_d)$ is a downlink path loss estimated in dB and is calculated by the UE using a reference signal index $q_d$ for an active DL BWP of the serving cell c. A downlink reference signal may be an SS/PBCH, a CSI-RS, or the like.

$\Delta_{TF,b,f,c}(i) = 10 \log_{10}((2^{BPRE \cdot K_s} - 1) \cdot \beta_{offset}^{PUSCH})$ for $K_s = 1.25$, and $\Delta_{TF,b,f,c}(i) = 0$ for $K_s = 0$, where $K_s$ is determined by using a parameter deltaMCS configured by the base station. If the PUSCH transmission is over more than one layer, $\Delta_{TF,b,f,c}(i) = 0$. For the active uplink BWP b of the carrier f and the serving cell c, BPRE and $\beta_{offset}^{PUSCH}$ are computed as:

$$BPRE = \sum_{r=0}^{C-1} K_r / N_{RE}$$

for a PUSCH with uplink data and $BPRE = Q_m \cdot R/X$ for CSI feedback on a PUSCH without uplink data, where a value of X is 1 to $\beta_{offset}^{CSI,1}$.

C is a quantity of code blocks, $K_r$ is a size of a code block r, and $N_{RE}$ is a quantity of resource elements determined as $$N_{RE} = M_{RB,b,f,c}^{PUSCH}(i) \cdot \sum_{j=0}^{N_{symb,b,f,c}^{PUSCH}(i)-1} N_{sc,data}^{RB}(i,j),$$

where $N_{PUSCH}^{symb,b,f,c}(i)$ is a quantity of PUSCH symbols for the PUSCH transmission occasion i in the active uplink BWP b of the carrier f of the serving cell c, and $N_{sc,data}^{RB}(i,j)$ is a quantity of subcarriers excluding DMRS subcarriers and PTRS (phase-tracking RS) subcarriers in a PUSCH symbol j.

$\beta_{offset}^{PUSCH} = 1$ when the PUSCH includes uplink data, and $\beta_{offset}^{PUSCH} = \beta_{offset}^{CSI,1}$ when the PUSCH includes CSI and does not include uplink data. $Q_m$ is a modulation order, and R is a target code rate, and may be obtained by using an indication in DCI. For the PUSCH power control adjustment state $f_{b,f,c}(i,l)$ for the active uplink BWP b of the carrier f of the serving cell c in the PUSCH transmission occasion i:

$\delta_{PUSCH,b,f,c}(i,l)$ is a value of a transmit power control command field (a TPC command value) included in DCI that schedules the PUSCH transmission occasion i in the active uplink BWP b of the carrier f of the serving cell c. $l \in \{0,1\}$ if the UE is configured with a higher layer parameter twoPUSCH-PC-AdjustmentStates, and l=0 if the UE is not configured with the parameter.

$$f_{b,f,c}(i,l) = f_{b,f,c}(i - i_0, l) + \sum_{m=0}^{\mathcal{C}(D_i)-1} \delta_{PUSCH,b,f,c}(m,l)$$

is the PUSCH power control adjustment state l for the active uplink BWP b of the carrier f of the serving cell c and the PUSCH transmission occasion i if the UE is not configured with a higher layer parameter tpc-Accumulation, where a value of $\delta_{PUSCH,b,f,c}$ is determined according to Table 1.

$$\sum_{m=0}^{\mathcal{C}(D_i)-1} \delta_{PUSCH,b,f,c}(m,l)$$

is a sum of TPC command values. If the UE has reached a maximum power of the UE for the active uplink BWP b of the carrier f of the serving cell c in a PUSCH transmission occasion $i - i_0$, and $$\sum_{m=0}^{\mathcal{C}(D_i)-1} \delta_{PUSCH,b,f,c}(m,l) \geq 0, f_{b,f,c}(i,l) = f_{b,f,c}(i - i_0, l).$$

If the UE has reached a maximum power of the UE for the active uplink BWP b of the carrier f of the serving cell c in a PUSCH transmission occasion $i - i_0$, and $$\sum_{m=0}^{c(D_i)-1} \delta_{PUSCH,b,f,c}(m,l) \leq 0,$$

$$f_{b,f,c}(i,l) = f_{b,f,c}(i - i_0, l).$$

The UE resets accumulation of a PUSCH power control adjustment state l for the active uplink BWP b of the carrier f of the serving cell c to $f_{b,f,c}(0,l)=0$ if the base station provides a value of a parameter $P_{O\_UE\_PUSCH,b,f,c}(j)$ for the UE by using higher layers, and if the base station provides a value of a parameter $\alpha_{b,f,c}(j)$ for the UE by using higher layers. $f_{b,f,c}(i,l) = \delta_{PUSCH,b,f,c}(i,l)$ is the PUSCH power control adjustment state for the active uplink BWP b of the carrier f of the serving cell c and the PUSCH transmission occasion i if the UE is configured with the higher layer parameter tpc-Accumulation. $\delta_{PUSCH,b,f,c}$ is absolute values in Table 3.

TABLE 3

Mapping of TPC values in the DCI to absolute values or accumulated values ($\delta_{PUSCH,b,f,c}$ values or $\delta_{SRS,b,f,c}$ values)

| Transmit power control command field (TPC Command Field) | Accumulated value (Accumulated $\delta_{PUSCH,b,f,c}$ or $\delta_{SRS,b,f,c}$ [dB]) | Absolute value (Absolute $\delta_{PUSCH,b,f,c}$ or $\delta_{SRS,b,f,c}$ [dB]) |
|---|---|---|
| 0 | −1 | −4 |
| 1 | 0 | −1 |
| 2 | 1 | 1 |
| 3 | 3 | 4 |

Example 2

The transmit power of the PUCCH is calculated:

If UE transmits a PUCCH in an active uplink BWP b of a carrier f in the serving cell c using a PUCCH power control adjustment state with an index l, the UE determines the transmit power of the PUCCH in a PUCCH transmission occasion as:

$$P_{PUCCH,b,f,c}(i, q_u, q_d, l) =$$
$$\min \begin{Bmatrix} P_{CMAX,b,f,c}(i), \\ P_{O\_PUCCH,b,f,c}(q_u) + 10 \log_{10}(2^\mu \cdot M_{RB,b,f,c}^{PUCCH}(i)) + \\ PL_{b,f,c}(q_d) + \Delta_{F\_PUCCH}(F) + \Delta_{TF,b,f,c}(i) + g_{b,f,c}(i, l) \end{Bmatrix} \text{ [dBm]}.$$

$P_{CMAX,f,c}(i)$ is the UE configured maximum output power for the carrier f of the serving cell c in the PUCCH transmission occasion i.

$P_{O\_PUCCH,b,f,c}(q_u)$ is a parameter composed of the sum of two components. The first component is $P_{O\_NOMINAL\_PUCCH}$ if the base station provides a parameter po-nominal for the UE, that is, a value of the parameter. If the base station does not provide the parameter po-nominal for the UE, the first component is $P_{O\_NOMINAL\_PUCCH}=0$ dBm. The second component is a parameter $P_{O\_UE\_PUCCH}(q_u)$ for the active uplink BWP b of the carrier f of the serving cell c if the base station provides a parameter po-PUCCH-Value for the UE, where $0 \le q_u^u < Q_u$, and $Q_u$ is a size for a set of $P_{O\_UE\_PUCCH}$ values that may be provided by using a parameter maxNrof-PUCCH-Po-PerSet. The $P_{O\_UE\_PUCCH}$ values are determined by a parameter po-Set. If the parameter po-Set is not configured for the UE, $P_{O\_UE\_PUCCH}(q_u)=0$, and $0 \le q_u < Q_u$.

$M_{RB,b,f,c}^{PUCCH}(i)$ is a bandwidth of the PUCCH resource assignment for a PUCCH transmission occasion i in the active uplink BWP b of the carrier f of the serving cell c and may be expressed in quantity of RBs.

$PL_{b,f,c}(q_d)$ is a downlink path loss estimated in dB calculated by the UE using a downlink reference signal RS resource index $q_d$ for the active downlink BWP of the carrier f of the serving cell c. A downlink reference signal may be an SS/PBCH, a CSI-RS, or the like.

The parameter $\Delta_{F\_PUCCH}(F)$ is determined according to a higher layer parameter deltaF-PUCCH-f0 for PUCCH format 0, is determined according to a higher layer parameter deltaF-PUCCH-f1 for PUCCH format 1, is determined according to deltaF-PUCCH-f2 for PUCCH format 2, is determined according to a higher layer parameter deltaF-PUCCH-f3 for PUCCH format 3, and is determined according to a higher layer parameter deltaF-PUCCH-f4 for PUCCH format 4. The higher layer parameter is sent by the base station to the UE.

$\Delta_{TF,b,f,c}(i)$ is a PUCCH transmission power adjustment component in the active uplink BWP b of the carrier f of the serving cell c.

For a PUCCH transmission using the PUCCH format 0 or the PUCCH format 1, a value of a parameter for PUCCH transmission is $$\Delta_{TF,b,f,c}(i) = 10 \log_{10}\left(\frac{N_{ref}^{PUCCH}}{N_{PUCCH}^{symb}(i)}\right) + \Delta_{UCI}(i),$$

where $N_{symb}^{PUCCH}(i)$ is a quantity of PUCCH format 0 symbols or PUCCH format 1 symbols. $N_{ref}^{PUCCH}=2$ for the PUCCH format 0. $N_{ref}^{PUCCH}=N_{symb}^{slot}$ for the PUCCH format 1. $\Delta_{UCI}(i)=0$ for the PUCCH format 0. $\Delta_{UCI}(i)=10 \log_{10}(O_{UCI}(i))$ for the PUCCH format 1, where $O_{UCI}(i)$ is a quantity of UCI bits in the PUCCH transmission occasion i.

For a PUCCH transmission using the PUCCH format 2 or the PUCCH format 3 or the PUCCH format 4 and for a quantity of UCI bits less than or equal to 11, $\Delta_{TF,b,f,c}(i)=10 \log_{10}(K_1 \cdot (n_{HARQ-ACK}(i)+O_{SR}(i)+O_{CSI}(i))/N_{RE}(i)$, where $K_1=6$, $n_{HARQ-ACK}(i)$ is a quantity of HARQ-ACK information bits, $O_{SR}(i)$ is a quantity of SR (scheduling request) information bits, $O_{CSI}(i)$ is a quantity of CSI information bits, and $N_{RE}(i)$ is a quantity of resource elements determined by the UE as follows: b for the active uplink BWP b of the carrier f of the serving cell c, where $N_{sc,ctrl}^{RB}(i)$ is a quantity of subcarriers per resource block excluding subcarriers used for DMRS transmission, and $N_{symb-UCI,b,f,c}^{PUCCH}(i)$ is a quantity of symbols excluding symbols used for DMRS transmission.

For a PUCCH transmission using the PUCCH format 2 or the PUCCH format 3 or the PUCCH format 4 and for a quantity of UCI bits greater than 11, $\Delta_{TF,b,f,c}(i)=10 \log_{10}(2^{K_2 \cdot BPRE(i)}-1)$, where $K_2=2.4$, $BPRE(i)=(O_{ACK}(i)+O_{SR}(i)+O_{CSI}(i)+O_{CRC}(i))/N_{RE}(i)$, $O_{ACK}(i)$ is a quantity of HARQ-ACK information bits, $O_{SR}(i)$ is a quantity of SR (scheduling request) information bits, $O_{CSI}(i)$ is a quantity of CSI information bits, $O_{CRC}(i)$ is a quantity of CRC (cyclic redundancy check) information bits, and $N_{RE}(i)$ is a quantity of resource elements determined by the UE as follows: $N_{RE}(i)=M_{RB,b,f,c}^{PUCCH}(i) \cdot N_{sc,ctrl}^{PUCCH}(i) \cdot N_{symb-UCL,b,f,c}^{PUCCH}(i)$ for the active uplink BWP b of the carrier f of the serving cell c, where $N_{sc,ctrl}^{RB}(i)$ is a quantity of subcarriers per resource block excluding subcarriers used for DMRS transmission, and $N_{symb-UCL,b,f,c}^{PUCCH}(i)$ is a quantity of symbols excluding symbols used for DMRS transmission.

For the PUCCH power control adjustment state $g_{b,f,c}(i,l)$ for the active uplink BWP b of the carrier f of the serving cell c and the PUCCH transmission occasion i: $\delta_{PUCCH,b,f,c}(i,l)$ is a TPC command value (a TPC command value) included in DCI that schedules the PUCCH transmission occasion i in the active uplink BWP b of carrier f of the serving cell c, l $\in \{0,1\}$ if the base station sends a higher layer parameter twoPUSCH-PC-AdjustmentStates to the UE, and l=0 if the base station does not send the parameter to the UE, $$g_{b,f,c}(i, l) = g_{b,f,c}(i - i_0, l) + \sum_{m=0}^{c(C_i)-1} \delta_{PUCCH,b,f,c}(m, l)$$

is a current PUCCH power control adjustment state l for the active uplink BWP b of the carrier f of the serving cell c and the PUCCH transmission occasion i.

The $\delta_{PUCCH,b,f,c}$ values are determined according to Table 4.

$$\sum_{m=0}^{\mathcal{C}(C_i)-1} \delta_{PUSCH,b,f,c}(m, l)$$

is a sum of TPC command values. If the UE has reached a maximum power of the UE for the active uplink BWP b of the carrier f of the serving cell c in a PUCCH transmission occasion $i-i_0$, and $$\sum_{m=0}^{c(C_i)-1} \delta_{PUCCH,b,f,c}(m, l) \geq 0,$$

$$g_{b,f,c}(i, l) = g_{b,f,c}(i - i_0, l).$$

If the UE has reached a maximum power of the UE for the active uplink BWP b of the carrier f of the serving cell c in a PUCCH transmission occasion $i-i_0$, and $$\sum_{m=0}^{c(C_i)-1} \delta_{PUCCH,b,f,c}(m, l) \leq 0,$$

$$g_{b,f,c}(i, l) = g_{b,f,c}(i - i_0, l).$$

For the active uplink BWP b of the carrier f of the serving cell c, if the base station configures a value of the parameter $P_{O\_PUCCH,b,f,c}(q_u)$ for the UE by using a higher layer, $g_{b,f,c}(0,l)=0$, else $g_{b,f,c}(0,l)=\Delta P_{rampup,b,f,c}+\delta_{msg2,b,f,c}$, where $\delta_{msg2,b,f,c}$ is a TPC command value indicated in a random access response grant corresponding to a PRACH transmission in the active uplink BWP b of the carrier f of the serving cell c, and if the UE transmits the PUCCH, $$\Delta P_{rampup,b,f,c} = \min\left[\max\begin{pmatrix} 0, \\ P_{CMAX,f,c} - (P_{O\_PUCCH,b,f,c} + PL_{b,f,c}(q_d) + \\ \Delta_{F\_PUCCHH}(F) + \Delta_{TF,b,f,c} + \delta_{msg2,b,f,c}) \end{pmatrix}, \\ \Delta P_{rampuprequaested,b,f,c} \right];$$

else $$\Delta P_{rampup,b,f,c} = \min\left[\max\begin{pmatrix} 0, \\ P_{CMAX,f,c} - (P_{O\_PUCCH,b,f,c} + PL_{b,f,c}(q_d)) \end{pmatrix}, \\ \Delta P_{rampuprequaested,b,f,c} \right],$$

where $\Delta P_{rampuprequested,b,f,c}$ is provided by higher layers and corresponds to the total power ramp-up from the first to the last preamble, and $\Delta_{F\_PUCCH}(F)$ corresponds to PUCCH format 0 or PUCCH format 1.

TABLE 4

Mapping of TPC values in DCI to accumulated values ($\delta_{PUCCH,b,f,c}$ values)

| Transmit power control command field (TPC Command Field) | Accumulated value (Accumulated $\delta_{PUCCH,b,f,c}$ [dB]) |
| --- | --- |
| 0 | −1 |
| 1 | 0 |
| 2 | 1 |
| 3 | 3 |

In the embodiments of this application, the method provided in the embodiments of this application is described from perspectives of the network device, the terminal, and interaction between the network device and the terminal. To implement the functions of the methods provided in the embodiments of this application, both the network device and the terminal may include a hardware structure and/or a software module, to implement the functions in a form of the hardware structure, the software module, or a combination of the hardware structure and the software module. Whether a specific function in the foregoing functions is performed by the hardware structure, the software module, or the combination of the hardware structure and the software module depends on a specific application and a design constraint of the technical solutions.

Figure 29:
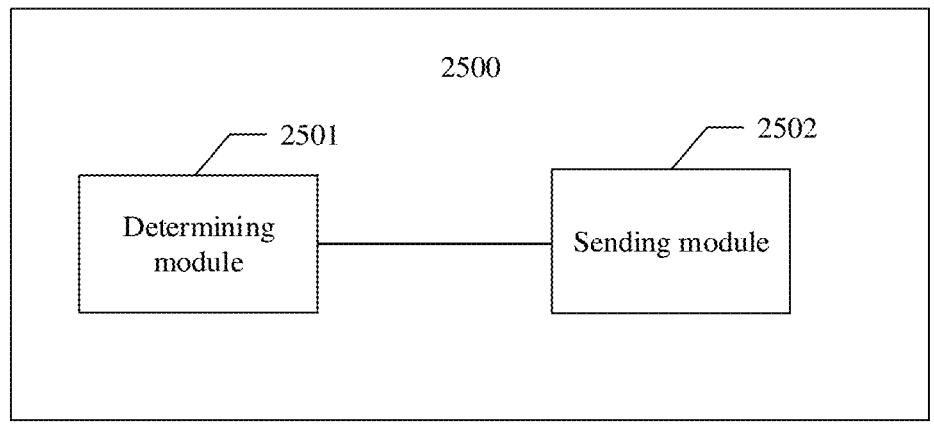
FIG. 29 is a schematic structural diagram of an apparatus according to an embodiment of this application.

Same as the foregoing concept, as shown in FIG. 29, an embodiment of this application further provides an apparatus 2500, configured to implement a function of the first terminal device in the foregoing method. The apparatus may be a terminal device or an apparatus in a terminal device. The apparatus may be a chip system. In this embodiment of this application, the chip system may include a chip, or may include a chip and another discrete component. The apparatus 2500 may include: a determining module 2501, configured to determine a transmit power of uplink information and a transmit power of target information based on the target information and priorities of uplink transmission and sidelink transmission, where the uplink transmission includes: transmitting the uplink information by the first terminal device to a network device, the sidelink transmission includes: transmitting sidelink information by the first terminal device to a second terminal device, the target information is information that is in the sidelink information and that overlaps with the uplink information in time domain in a scheduling time unit, and the target information is at least one of data information, scheduling assignment information, or sidelink feedback information, and a sending module 2502, configured to send the uplink information based on the transmit power of the uplink information, and/or send the target information based on the transmit power of the target information.

For specific execution processes of the determining module 2501 and the sending module 2502, refer to the descriptions in the foregoing method embodiment. Division into modules in the embodiments of this application is an example, is only logical function division, and may be other division in an actual implementation. In addition, function modules in the embodiments of this application may be integrated into one processor, or may exist alone physically, or two or more modules are integrated into one module. The integrated module may be implemented in a form of hardware, or may be implemented in a form of a software functional module.

Figure 30:
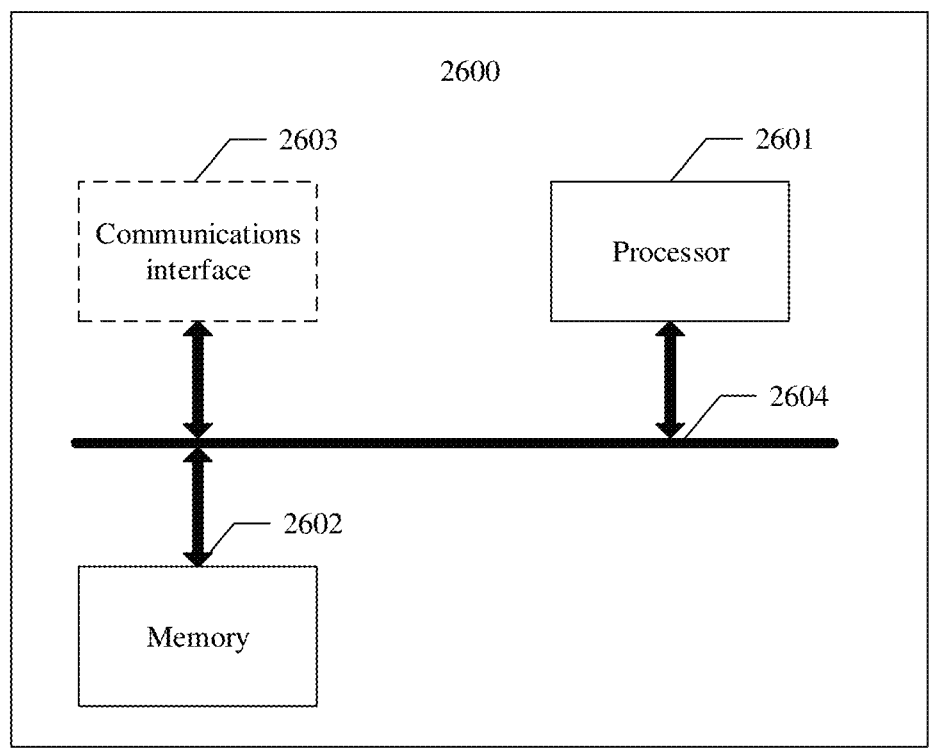
FIG. 30 is a schematic structural diagram of an apparatus according to an embodiment of this application.

Same as the foregoing concept, as shown in FIG. 30, an embodiment of this application provides an apparatus 2600, configured to implement functions of the first terminal device in the foregoing method. The apparatus may be a terminal device or an apparatus in a terminal device.

The apparatus 2600 includes at least one processor 2601, configured to implement a function of the first terminal device in the foregoing method. For example, the processor 2601 may determine a transmit power of uplink information and a transmit power of target information based on the target information and priorities of uplink transmission and sidelink transmission. For details, refer to detailed descriptions in the method. Details are not described herein again.

The apparatus 2600 may further include at least one memory 2602, configured to store program instructions and/or data. The memory 2602 is coupled to the processor 2601. Coupling in this embodiment of this application is an indirect coupling or a communication connection between apparatuses, units, or modules, may be in an electrical form, a mechanical form, or another form, and is used for information exchange between the apparatuses, the units, or the modules. The processor 2601 may cooperate with the memory 2602 in performing an operation. The processor 2601 may execute the program instructions stored in the memory 2602. At least one of the at least one memory may be included in the processor.

The apparatus 2600 may further include a communications interface 2603, configured to communicate with another device through a transmission medium, so that an apparatus in the apparatus 2600 can communicate with the another device. For example, the communications interface 2603 may be a transceiver, a circuit, a bus, a module, or a communications interface of another type, and the another device may be a second terminal device or a network device. The processor 2601 receives and sends data through the communications interface 2603, and is configured to implement the method in the foregoing embodiments.

In this embodiment of this application, a specific connection medium between the communications interface 2603, the processor 2601, and the memory 2602 is not limited. In this embodiment of this application, the memory 2602, the processor 2601, and the communications interface 2603 are connected through a bus 2604 in FIG. 26, and the bus is represented by a bold line in FIG. 26. A manner of connection between other components is schematically described, and is not limited thereto. The bus may be classified into an address bus, a data bus, a control bus, or the like. For ease of representation, only one thick line is used to represent the bus in FIG. 26, but this does not mean that there is only one bus or only one type of bus.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor or any conventional processor or the like. The steps of the methods disclosed with reference to the embodiments of this application may be directly performed by a hardware processor, or may be performed by a combination of hardware and software modules in the processor.

In this embodiment of this application, the memory may be a non-volatile memory, for example, a hard disk drive (HDD) or solid-state drive (SSD), or may be a volatile memory, for example, a random-access memory (RAM). The memory is any other medium that can be used to carry or store expected program code in a form of an instruction or a data structure and that can be accessed by a computer. However, this is not limited thereto. The memory in the embodiments of this application may alternatively be a circuit or any other apparatus that can implement a storage function, and is configured to store a program instruction and/or data.

All or some of the foregoing methods in the embodiments of this application may be implemented by using software, hardware, firmware, or any combination thereof. When software is used to implement the embodiments, the embodiments may be all or partially implemented in a form of a computer program product. The computer program product includes one or more computer instructions. When the computer program instructions are loaded and executed on a computer, all or some of the procedures or the functions according to the embodiments of the present invention are generated. The computer may be a general-purpose computer, a special-purpose computer, a computer network, a network device, a user device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

It is clear that a person skilled in the art can make various modifications and variations to this application without departing from the scope of this application. This application is intended to cover these modifications and variations of this application provided that they fall within the scope of protection defined by the following claims and their equivalent technologies.

In the embodiments of this application, "at least one" means one or more, and "a plurality of" means two or more than two. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one (one piece) of the following" or a similar expression thereof refers to any combination of these items, including any combination of singular items (pieces) or plural items (pieces). For example, at least one of a, b, or c may represent: a, b, c, a and b, a and c, b and c, or a, b, and c, and a, b, and c may be singular or plural.

What is claimed is:

1. A power control method, comprising:
   determining a transmit power of uplink information and a transmit power of target information based on the target information and priorities of uplink transmission and sidelink transmission, wherein the uplink transmission comprises transmission of the uplink information by a first terminal device to a network device, wherein the sidelink transmission comprises transmission of sidelink information by the first terminal device to a second terminal device, wherein the target information is information that is in the sidelink information and that overlaps with the uplink information in a time domain in a scheduling time unit, wherein the target information is at least one of data information, scheduling assignment information, or sidelink feedback information, wherein the target information comprises first information and second information, and wherein determining the transmit power of the uplink information and the transmit power of the target information comprises separately adjusting, in response to the priority of the uplink transmission being higher than the priority of the sidelink transmission, and based on the transmit power of the uplink information, at least one of a transmit power of the first information or a transmit power of the second information; and performing at least one of:
sending the uplink information based on the transmit power of the uplink information; or
sending the at least one of the first information or the second information based on the transmit power of the first information or the transmit power of the second information.

2. The method according to claim 1, wherein determining the transmit power of uplink information and the transmit power of target information based on the target information and the priorities of the uplink transmission and the sidelink transmission further comprises:
adjusting the transmit power of the uplink information based on the transmit power of the target information and in response to the priority of the sidelink transmission being higher than the priority of the uplink transmission.

3. The method according to claim 1, wherein the first information is at least one of data information, scheduling assignment information, or sidelink feedback information, and wherein the second information is at least one of data information, scheduling assignment information, or sidelink feedback information; and
wherein determining the transmit power of the uplink information and the transmit power of the target information based on the target information and the priorities of the uplink transmission and the sidelink transmission further comprises:
determining a first transmit power based on at least one of the transmit power of the first information or the transmit power of the second information; and
adjusting the transmit power of the uplink information based on the first transmit power and in response to the priority of the sidelink transmission being higher than the priority of the uplink transmission.

4. The method according to claim 3, wherein determining the first transmit power based on at least one of the transmit power of the first information or the transmit power of the second information comprises performing at least one of:
determining, in response to a frequency division multiplexing mode being used between the first information and the second information, the first transmit power as a sum of the transmit power of the first information and the transmit power of the second information; or
determining, in response to a time division multiplexing mode being used between the first information and the second information, the first transmit power as a larger value of the transmit power of the first information and the transmit power of the second information.

5. The method according to claim 1, wherein the target information comprises the first information, the second information, and third information, wherein the first information is at least one of data information, scheduling assignment information, or sidelink feedback information, wherein the second information is at least one of data information, scheduling assignment information, or sidelink feedback information, and wherein the third information is at least one of data information, scheduling assignment information, or sidelink feedback information; and
wherein determining the transmit power of uplink information and the transmit power of the target information based on the target information and the priorities of uplink transmission and the sidelink transmission further comprises:
determining a second transmit power based on at least one of the transmit power of the first information, the transmit power of the second information, or a transmit power of the third information; and
performing at least one of:
adjusting the transmit power of the uplink information based on the second transmit power and in response to the priority of the sidelink transmission being higher than the priority of the uplink transmission; or
separately adjusting, in response to the priority of the uplink transmission being higher than the priority of the sidelink transmission and based on the transmit power of the uplink information, one or more of the transmit power of the first information, the transmit power of the second information, or the transmit power of the third information.

6. The method according to claim 5, wherein determining the second transmit power based on at least one of the transmit power of the first information, the transmit power of the second information, or the transmit power of the third information comprises performing at least one of:
determining the second transmit power is a largest transmit power of the transmit power of the first information, the transmit power of the second information, or the transmit power of the third information, in response to a time division multiplexing mode being used between the first information, the second information, and the third information; or
determining the second transmit power as a larger value in the transmit power of the third information and the third transmit power in response to a frequency division multiplexing mode being used between the first information and the second information, a time division multiplexing mode being a third transmit power; or
determining the second transmit power as a sum of the transmit power of the first information, the transmit power of the second information, and the transmit power of the third information in response to that a frequency division multiplexing mode is used between the first information, the second information, and the third information.

7. The method according to claim 1, wherein the method further comprises performing at least one of:
receiving first configuration information, wherein the first configuration information indicates the priorities of the uplink transmission and the sidelink transmission, and determining the priorities of the uplink transmission and the sidelink transmission based on the first configuration information; or determining the priorities of the uplink transmission and the sidelink transmission according to a predefined rule; or receiving second configuration information, wherein the second configuration information indicates a first threshold, and determining the priorities of the uplink transmission and the sidelink transmission based on a value relationship between the first threshold and a priority of a data packet corresponding to the target information.

8. The method according to claim 1, wherein the target information is transmitted on a first channel, and wherein the uplink information is transmitted on a second channel; and wherein the priorities of the uplink transmission and the sidelink transmission are priorities of the first channel and the second channel, and wherein determining the transmit power of uplink information and the transmit power of the target information based on the target information and the priorities of the uplink transmission and the sidelink transmission further comprises:

adjusting the transmit power of the uplink information based on the transmit power of the target information and in response to the priority of the first channel being higher than the priority of the second or channel; or adjusting the transmit power of the target information based on the transmit power of the uplink information and in response to the priority of the second channel being higher than the priority of the first channel.

9. The method according to claim 1, wherein the first information is at least one of data information, scheduling assignment information, or sidelink feedback information, wherein the second information is at least one of data information, scheduling assignment information, or sidelink feedback information, wherein the first information is transmitted on a first channel, wherein the second information is transmitted on a second channel, and wherein the uplink information is transmitted on a third channel;

wherein the priorities of the sidelink transmission and the uplink transmission are priorities of the first channel, the second channel, and the third channel; and wherein the determining the transmit power of uplink information and the transmit power of target information based on the target information and the priorities of uplink transmission and the sidelink transmission further comprises performing at least one of:

performing, in response to the channels being in a sequentially descending order of priority of the first channel, the second channel, and the third channel, adjusting a transmit power of the second information based on a transmit power of the first information, and adjusting the transmit power of the uplink information based on the transmit powers of the first information and the second information; or performing, in response to the channels being in a sequentially descending order of priority of the first channel, the third channel, and the second channel, adjusting the transmit power of the uplink information based on a transmit power of the first information, and adjusting a transmit power of the second information based on the transmit powers of the first information and the uplink information; or performing, in response to the channels being in a sequentially descending order of priority of the third channel, the first channel, and the second channel, adjusting a transmit power of the first information based on the transmit power of the uplink information, and adjusting a transmit power of the second information based on the transmit powers of the uplink information and the first information.

10. The method according to claim 1, wherein the target information comprises the first information, the second information, and third information, wherein the first information is at least one of data information, scheduling assignment information, or sidelink feedback information, wherein the second information is at least one of data information, scheduling assignment information, or sidelink feedback information, wherein the third information is at least one of data information, scheduling assignment information, or sidelink feedback information, wherein the first information is transmitted on a first channel, wherein the second information is transmitted on a second channel, wherein the third information is transmitted on a third channel, and wherein the uplink information is transmitted on a fourth channel;

wherein the priorities of the sidelink transmission and the uplink transmission are priorities of the first channel, the second channel, the third channel, and the fourth channel; and wherein the determining the transmit power of uplink information and a transmit power of target information based on the target information and priorities of uplink transmission and sidelink transmission further comprises:

performing, in response to the channels being in a sequentially descending order of priority of the first channel, the second channel, the third channel, and the fourth channel, adjusting a transmit power of the second information based on a transmit power of the first information, adjusting a transmit power of the third information based on the transmit powers of the first information and the second information, and adjusting the transmit power of the uplink information based on the transmit powers of the first information, the second information, and the third information; or performing, in response to the channels being in a sequentially descending order of priority of the first channel, the fourth channel, the second channel, and the third channel, adjusting the transmit power of the uplink information based on a transmit power of the first information, adjusting a transmit power of the second information based on the transmit powers of the first information and the uplink information, and adjusting a transmit power of the third information based on the transmit powers of the first information, the uplink information, and the second information; or performing, in response to the channels being in a sequentially descending order of priority of the fourth channel, the first channel, the second channel, and the third channel, adjusting a transmit power of the first information based on the transmit power of the uplink information, adjusting a transmit power of the second information based on the transmit powers of the uplink information and the first information, and adjusting a transmit power of the third information based on the transmit powers of the uplink information, the first information, and the second information.

11. The method according to claim 1, wherein the uplink information is at least one of uplink data information or uplink control information, wherein the target information is transmitted on a first channel, and wherein the uplink information is transmitted on a second channel;
  wherein the priorities of the uplink transmission and the sidelink transmission are priorities of the first channel and the second channel; and
  wherein the determining a transmit power of uplink information and a transmit power of target information based on the target information and priorities of uplink transmission and sidelink transmission further comprises:
    adjusting, in response to the priority of the first channel being higher than the priority of the second channel, the transmit power of the uplink information based on the transmit power of the target information; or
    adjusting, in response to that the priority of the second channel being higher than the priority of the first channel, the transmit power of the target information based on the transmit power of the uplink information.

12. The method according to claim 1, wherein the uplink information comprises fourth information and fifth information, wherein the fourth information is at least one of uplink data information or uplink control information, wherein the fifth information is at least one of uplink data information or uplink control information, wherein the target information is transmitted on a first channel, wherein the fourth information is transmitted on a second channel, and wherein the fifth information is transmitted on a third channel;
  the priorities of the uplink transmission and the sidelink transmission are priorities of the first channel, the second channel, and the third channel; and
  wherein determining a transmit power of uplink information and a transmit power of target information based on the target information and priorities of uplink transmission and sidelink transmission further comprises:
    performing, in response to the channels being in a sequentially descending order of priority of the first channel, the second channel, and the third channel, adjusting a transmit power of the fourth information based on the transmit power of the target information, and adjusting a transmit power of the fifth information based on the transmit powers of the target information and the fourth information; or
    performing, in response to the channels being in a sequentially descending order of priority of the second channel, the first channel, and the third channel, adjusting the transmit power of the target information based on a transmit power of the fourth information, and adjusting a transmit power of the fifth information based on the transmit powers of the fourth information and the target information; or
    performing, in response to the channels being in a sequentially descending order of priority of the second channel, the third channel, and the first channel, adjusting a transmit power of the fifth information based on a transmit power of the fourth information, and adjusting the transmit power of the target information based on the transmit powers of the fourth information and the fifth information.

13. An apparatus, comprising:
  a communications interface;
  a processor; and
  a non-transitory computer readable medium storing a program for execution by the processor, the program including instructions to:
    determine a transmit power of uplink information and a transmit power of target information based on the target information and priorities of uplink transmission and sidelink transmission, wherein the uplink transmission comprises transmission of the uplink information by a first terminal device to a network device, wherein the sidelink transmission comprises transmission of sidelink information by the first terminal device to a second terminal device, wherein the target information is information that is in the sidelink information and that overlaps with the uplink information in a time domain in a scheduling time unit, wherein the target information comprises first information and second information, and wherein the target information is at least one of data information, scheduling assignment information, or sidelink feedback information, and wherein determining the transmit power of the uplink information and the transmit power of the target information comprises separately adjusting, in response to the priority of the uplink transmission being higher than the priority of the sidelink transmission, and based on the transmit power of the uplink information, at least one of a transmit power of the first information or a transmit power of the second information; and
    perform at least one of:
      send the uplink information based on the transmit power of the uplink information through the communications interface; or
      send the at least one of the first information or the second information based on the transmit power of the first information or the transmit power of the second information through the communications interface.

14. The apparatus according to claim 13, wherein the the program further incudes instructions to:
  adjust, in response to the priority of the sidelink transmission being higher than the priority of the uplink transmission, the transmit power of the uplink information based on the transmit power of the target information.

15. The apparatus according to claim 13, wherein the first information is at least one of data information, scheduling assignment information, or sidelink feedback information, and wherein the second information is at least one of data information, scheduling assignment information, or sidelink feedback information; and
  wherein the program further includes instructions to:
    determine a first transmit power based on at least one of the transmit power of the first information or the transmit power of the second information; and
    perform at least one of:
      adjust, in response to the priority of the sidelink transmission being higher than the priority of the uplink transmission, the transmit power of the uplink information based on the first transmit power.

16. The apparatus according to claim 15, wherein the program further includes instructions to perform at least one of:
  determine, in response to a frequency division multiplexing mode being used between the first information and the second information, the first transmit power as a sum of the transmit power of the first information and the transmit power of the second information; or
  determine, in response to a time division multiplexing mode being used between the first information and the second information, the first transmit power is a larger value in the transmit power of the first information and the transmit power of the second information.

17. The apparatus according to claim 13, wherein the target information comprises the first information, the second information, and third information, wherein the first information is at least one of data information, scheduling assignment information, or sidelink feedback information, wherein the second information is at least one of data information, scheduling assignment information, or sidelink feedback information, and wherein the third information is at least one of data information, scheduling assignment information, or sidelink feedback information; and
wherein the program further includes instructions to:
determine a second transmit power based on at least one of the transmit power of the first information, the transmit power of the second information, or a transmit power of the third information; and
perform at least one of:
adjust, in response to the priority of the sidelink transmission being higher than the priority of the uplink transmission, the transmit power of the uplink information based on the second transmit power; or
adjust, in response to the priority of the uplink transmission being higher than the priority of the sidelink transmission, one or more of the transmit power of the first information, the transmit power of the second information, and the transmit power of the third information based on the transmit power of the uplink information.

18. The apparatus according to claim 17, wherein the instructions to determine the second transmit power based on the at least one of the transmit power of the first information, the transmit power of the second information, or the transmit power of the third information include instructions to-perform at least one of:
determine, in response to a time division multiplexing mode being used between the first information, the second information, and the third information, the second transmit power as a largest transmit power of the transmit power of the first information, the transmit power of the second information, or the transmit power of the third information; or
determine, in response to a frequency division multiplexing mode being used between the first information and the second information, further in response to a time division multiplexing mode being used between the third information and each of the first information and the second information, and further in response to a sum of the transmit power of the first information and the transmit power of the second information is a third transmit power, the second transmit power a larger value of the transmit power of the third information and the third transmit power; or
determine, in response to a frequency division multiplexing mode being used between the first information, the second information, and the third information, the second transmit power as a sum of the transmit power of the first information, the transmit power of the second information, and the transmit power of the third information.

19. The apparatus according to claim 13, wherein the program further includes instructions to perform at least one of:
receive first configuration information, wherein the first configuration information indicates the priorities of the uplink transmission and the sidelink transmission, and determine the priorities of the uplink transmission and the sidelink transmission based on the first configuration information; or
determine the priorities of the uplink transmission and the sidelink transmission according to a predefined rule; or
receive second configuration information, wherein the second configuration information indicates a first threshold, and determine the priorities of the uplink transmission and the sidelink transmission based on a value relationship between the first threshold and a priority of a data packet corresponding to the target information.

20. An apparatus, comprising:
a non-transitory storage medium having instructions stored thereon; and
one or more processors in communication with the storage medium, wherein the one or more processors execute the instructions to perform operations comprising:
determining a transmit power of uplink information and a transmit power of target information based on the target information and priorities of uplink transmission and sidelink transmission, wherein the uplink transmission comprises transmission of the uplink information by a first terminal device to a network device, wherein the sidelink transmission comprises transmission of sidelink information by the first terminal device to a second terminal device, wherein the target information is information that is in the sidelink information and that overlaps with the uplink information in time domain in a scheduling time unit, wherein the target information comprises first information and second information, wherein the target information is at least one of data information, scheduling assignment information, or sidelink feedback information, and wherein the determining comprises separately adjusting, in response to the priority of the uplink transmission being higher than the priority of the sidelink transmission, and based on the transmit power of the uplink information, at least one of a transmit power of the first information or a transmit power of the second information; and
performing at least one of:
sending the uplink information based on the transmit power of the uplink information; or
sending the at least one of the first information and the second information based on the transmit power of the first information or the transmit power of the second information.

* * * * *

UNITED STATES PATENT AND TRADEMARK OFFICE
CERTIFICATE OF CORRECTION

PATENT NO. : 11,910,330 B2
APPLICATION NO. : 17/360290
DATED : February 20, 2024
INVENTOR(S) : Wang et al.

It is certified that error appears in the above-identified patent and that said Letters Patent is hereby corrected as shown below:

On the Title Page

Item (73), in Column 1, in "Assignee", Line 1, delete "Technologies," and insert -- Technologies --.

In the Claims

In Column 61, in Claim 8, Line 24, after "second" delete "or".

In Column 64, in Claim 14, Line 34, delete "the the" and insert -- the --.

In Column 64, in Claim 14, Line 35, delete "incudes" and insert -- includes --.

Signed and Sealed this
Seventh Day of May, 2024

Katherine Kelly Vidal
*Director of the United States Patent and Trademark Office*